Dec. 12, 1944.   R. E. BALDWIN   2,364,934
CALCULATING MACHINE
Filed May 3, 1939   43 Sheets-Sheet 1

Inventor
R. E. Baldwin.
by
Sydney E. Page.
Attorney

Dec. 12, 1944.    R. E. BALDWIN    2,364,934
CALCULATING MACHINE
Filed May 3, 1939    43 Sheets-Sheet 4

Inventor
R. E. Baldwin
by
Sydney E. Page
Attorney

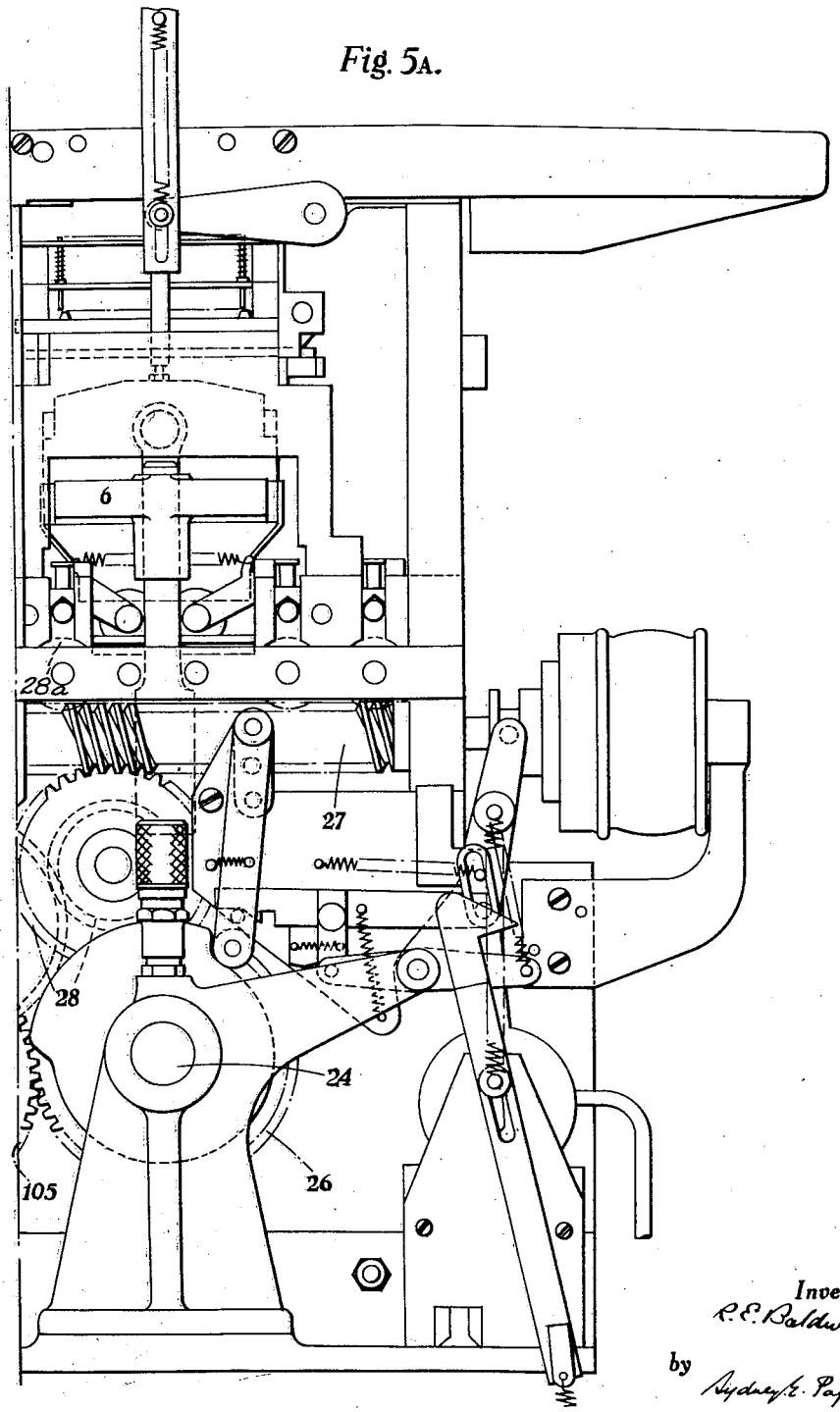

Dec. 12, 1944.   R. E. BALDWIN   2,364,934
CALCULATING MACHINE
Filed May 3, 1939   43 Sheets-Sheet 7

Inventor
R.E. Baldwin
by
Sydney E. Page
Attorney

Dec. 12, 1944.    R. E. BALDWIN    2,364,934
CALCULATING MACHINE
Filed May 3, 1939    43 Sheets-Sheet 9

Inventor
R. E. Baldwin.
by
Sydney E. Jay.
Attorney

Dec. 12, 1944.  R. E. BALDWIN  2,364,934
CALCULATING MACHINE
Filed May 3, 1939  43 Sheets-Sheet 10

Inventor
R. E. Baldwin.
by
Sidney E. Page.
Attorney

Dec. 12, 1944. R. E. BALDWIN 2,364,934
CALCULATING MACHINE
Filed May 3, 1939 43 Sheets-Sheet 11

Inventor
R. E. Baldwin
by
Sydney E. Page.
Attorney

Dec. 12, 1944.    R. E. BALDWIN    2,364,934
CALCULATING MACHINE
Filed May 3, 1939    43 Sheets-Sheet 14

Inventor
R. E. Baldwin
by
Sydney E. Page
Attorney

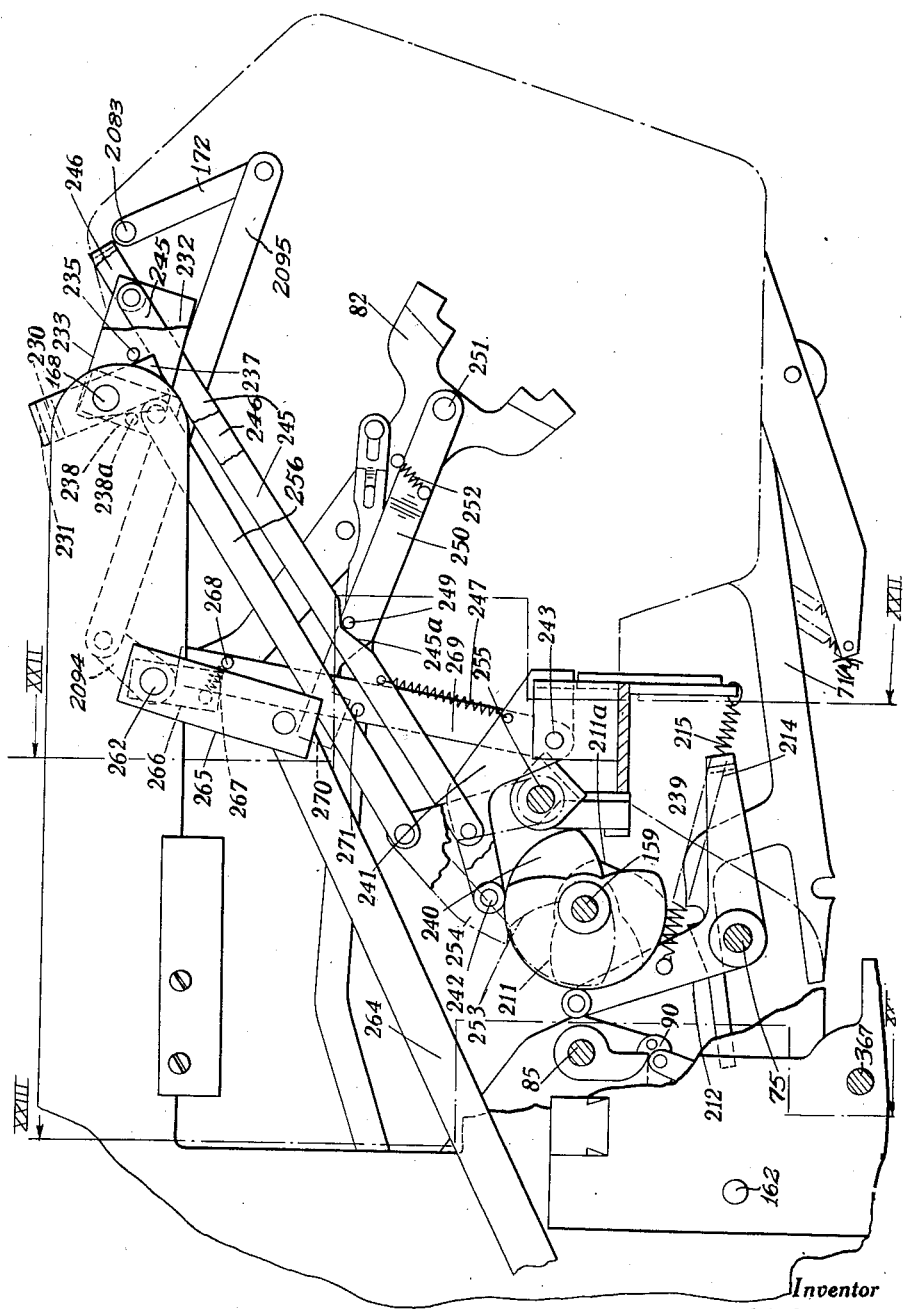

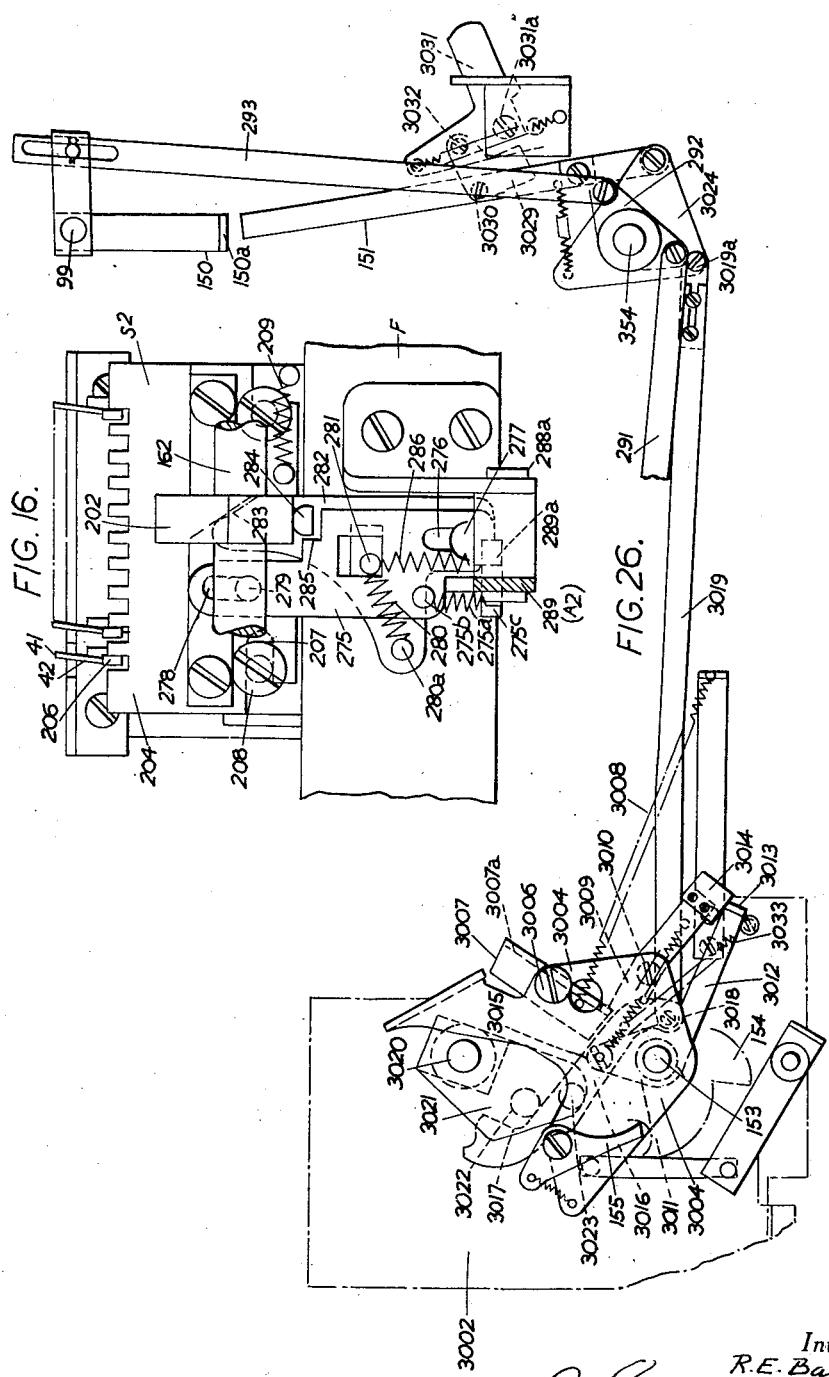

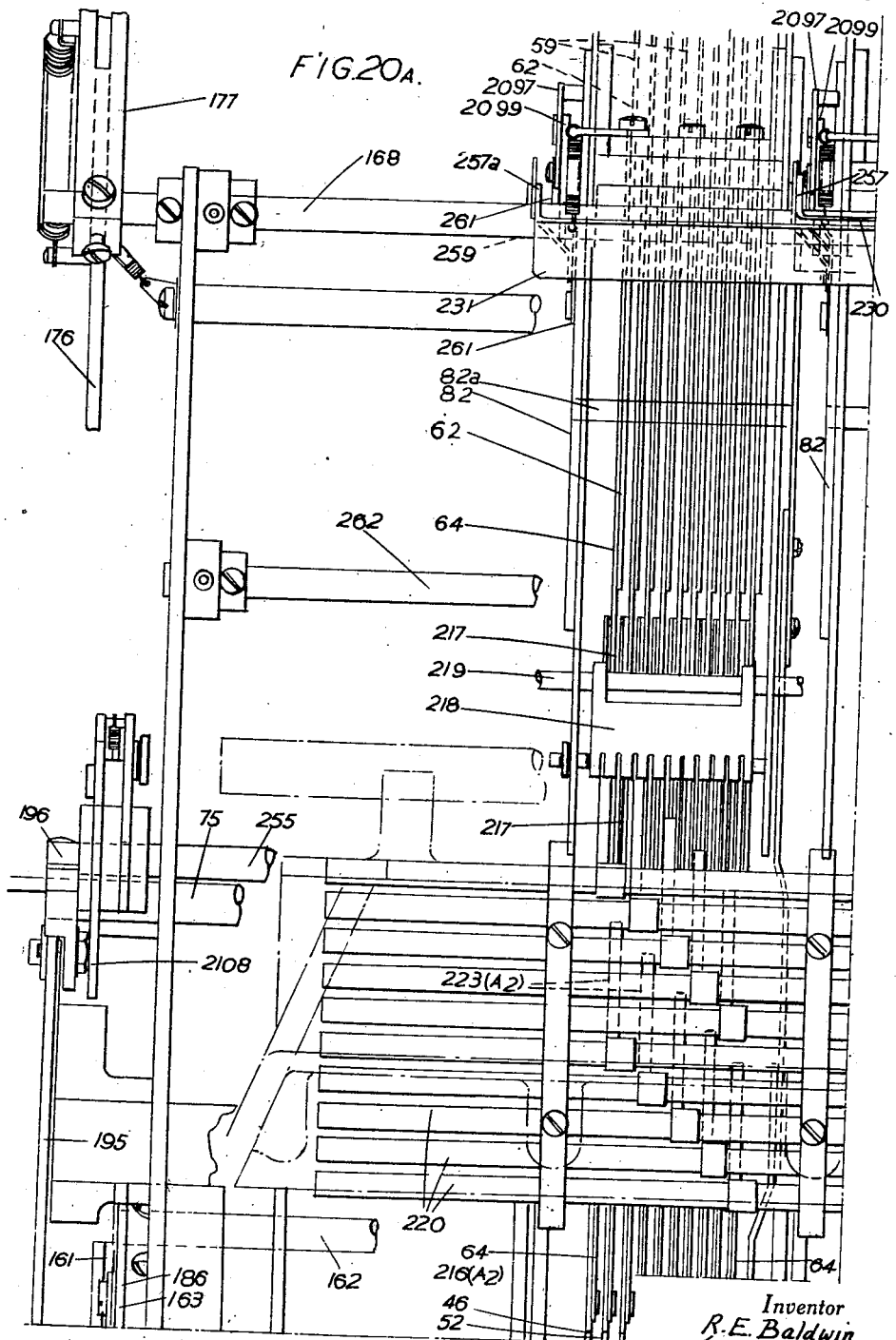

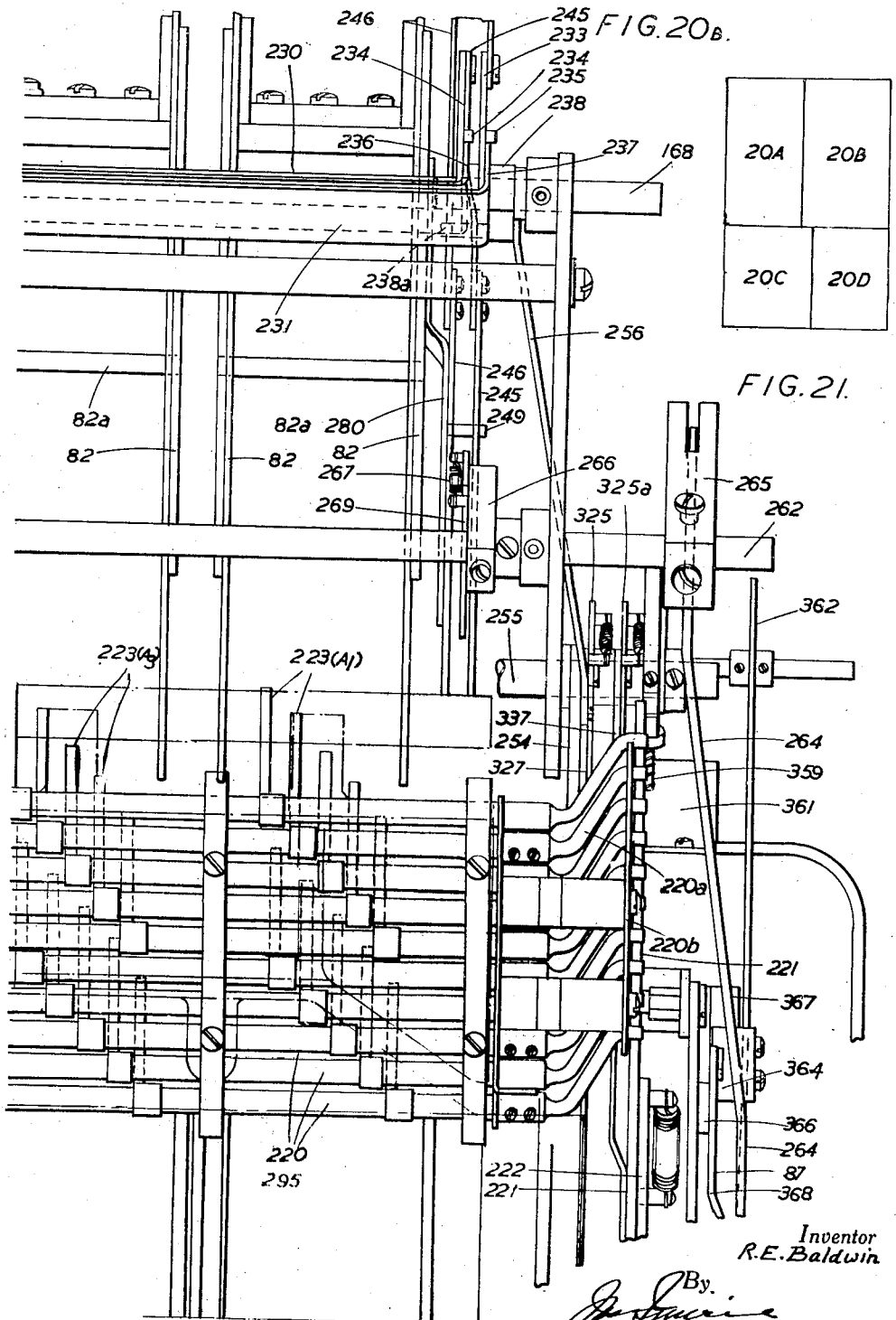

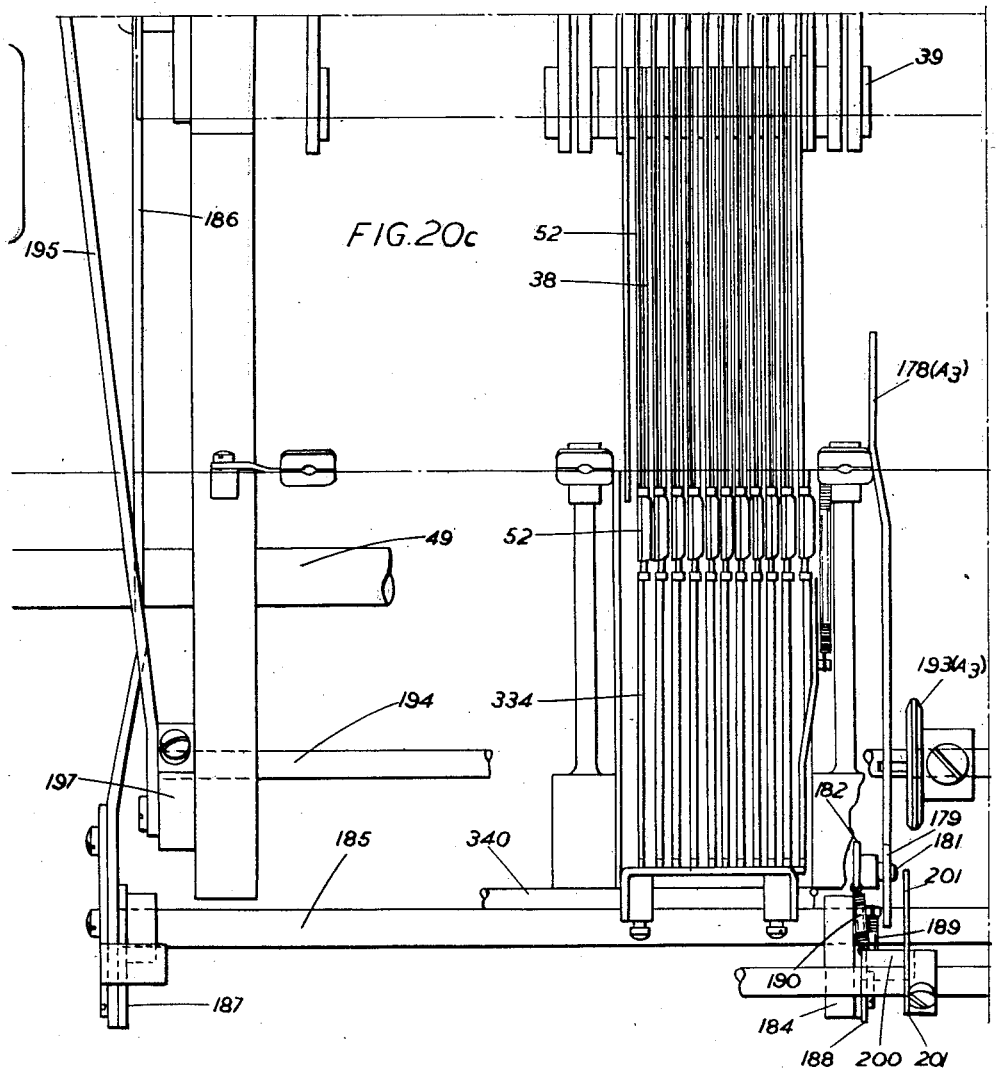

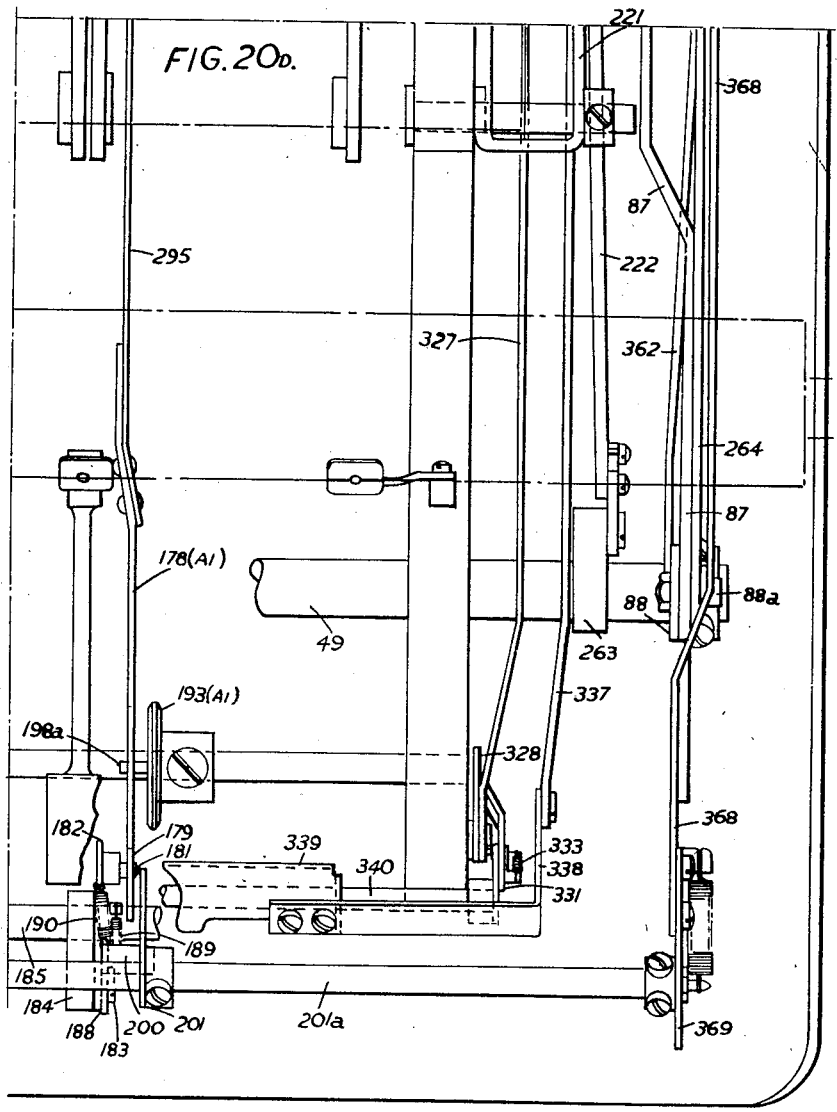

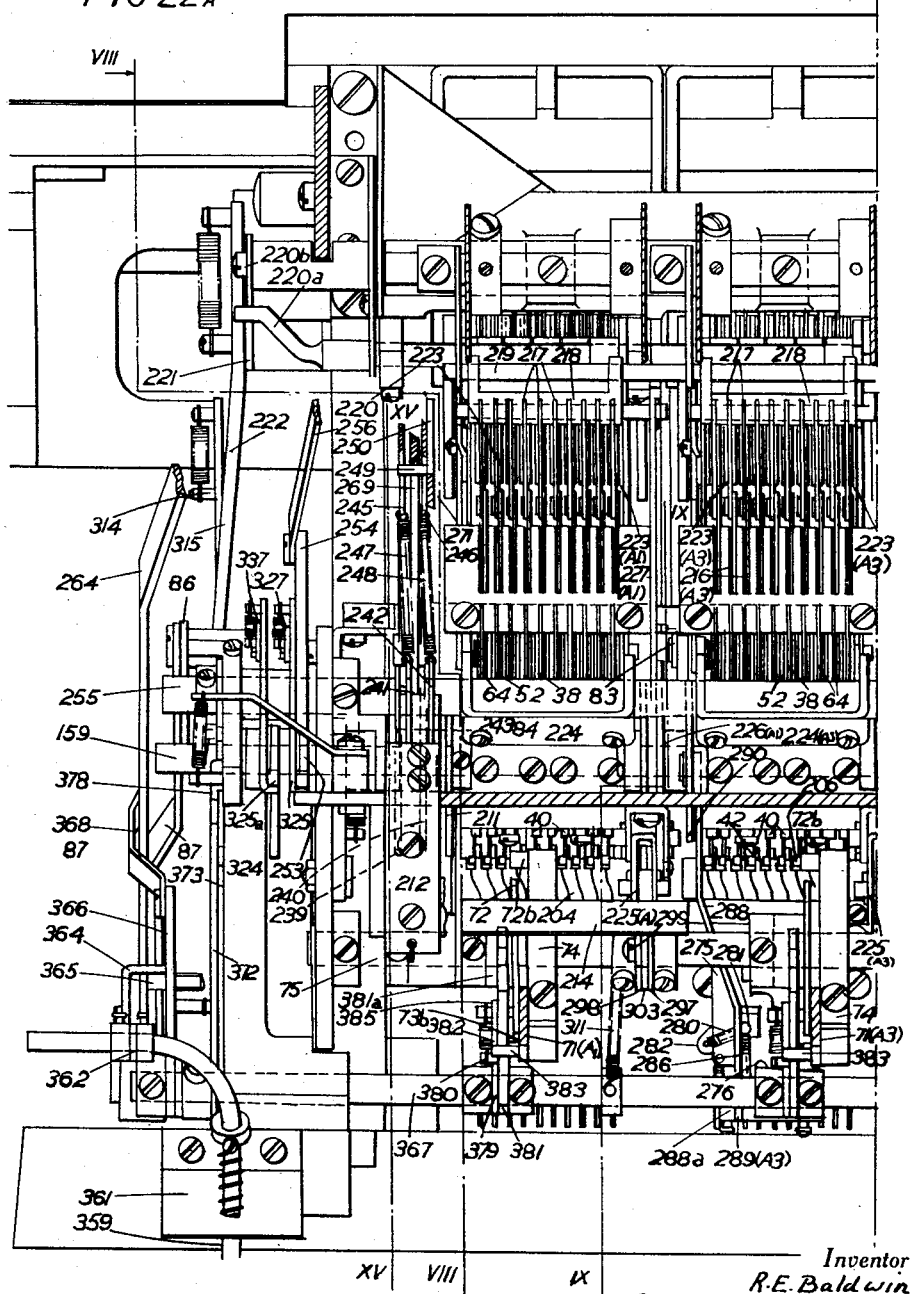

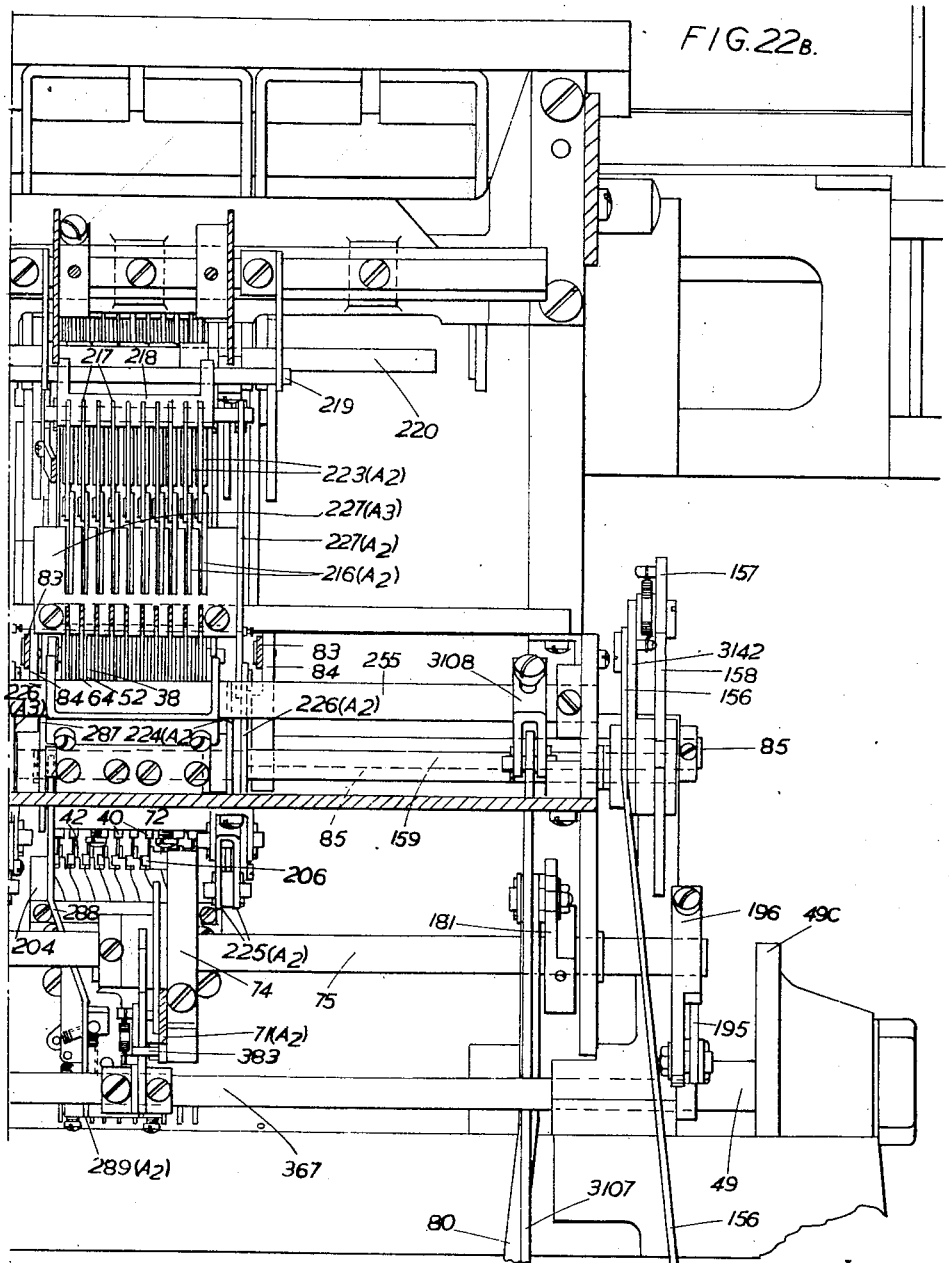

Dec. 12, 1944.    R. E. BALDWIN    2,364,934
CALCULATING MACHINE
Filed May 3, 1939    43 Sheets-Sheet 25

Inventor
R.E. Baldwin
By
Attorney

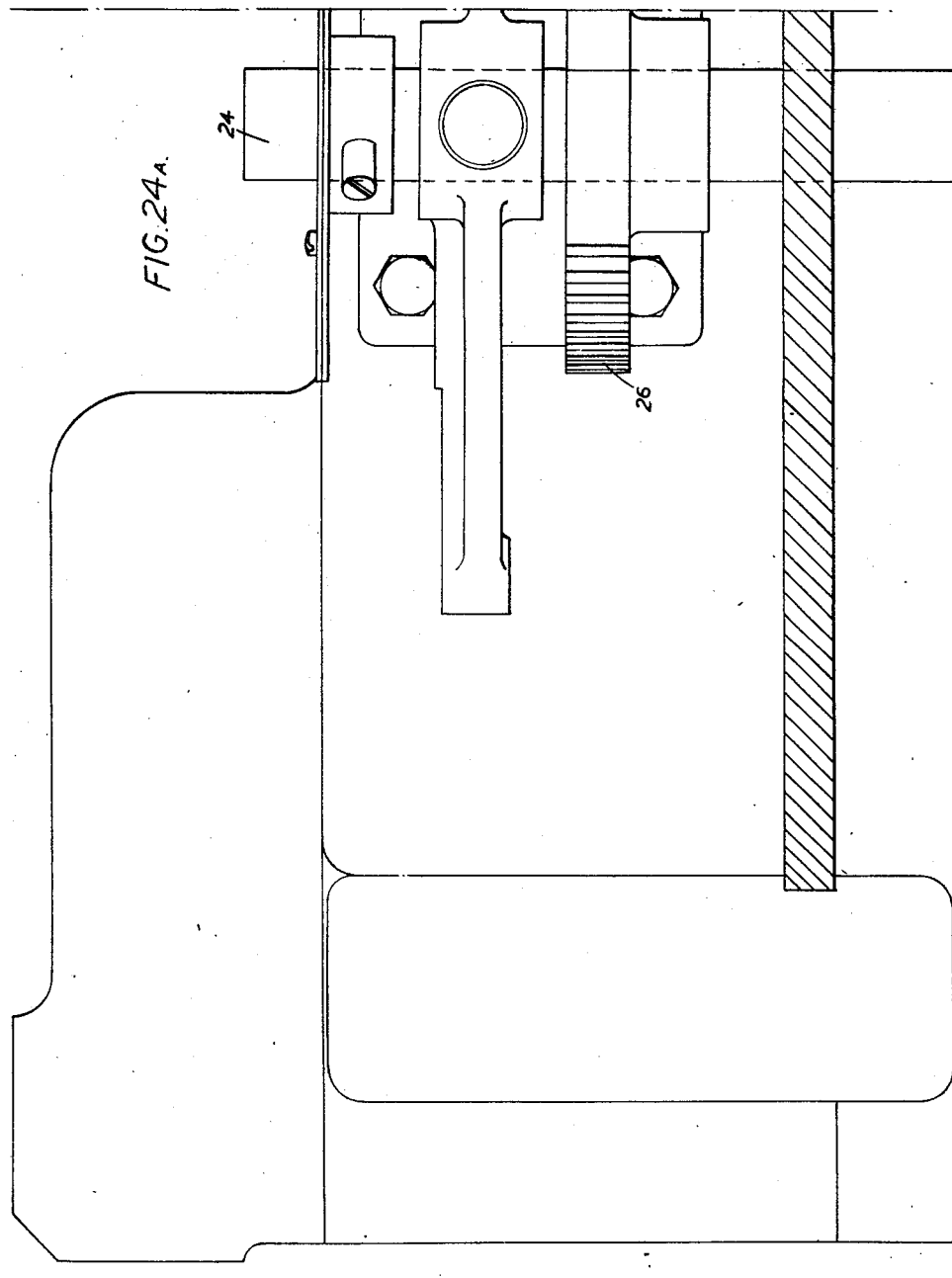

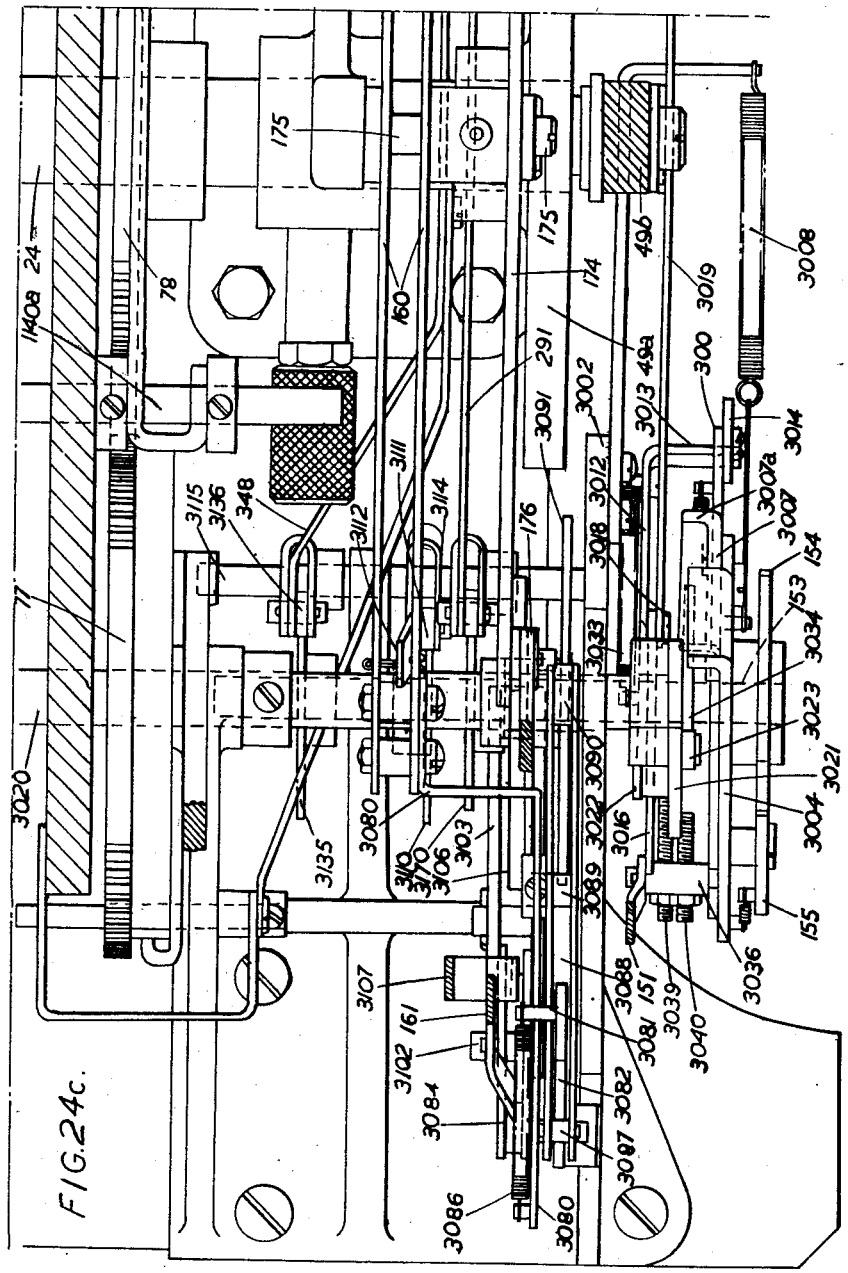

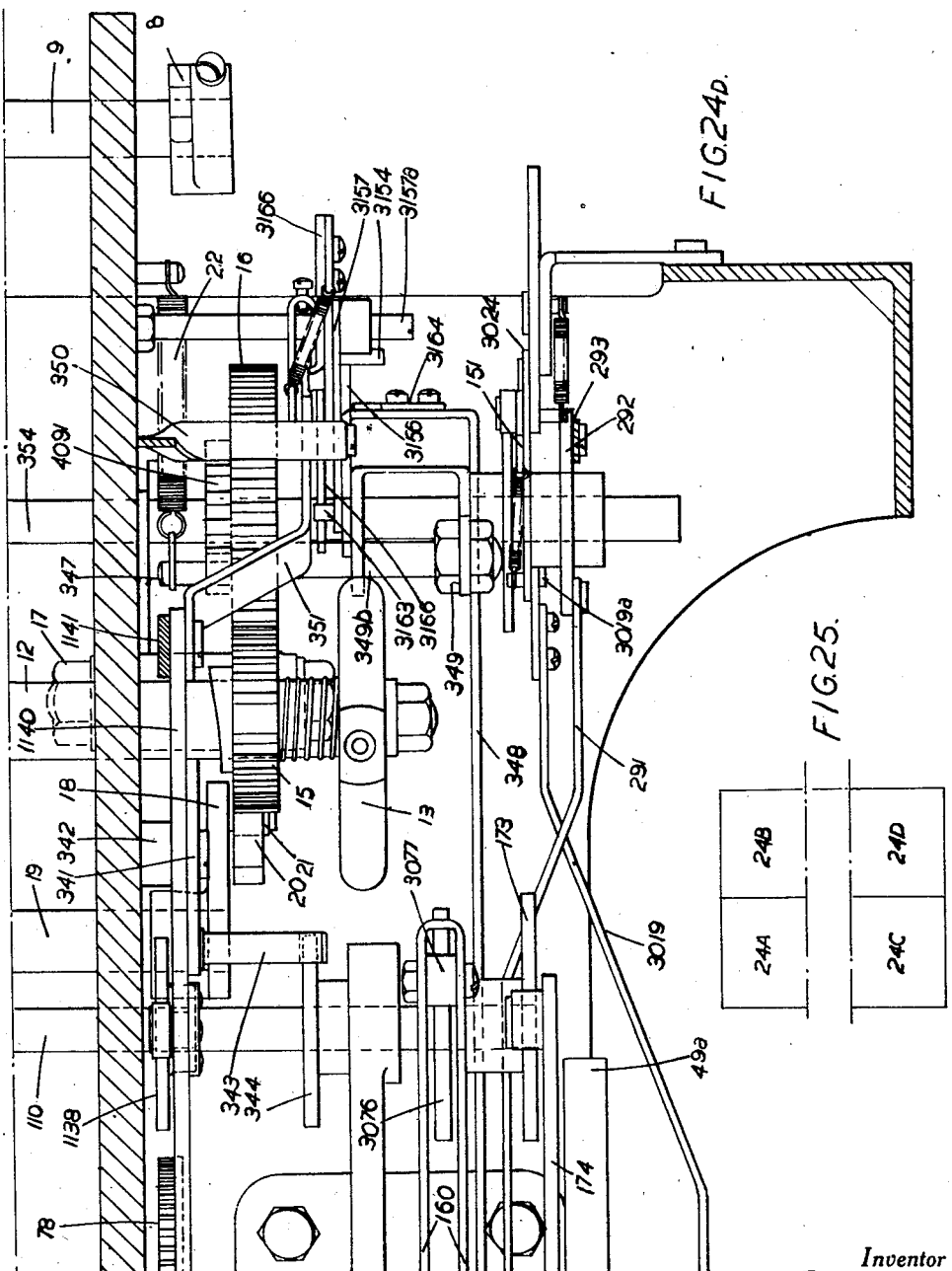

Dec. 12, 1944.  R. E. BALDWIN  2,364,934
CALCULATING MACHINE
Filed May 3, 1939   43 Sheets-Sheet 31

Inventor
R.E.Baldwin
By
Attorney

Dec. 12, 1944.    R. E. BALDWIN    2,364,934
CALCULATING MACHINE
Filed May 3, 1939    43 Sheets-Sheet 33

Inventor
R. E. Baldwin
By
Attorney

Dec. 12, 1944.  R. E. BALDWIN  2,364,934
CALCULATING MACHINE
Filed May 3, 1939  43 Sheets-Sheet 34

Inventor
R. E. Baldwin
By
Attorney

Dec. 12, 1944.  R. E. BALDWIN  2,364,934
CALCULATING MACHINE
Filed May 3, 1939   43 Sheets-Sheet 36

1ST CYCLE (ADDING LAST CARD BUT ONE)

2ND CYCLE (ADDING LAST CARD OF OLD GROUP)

INVENTOR
Richard E. Baldwin
By [signature]
ATTORNEY

3RD CYCLE (SPACE)

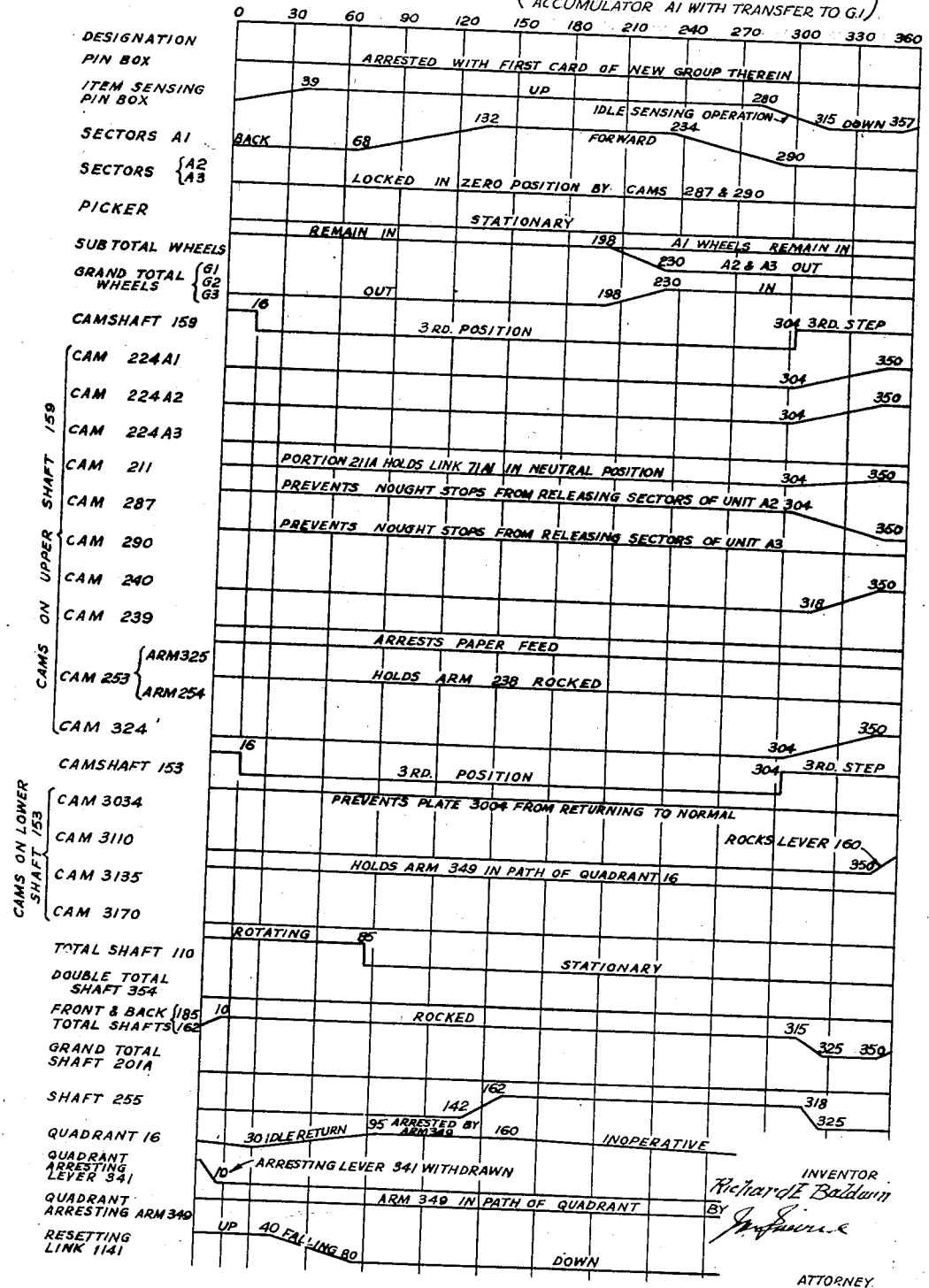

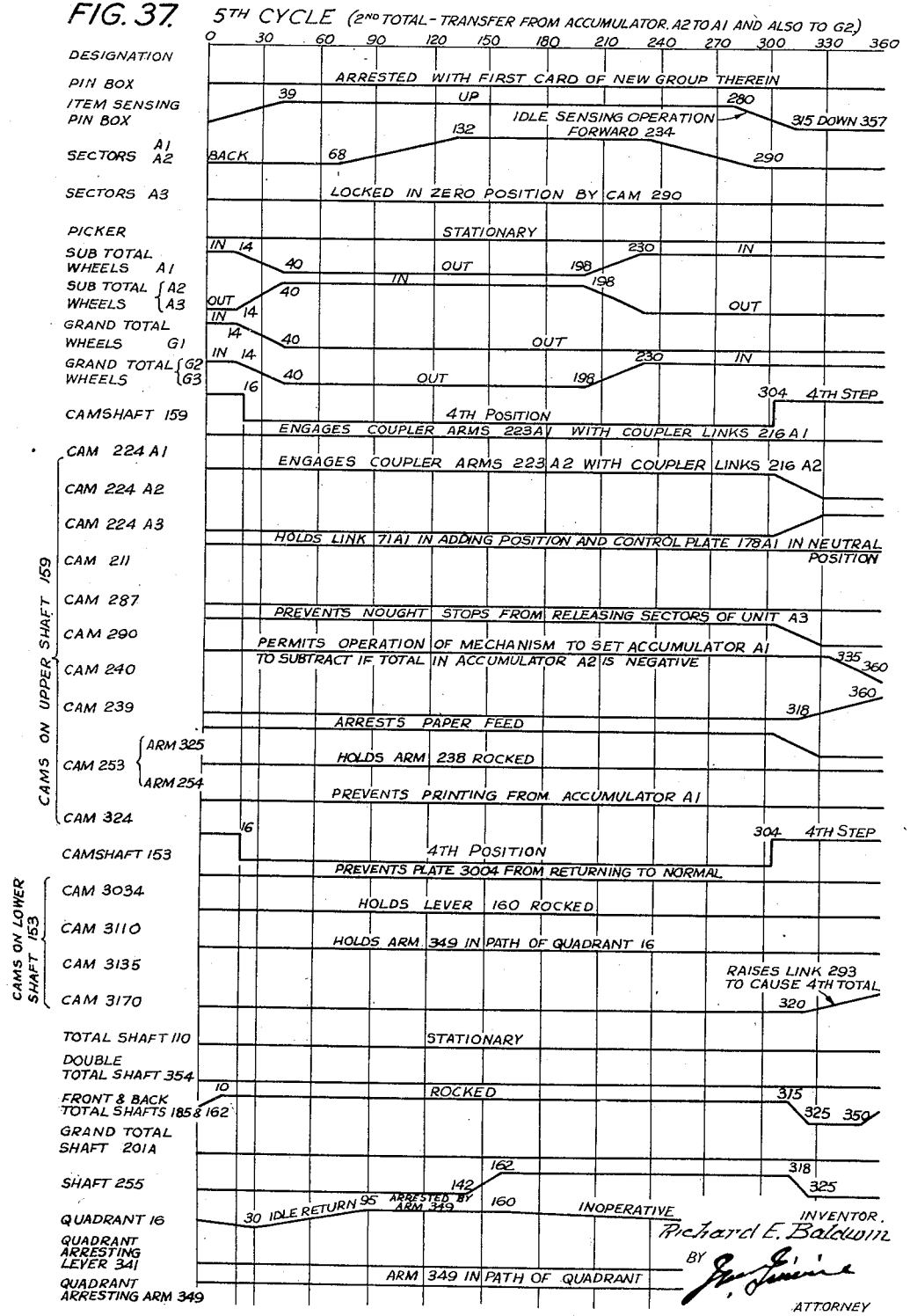

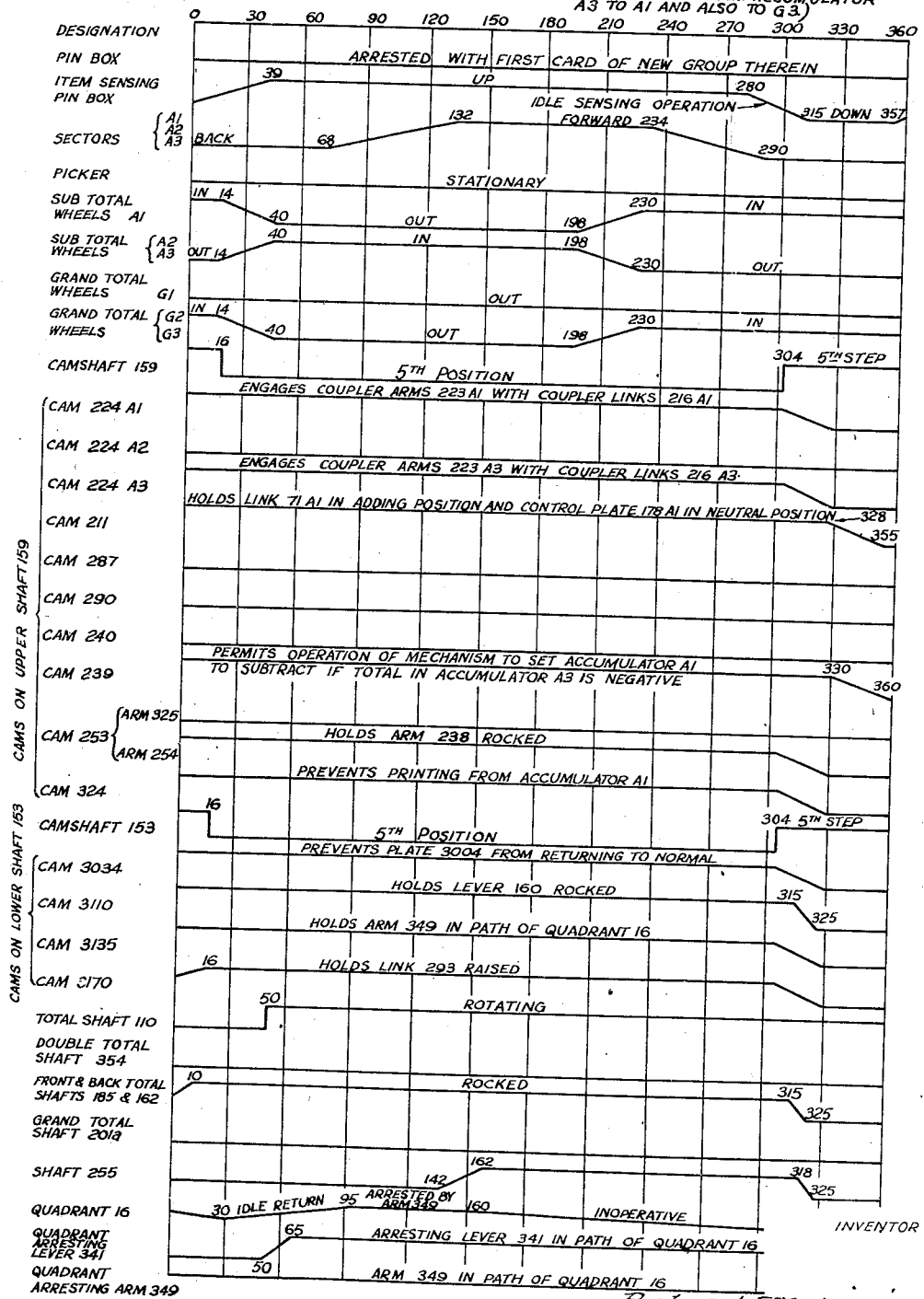

Figure 39:
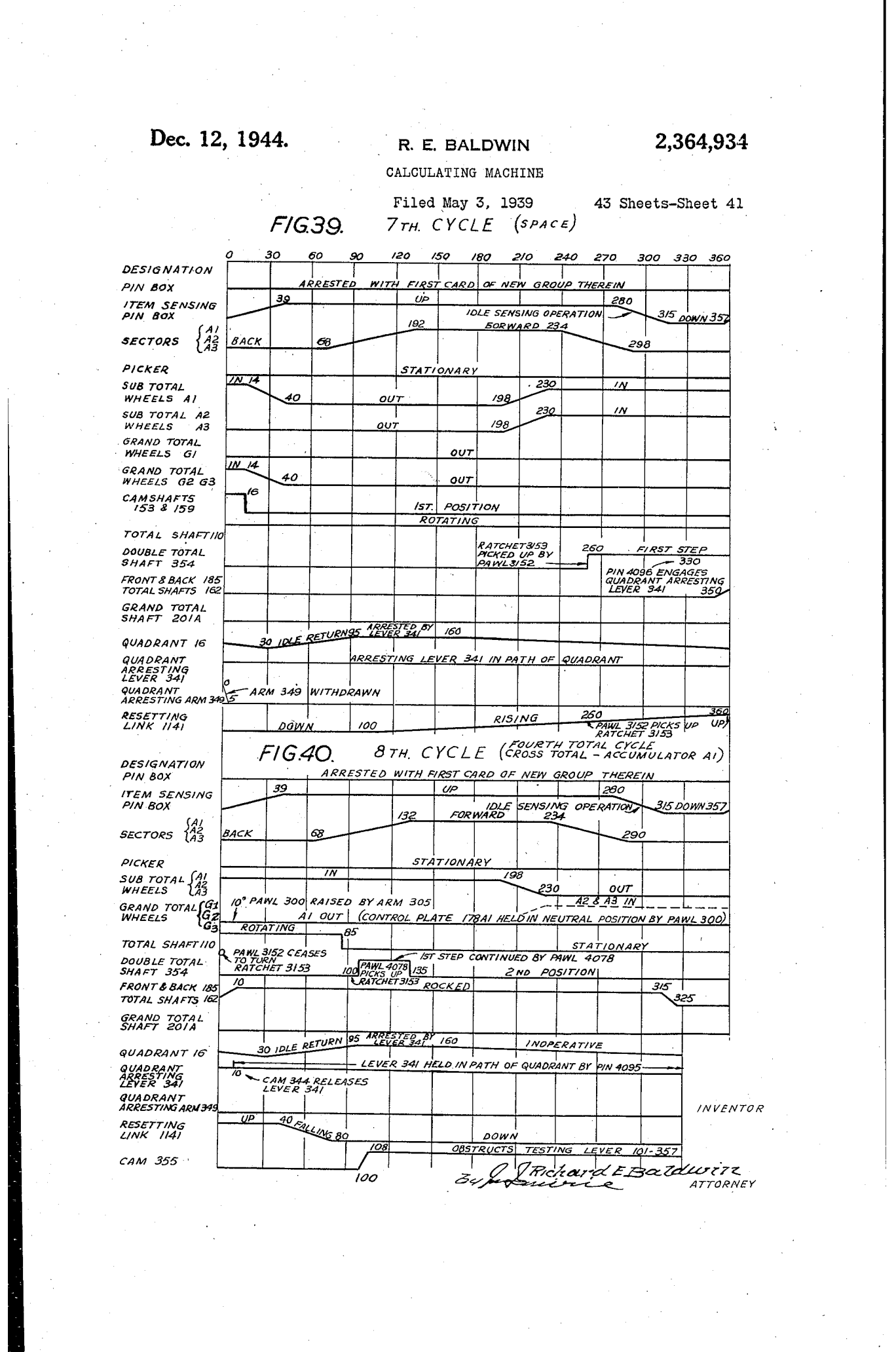

Dec. 12, 1944.  R. E. BALDWIN  2,364,934
CALCULATING MACHINE
Filed May 3, 1939   43 Sheets-Sheet 41

FIG.39.   7TH. CYCLE (SPACE)

Dec. 12, 1944.  R. E. BALDWIN  2,364,934
CALCULATING MACHINE
Filed May 3, 1939  43 Sheets-Sheet 42
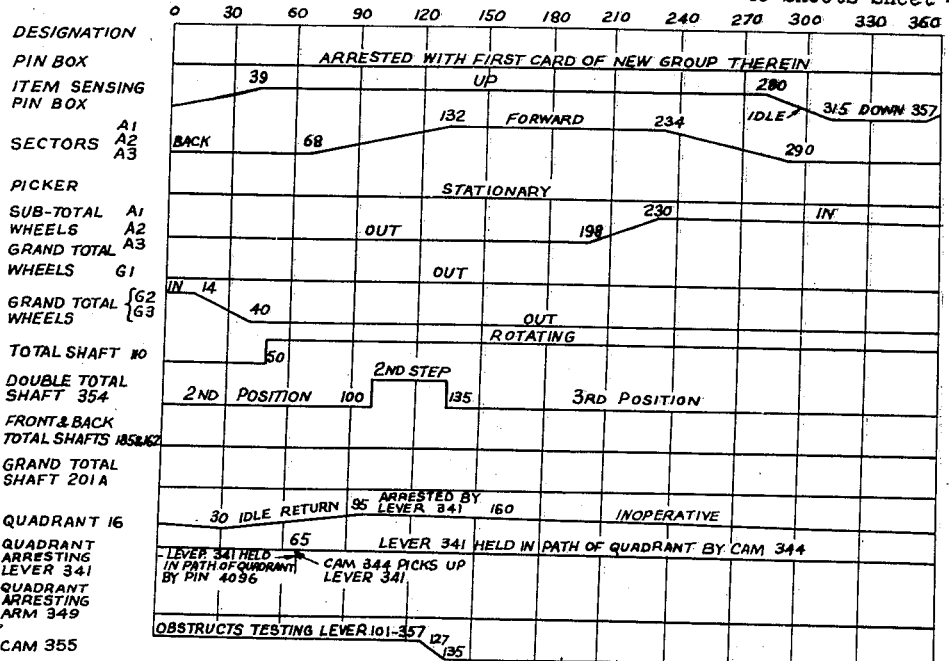
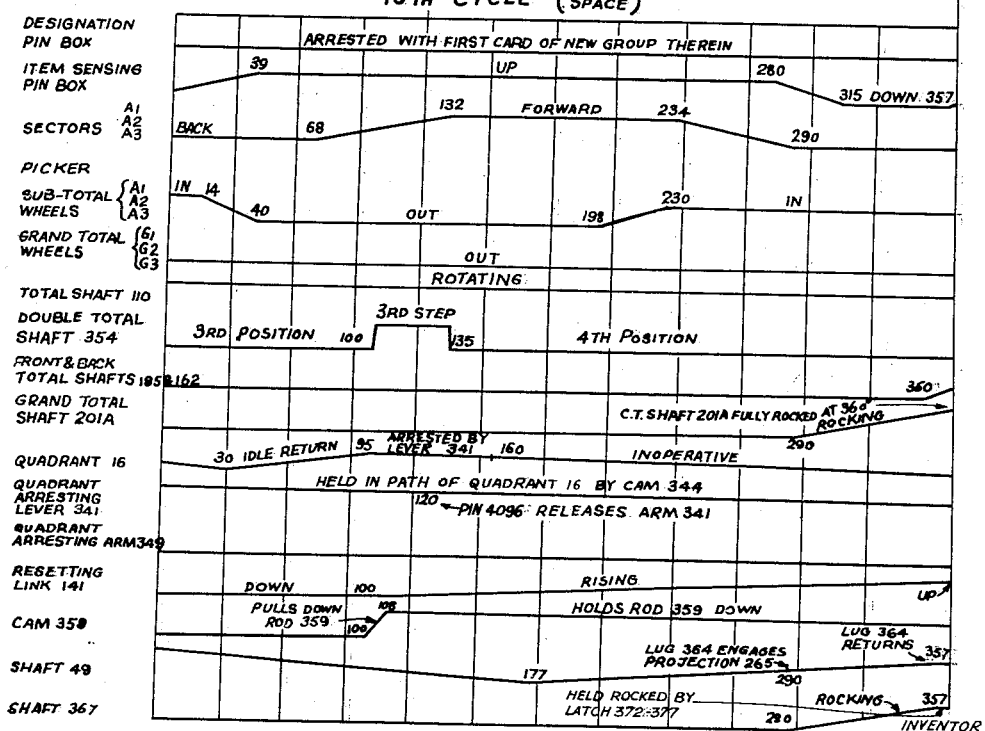

Dec. 12, 1944. R. E. BALDWIN 2,364,934
CALCULATING MACHINE
Filed May 3, 1939 43 Sheets-Sheet 43
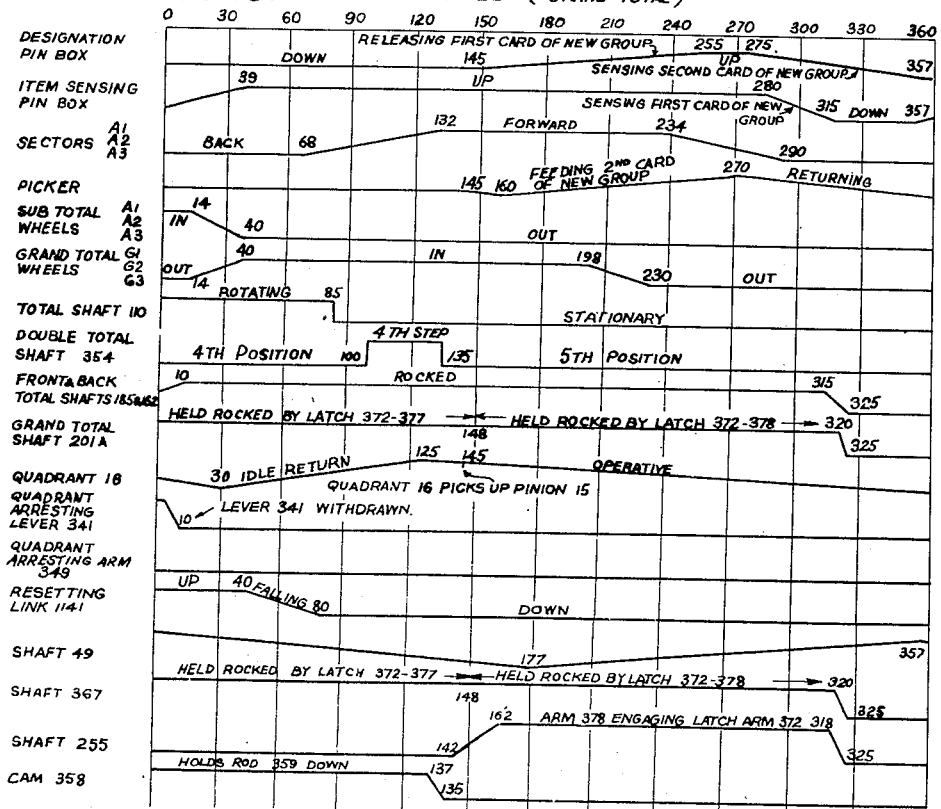
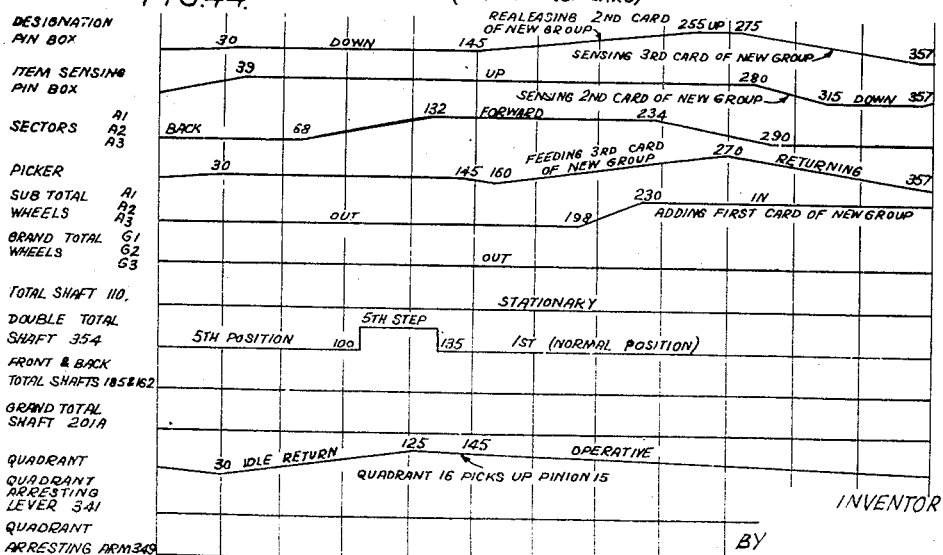
INVENTOR
Richard E. Baldwin
BY
ATTORNEY Patented Dec. 12, 1944

2,364,934

UNITED STATES PATENT OFFICE 2,364,934

CALCULATING MACHINE

Richard Everest Baldwin, Thornton Heath, England, assignor to Powers Accounting Machines Limited, London, England, a corporation of Great Britain Application May 3, 1939, Serial No. 271,558
In Great Britain May 9, 1938

4 Claims. (Cl. 235—61.8)

This invention relates to calculating machines of the kind comprising a plurality of algebraic accumulators, i. e., accumulators each of which can be set to receive a positive amount expressed in true figures or to receive a negative amount expressed in true figures, whereby the accumulator always holds the balance in true figures and not in complementary figures. An example of such an accumulator is described in British patent specification No. 405,666.

The object of the present invention is to provide in a calculating machine of the kind in which both positive and negative amounts can be entered in true figures into a single accumulator, means for transmitting an amount from one accumulator to another and means operative under the control of the transmitting accumulator for automatically conditioning the receiving accumulator to receive in true figures an amount of like sign with the amount which is held in the transmitting accumulator and which is to be transmitted to the receiving accumulator.

A further object of the invention is to provide means whereby the receiving accumulator is automatically put into a condition in which it will recognise the sign of the amount which it receives and will invariably operate to reduce the total which it holds if the amount received is negative or to increase the said total if the said amount is positive.

Yet another object of the invention is to provide in a record card controlled tabulator means for transmitting true negative amounts from one accumulator to another without the use of complemental punching on the cards.

The present invention therefore comprises in a calculating machine including two accumulators and total taking mechanism therefor the combination of adjusting means individual to each accumulator for adjusting the associated accumulator to receive a positive amount in true figures or a negative amount in true figures, transmitting means for transmitting amounts from one accumulator to the other, means effective upon the initiation of a total taking operation to effect an operation of said transmitting means and means also effective upon the initiation of a total taking operation and under the control of the transmitting accumulator to operate the adjusting means of the receiving accumulator, when the total held by the transmitting accumulator is negative, to set the receiving accumulator to receive a negative amount in true figures.

The invention also includes a record card controlled calculating machine having total taking mechanism and change of designation control mechanism therefor, comprising a plurality of transmitting accumulators, each of said accumulators having adjusting means individual thereto for adjusting the associated accumulator to receive a positive amount in true figures or a negative amount in true figures, means operative as a result of a change of designation to cause the transmitting accumulators to transmit their totals in turn to the receiving accumulator, means for ascertaining the sign of the totals in the respective transmitting accumulators, and means operative under the control of said sign-ascertaining means to condition the receiving accumulator to receive a negative amount in true figures when the sign of the transmitted total is negative.

In addition each of the aforesaid accumulators may be provided with a grand total accumulator and means whereby when any accumulator positions its actuators to represent the amount which it holds said amount is normally transferred to the corresponding grand total accumulator, means being also provided for preventing the transfer of the cross total to the grand total accumulator corresponding to the accumulator which prints said cross total.

In order to explain the invention further a preferred embodiment thereof as applied to a record card controlled tabulating machine will now be described by way of example, with reference to the accompanying diagrammatic drawings in which—

Figure 4:
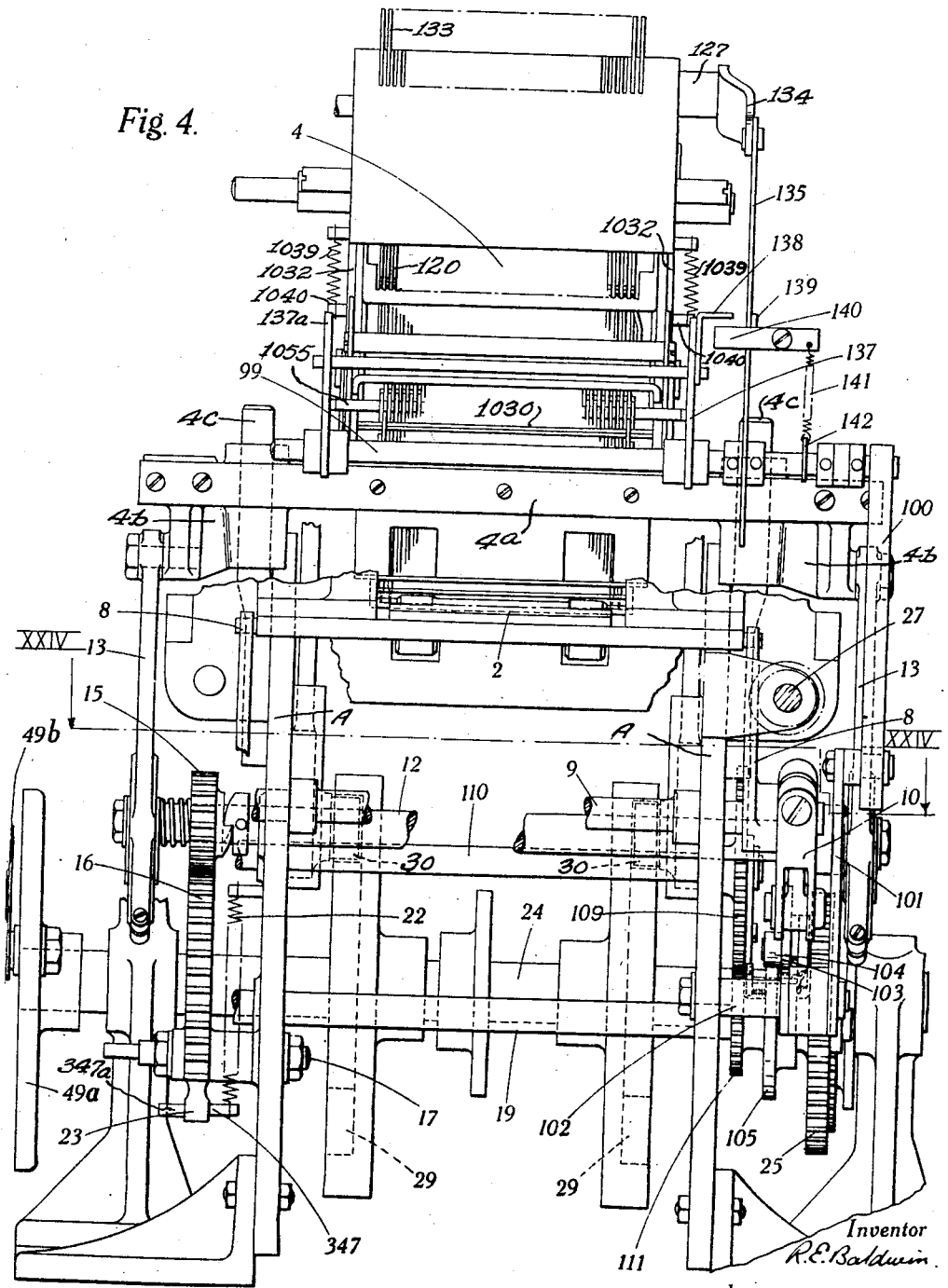
Figure 5:
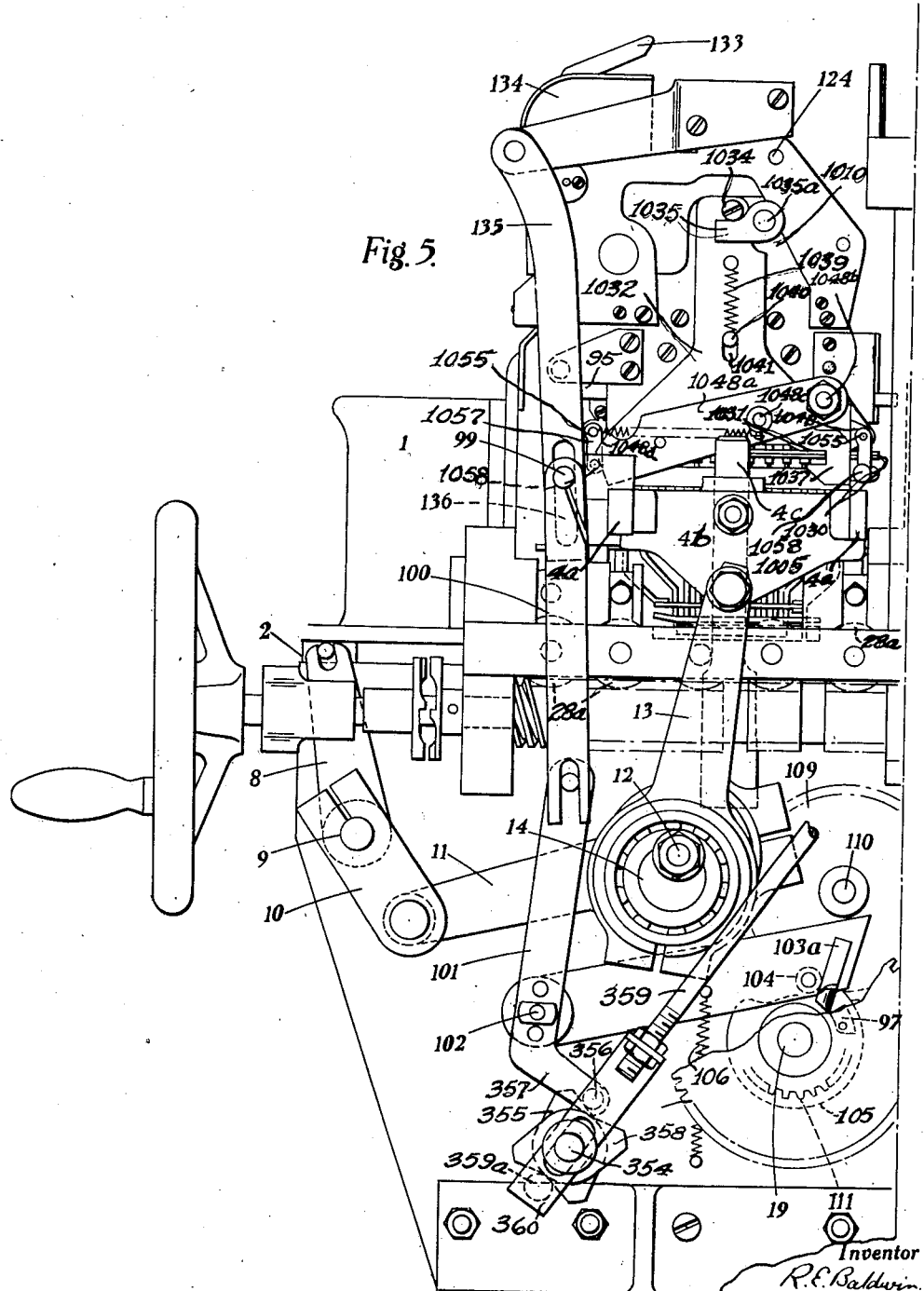
Figure 6:
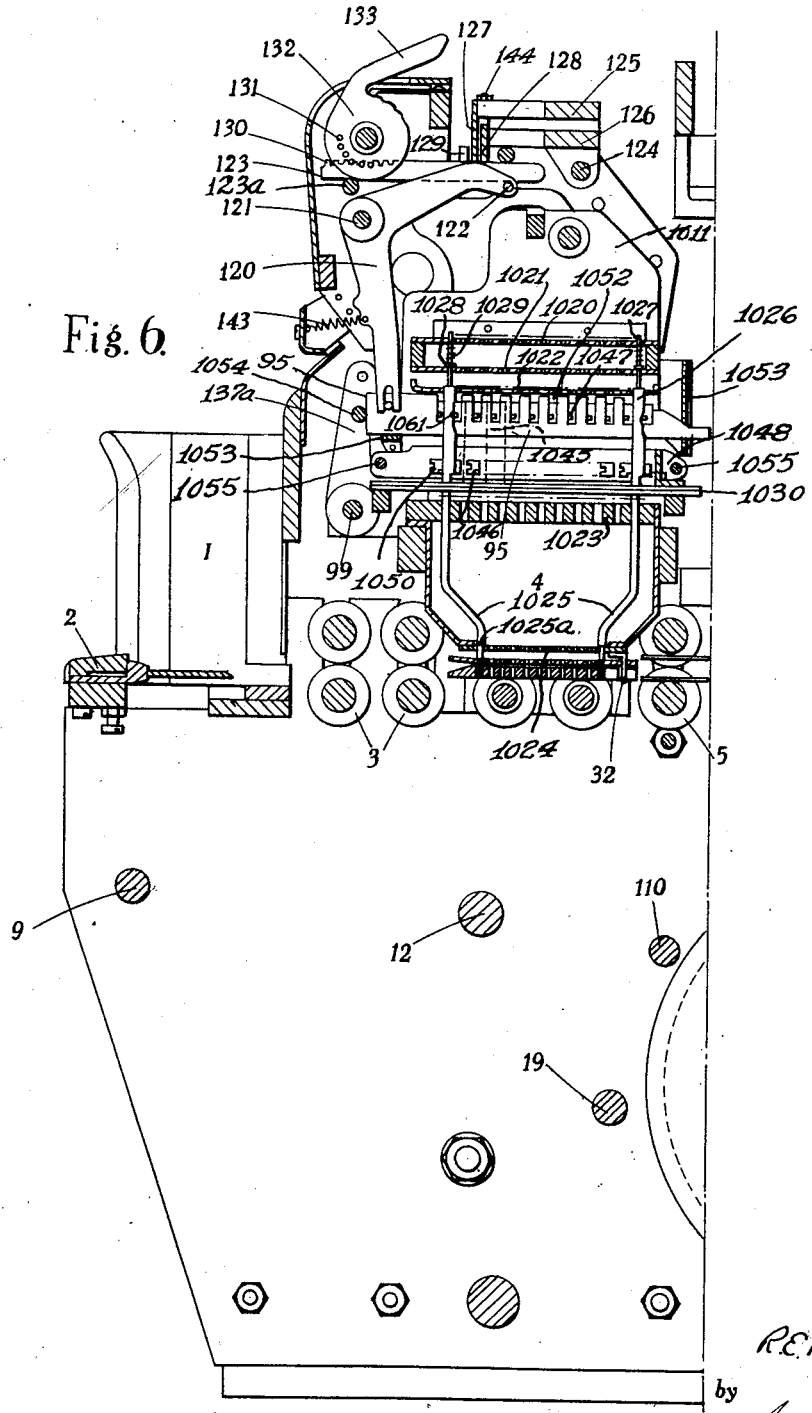
Figure 6A:
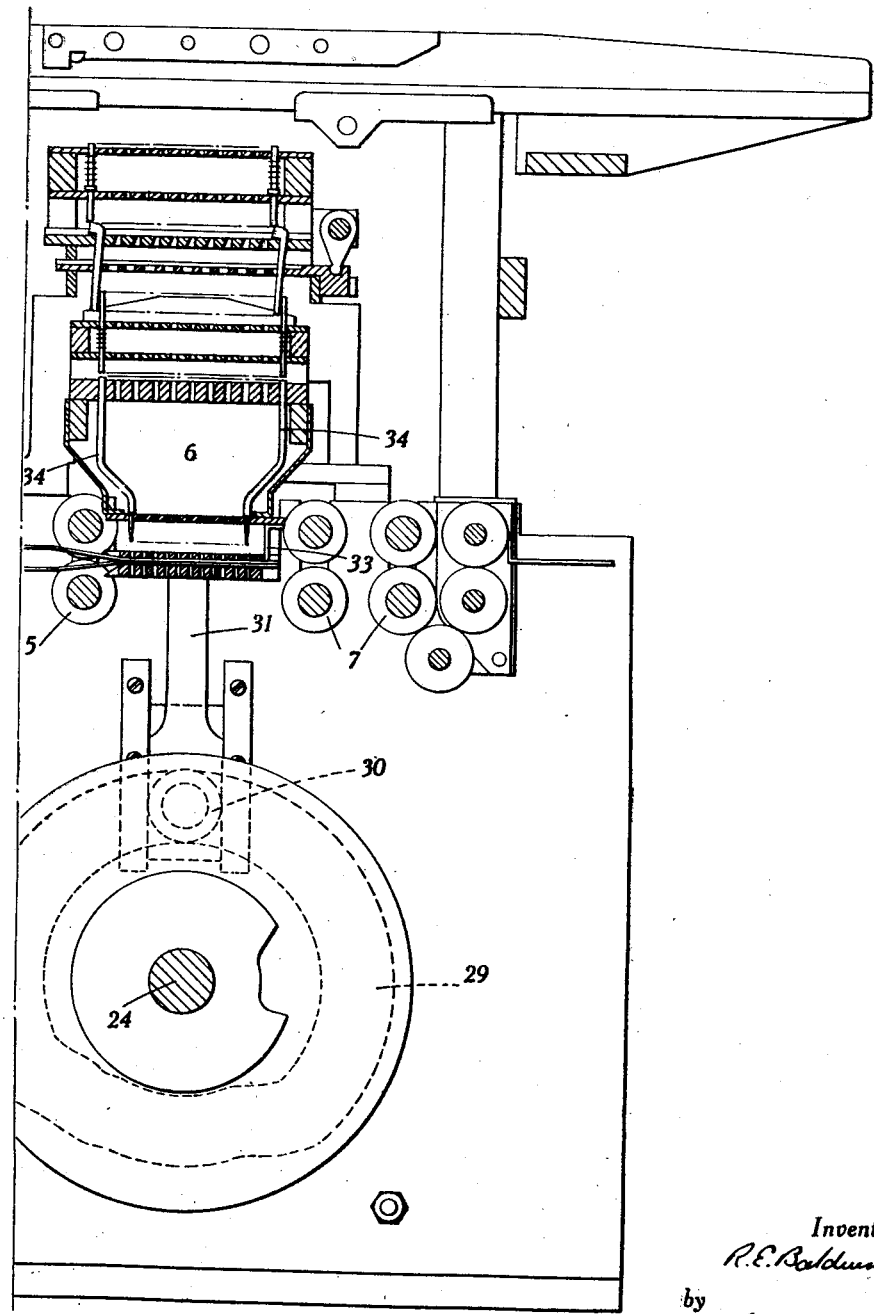
Figure 8A:
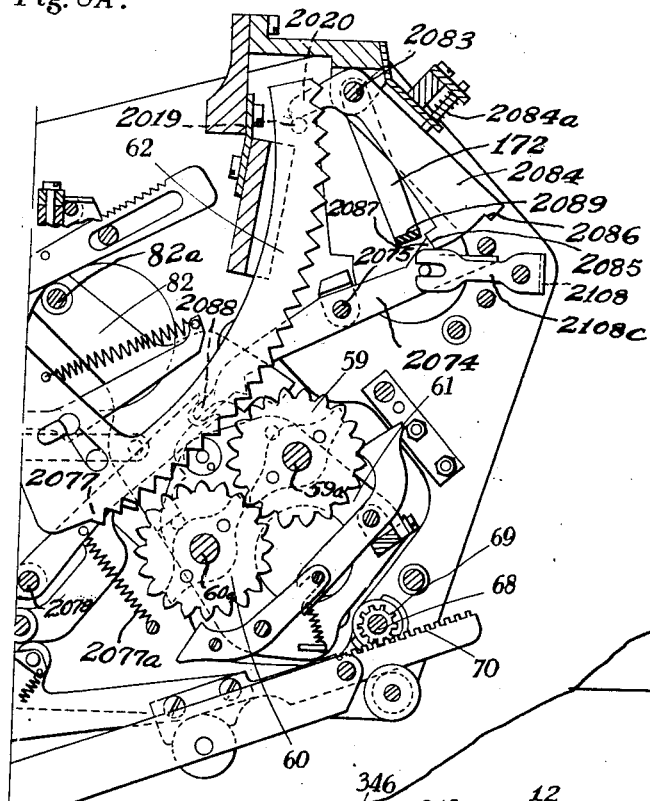
Figure 7:
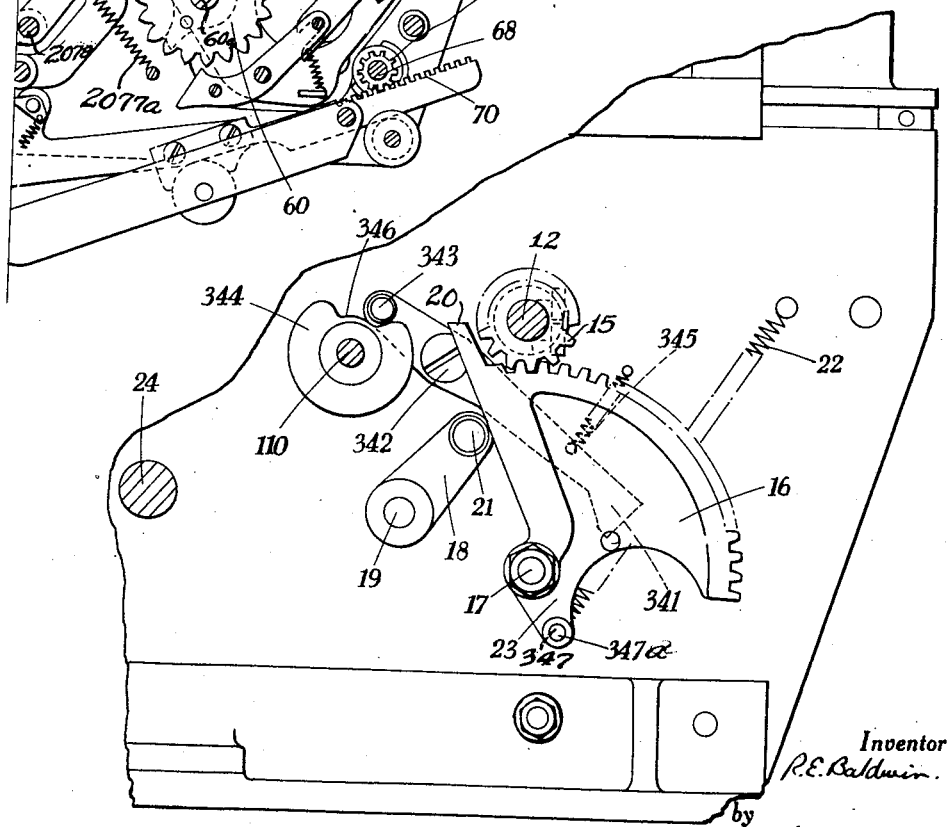
Figure 8:
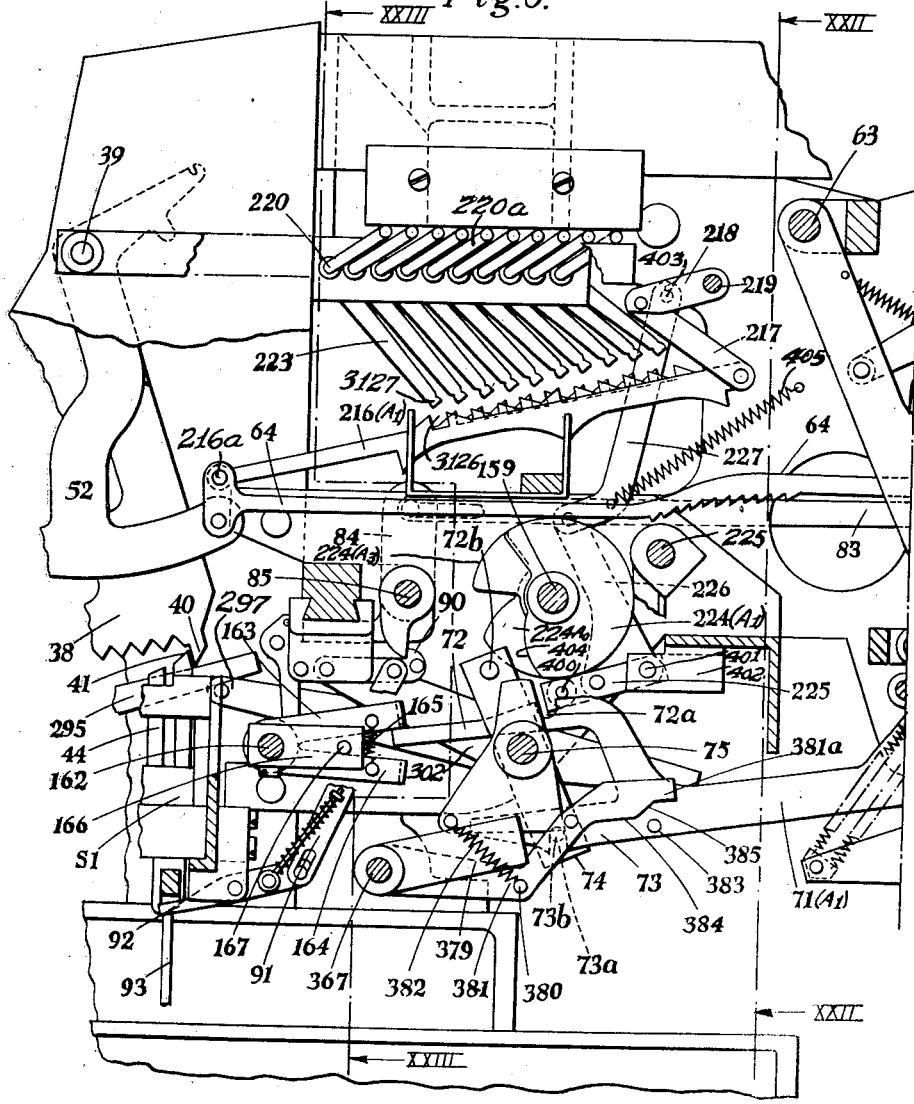
Figures 9, 14:
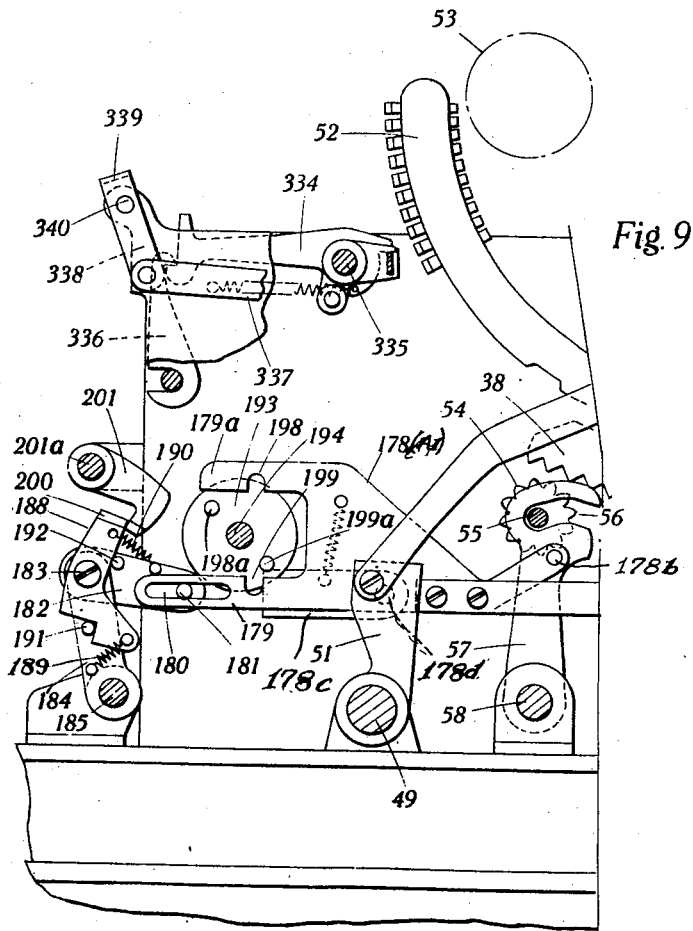
Figure 9A:
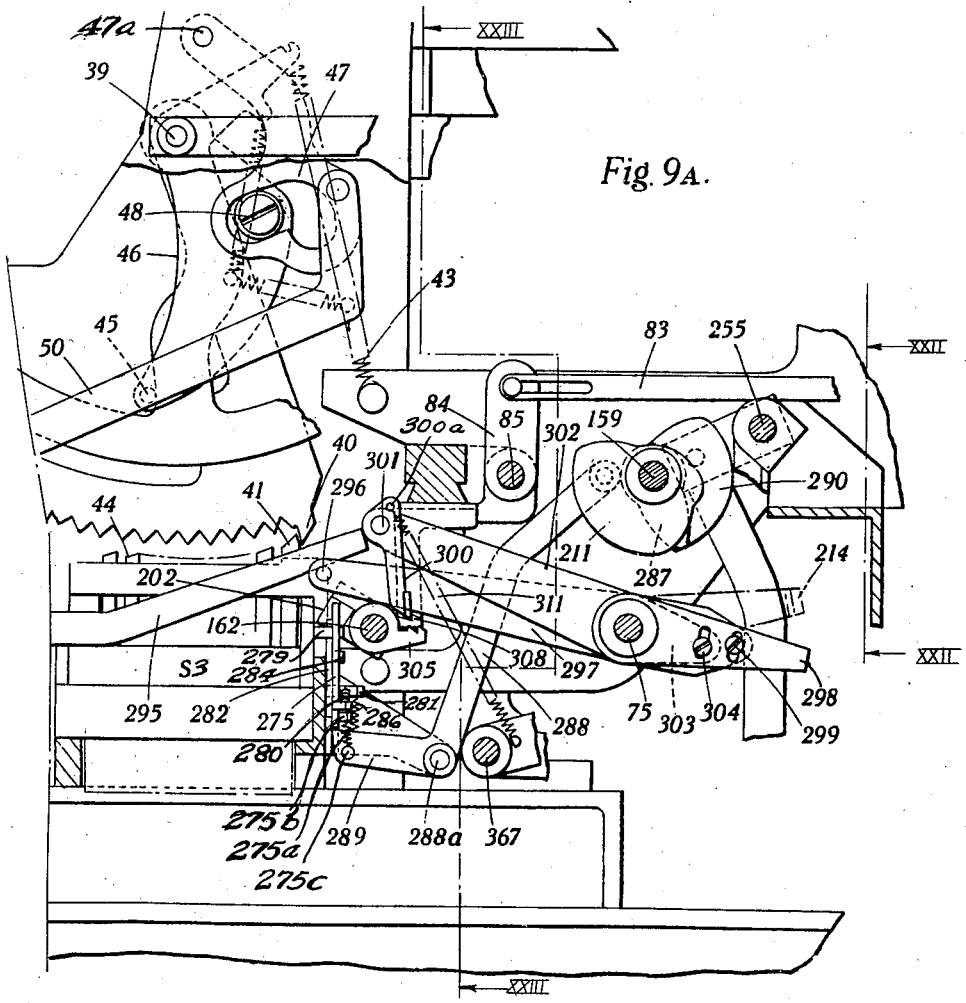
Figure 19:
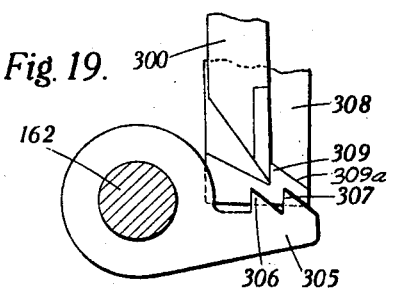
Figure 10:
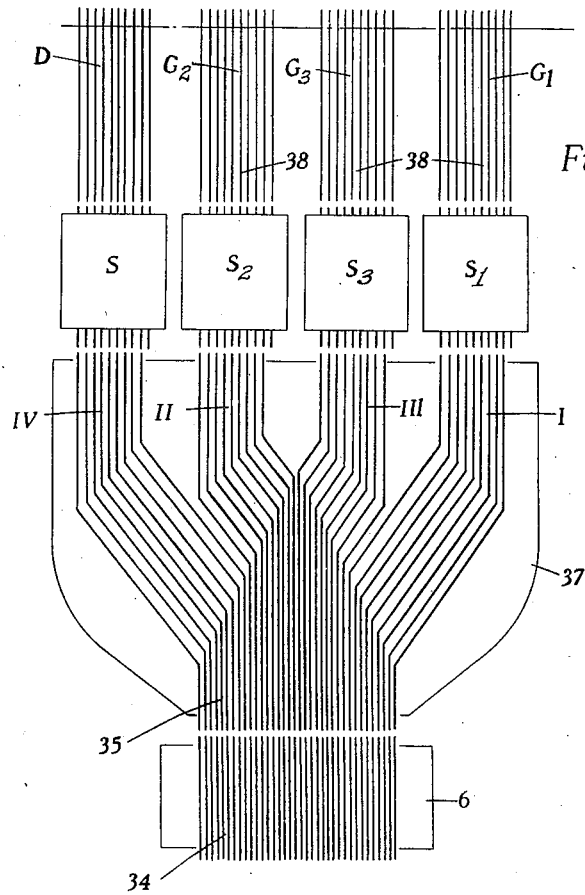
Figure 11:
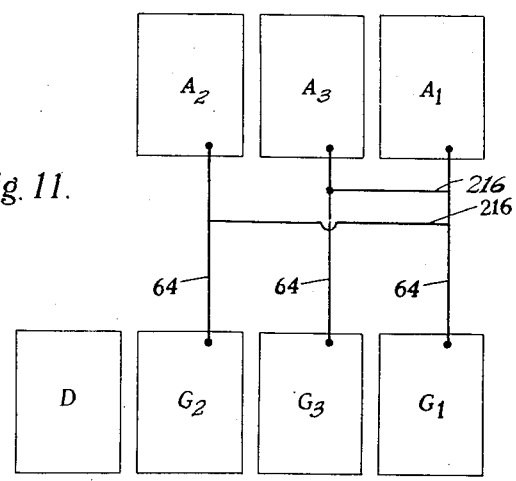
Figure 12:
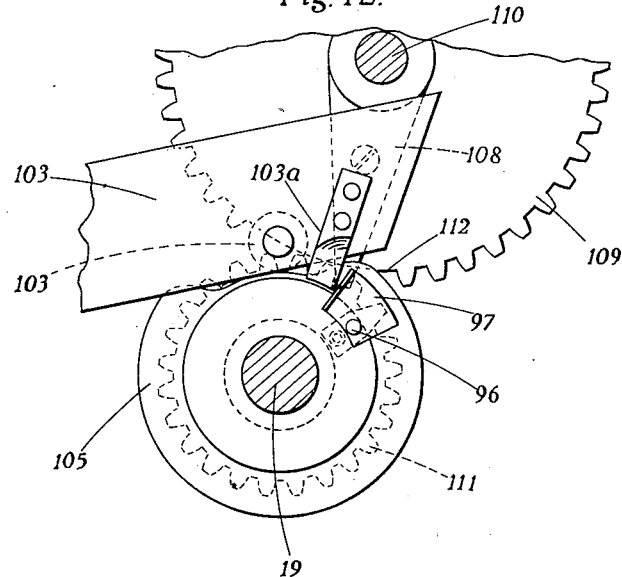
Figure 13:
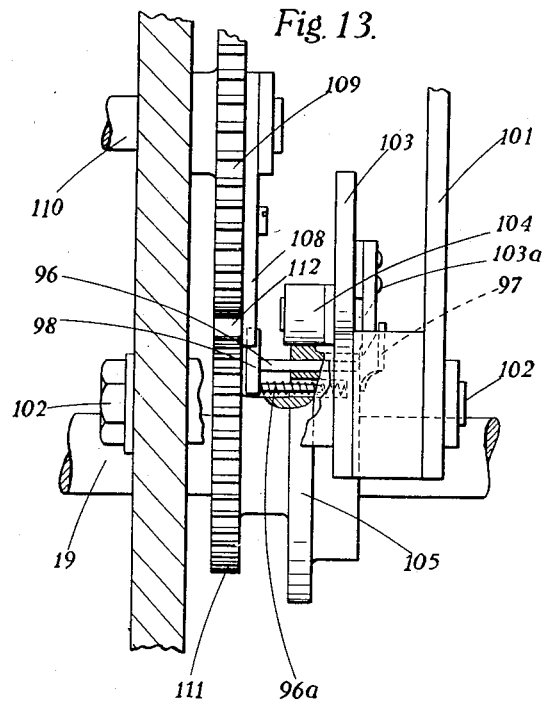
Figure 17:
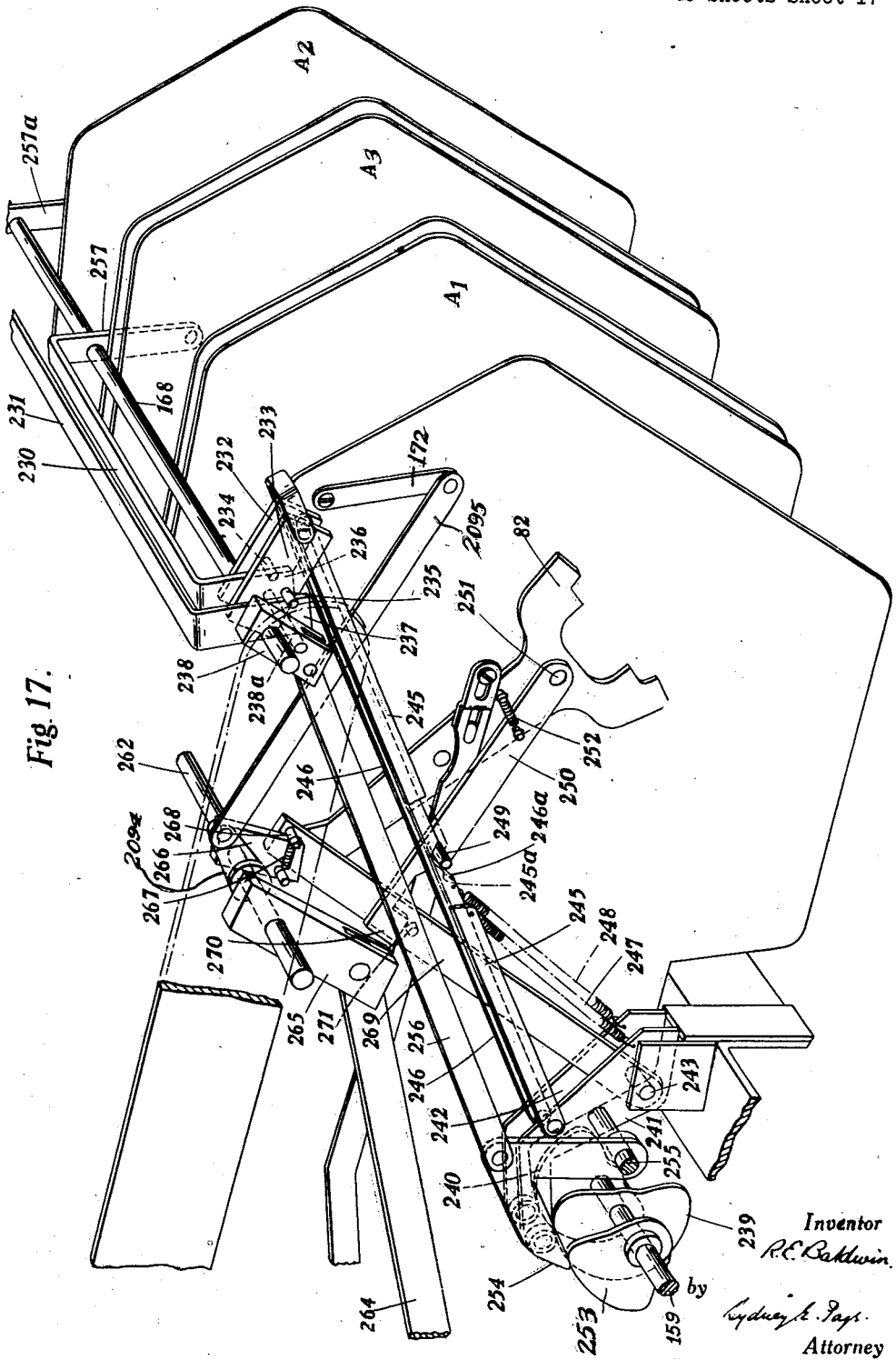
Figure 18:
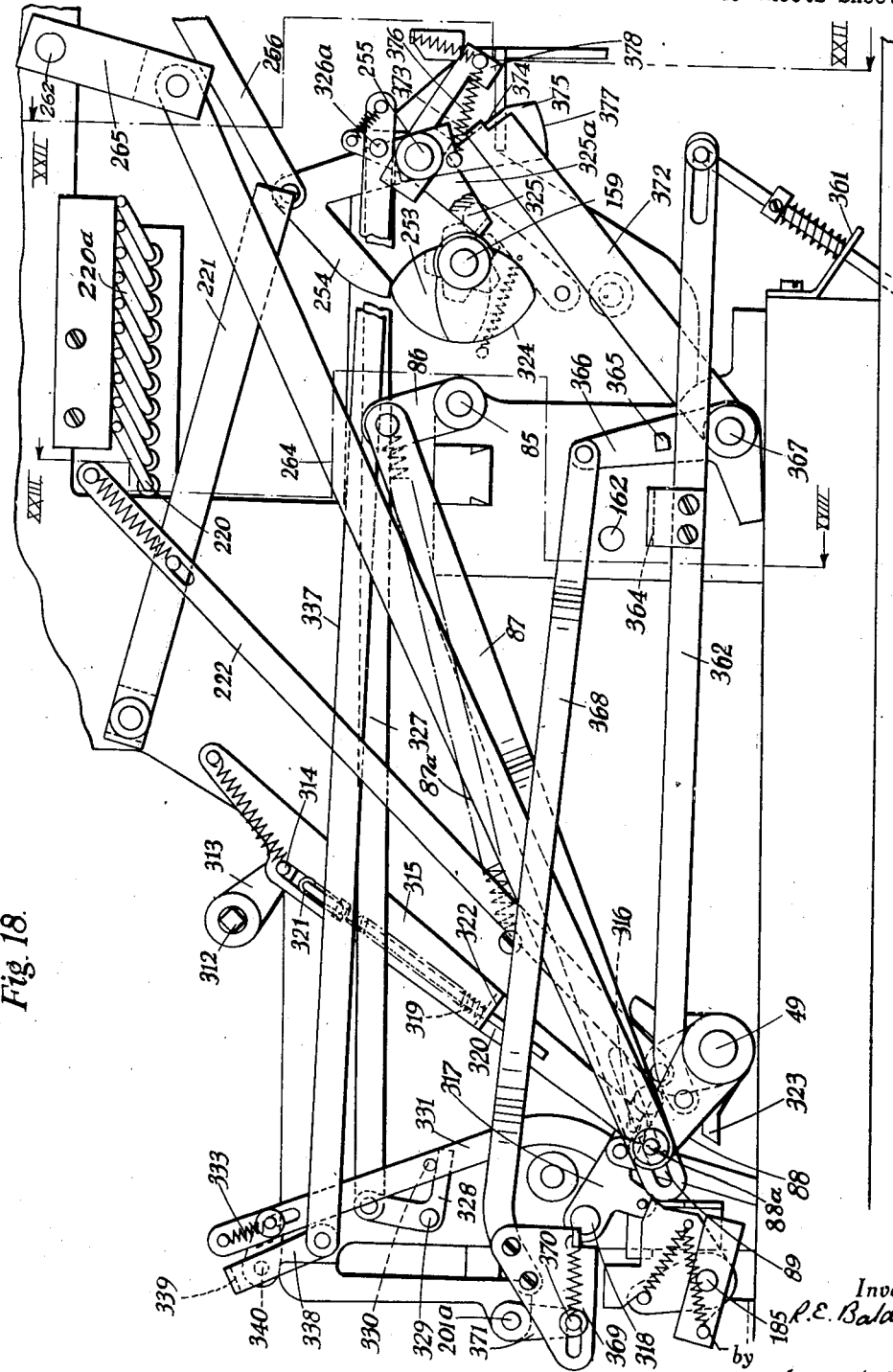
Figure 23A:
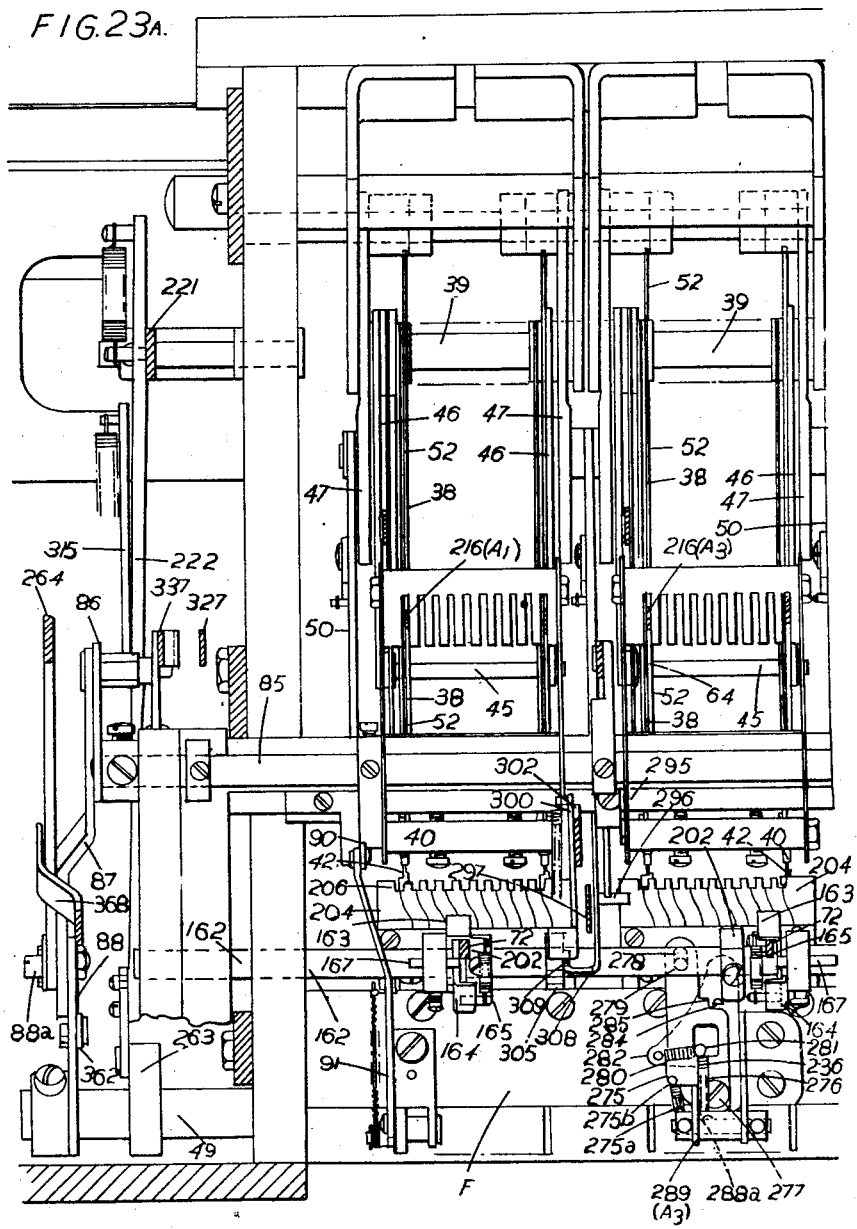
Figure 23B:
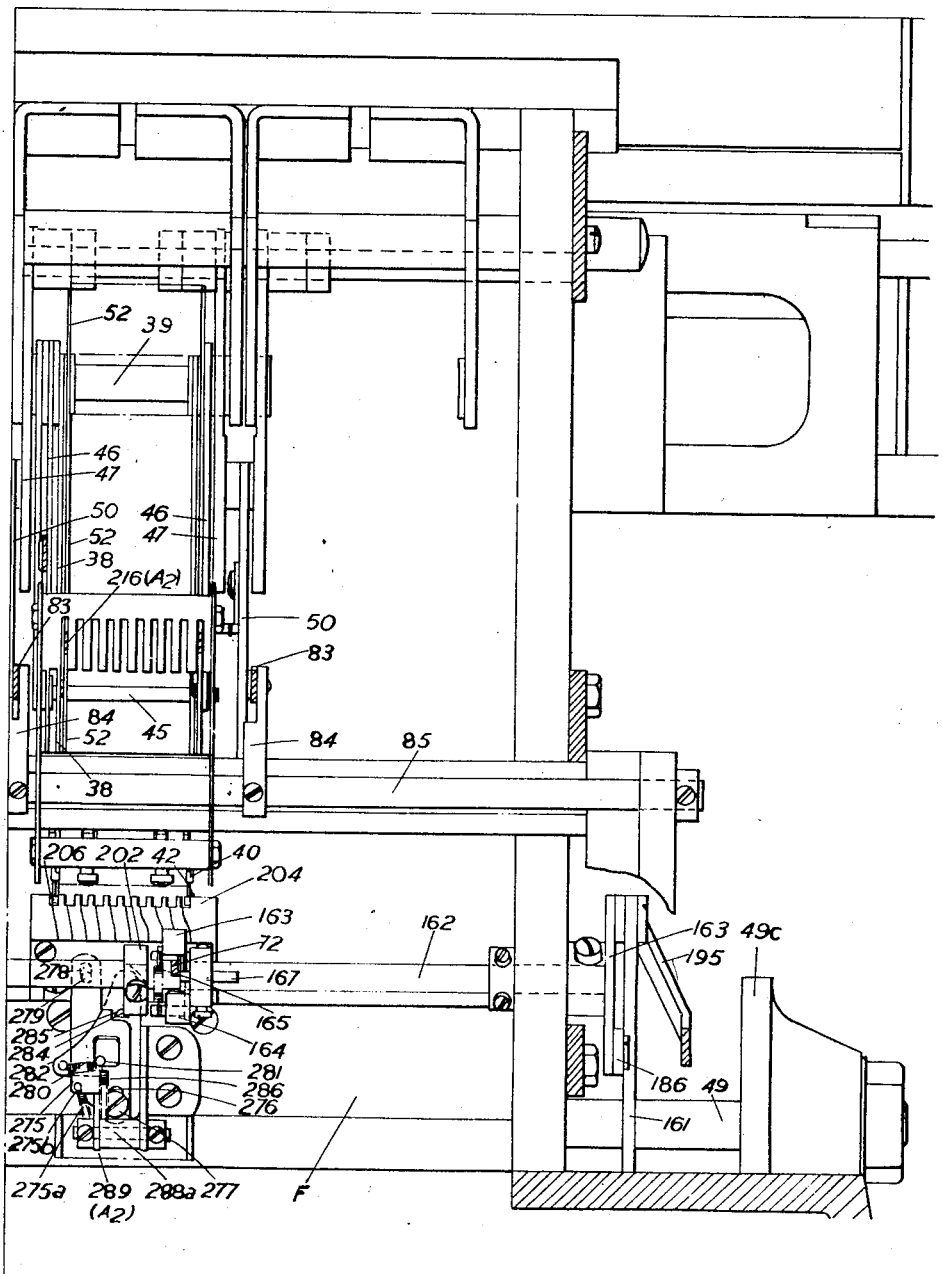
Figure 24B:
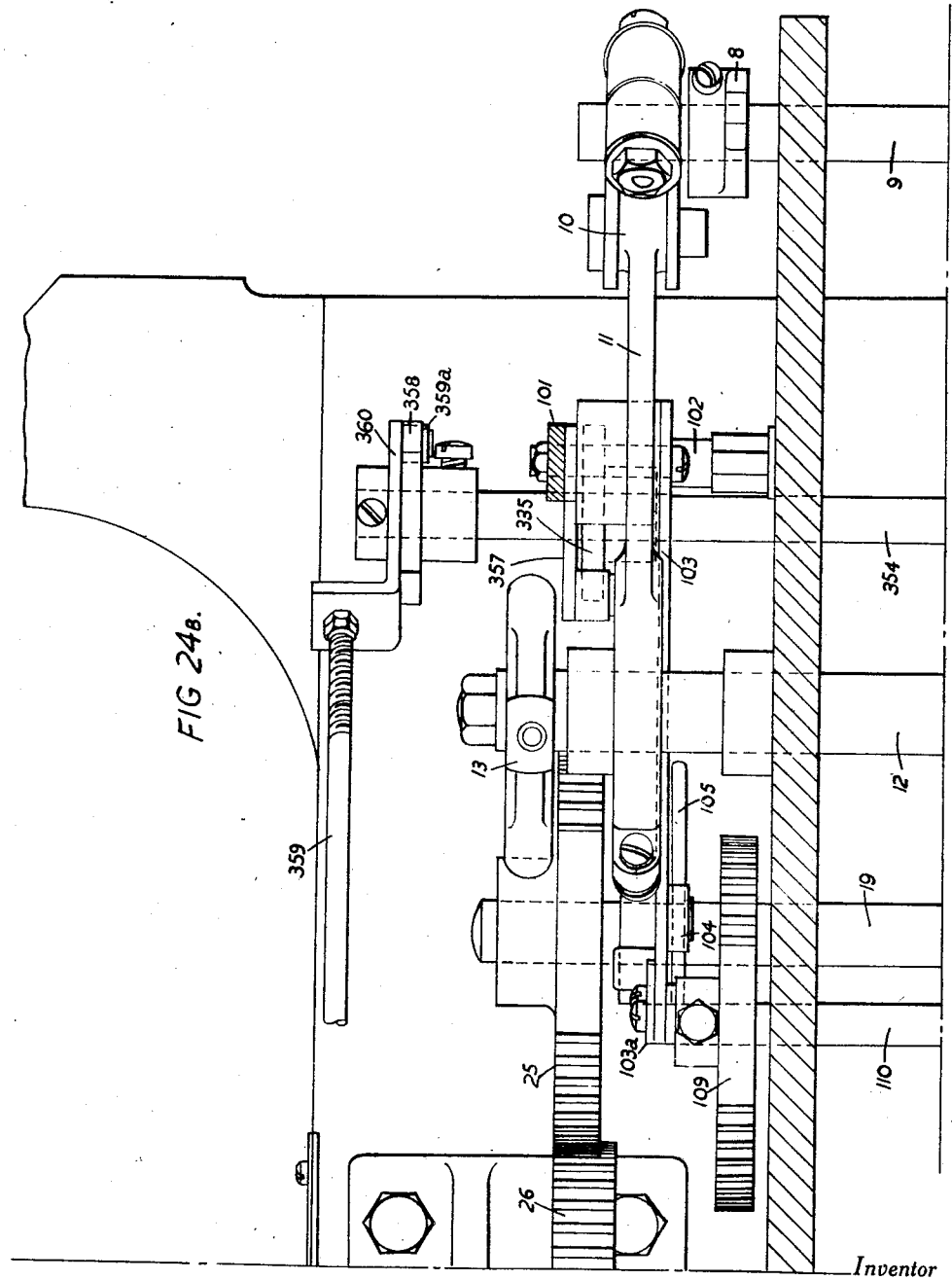
Figures 27, 30:
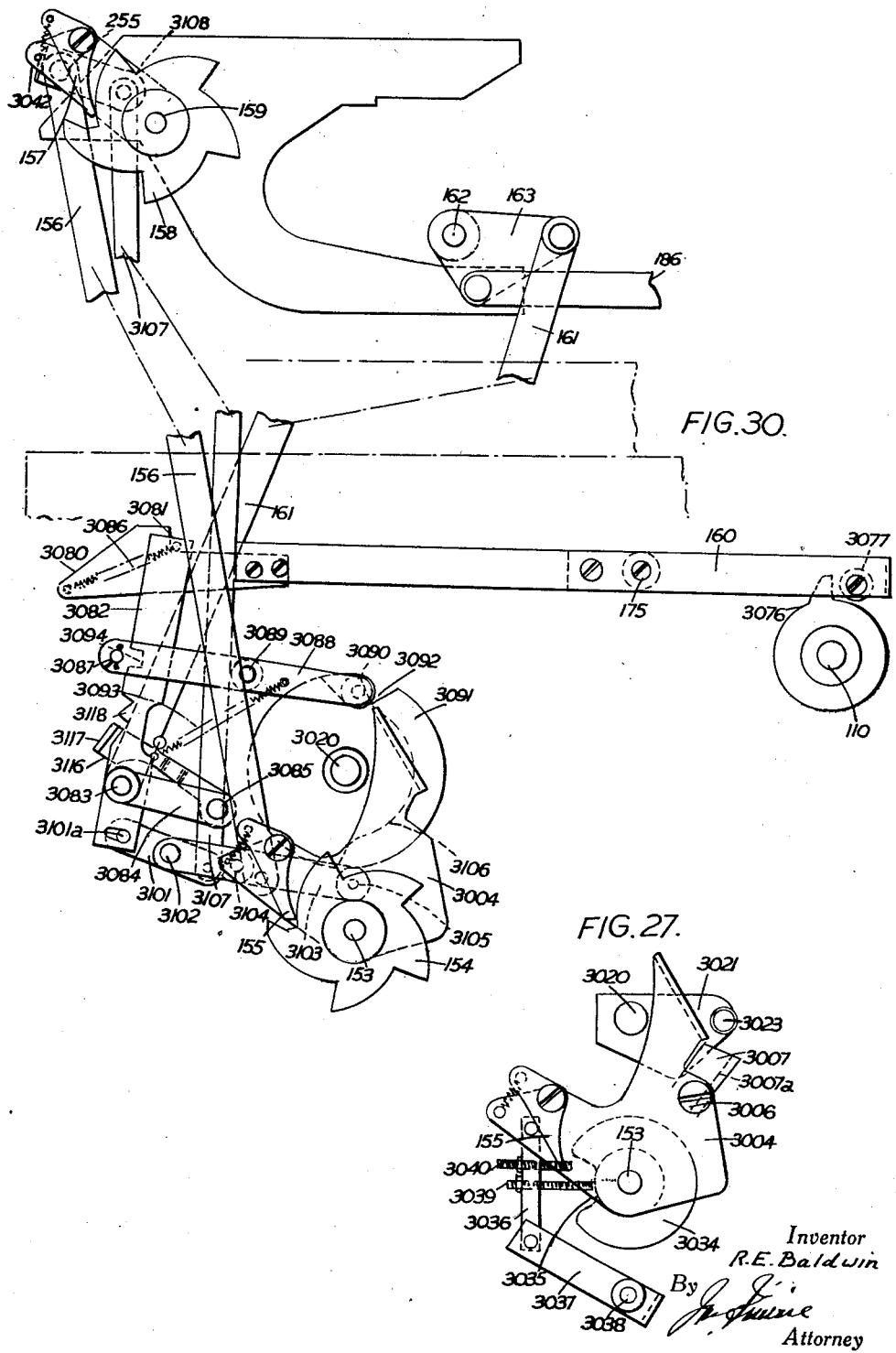
Figure 28:
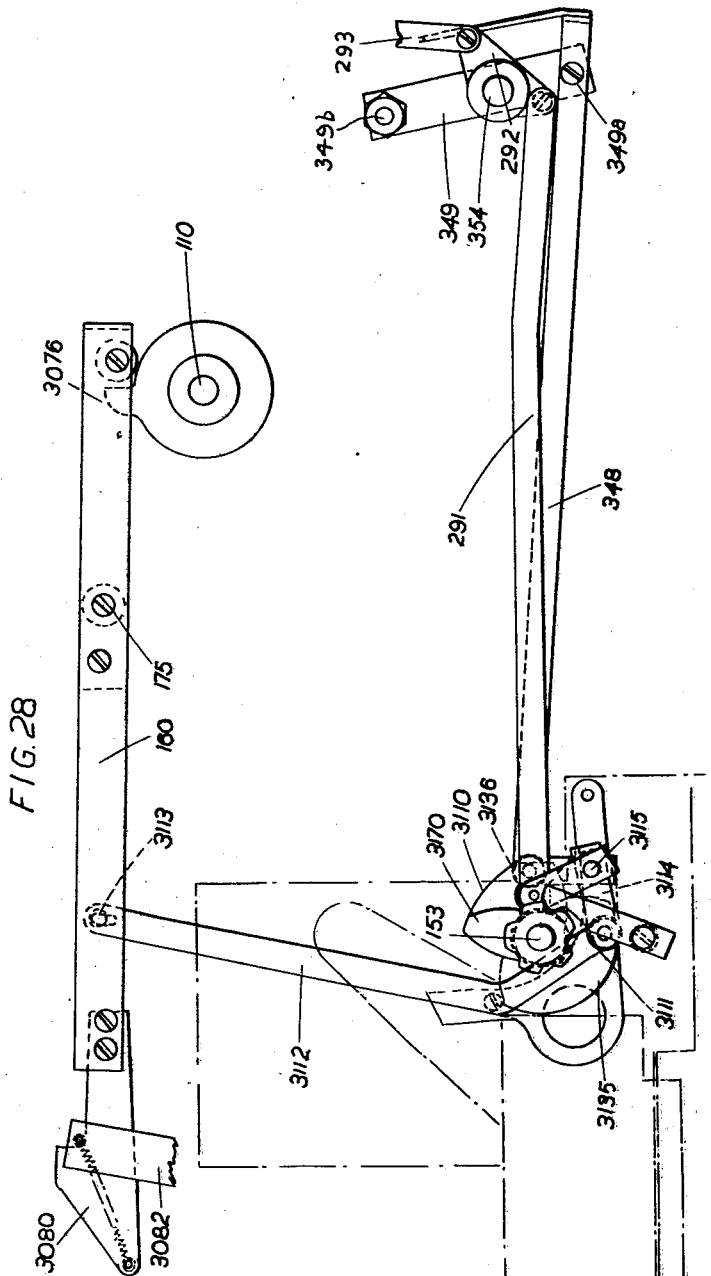
Figure 29:
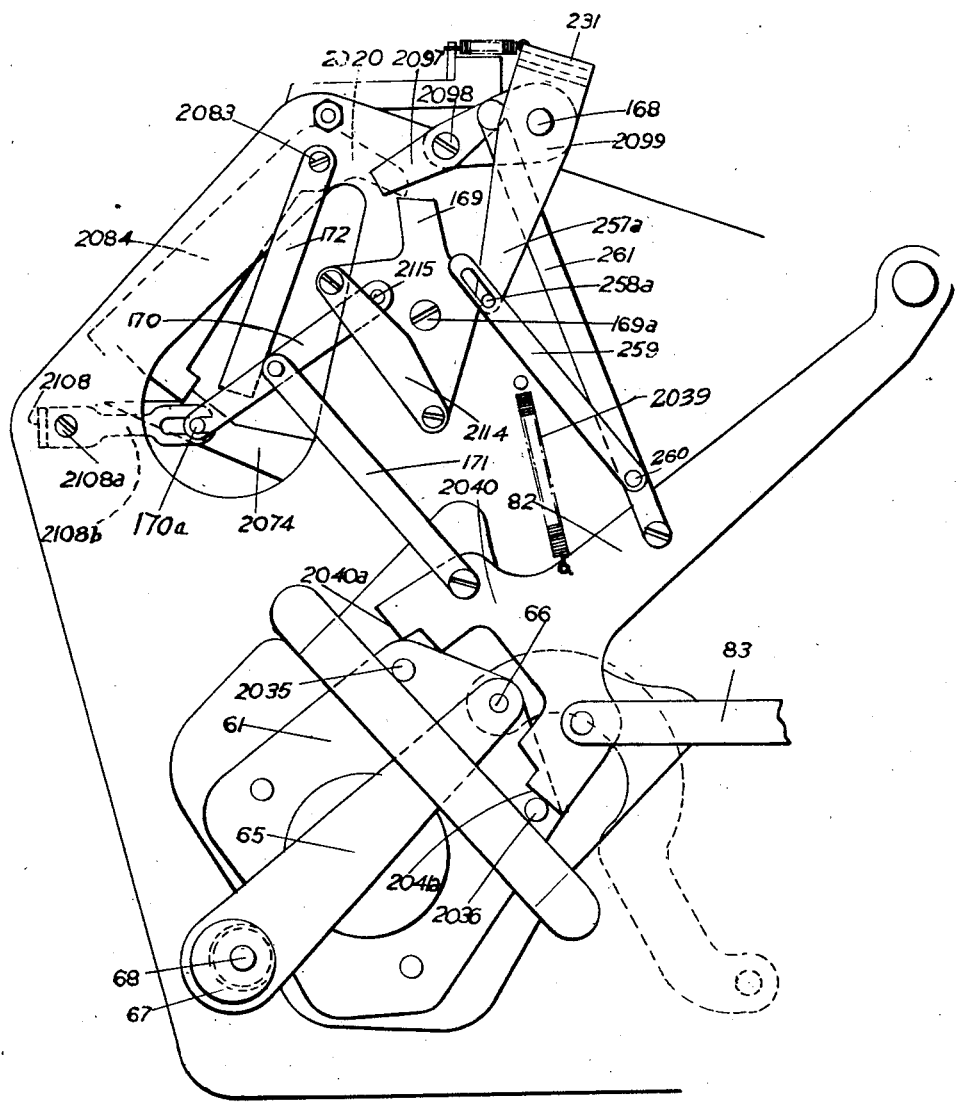
Figure 31:
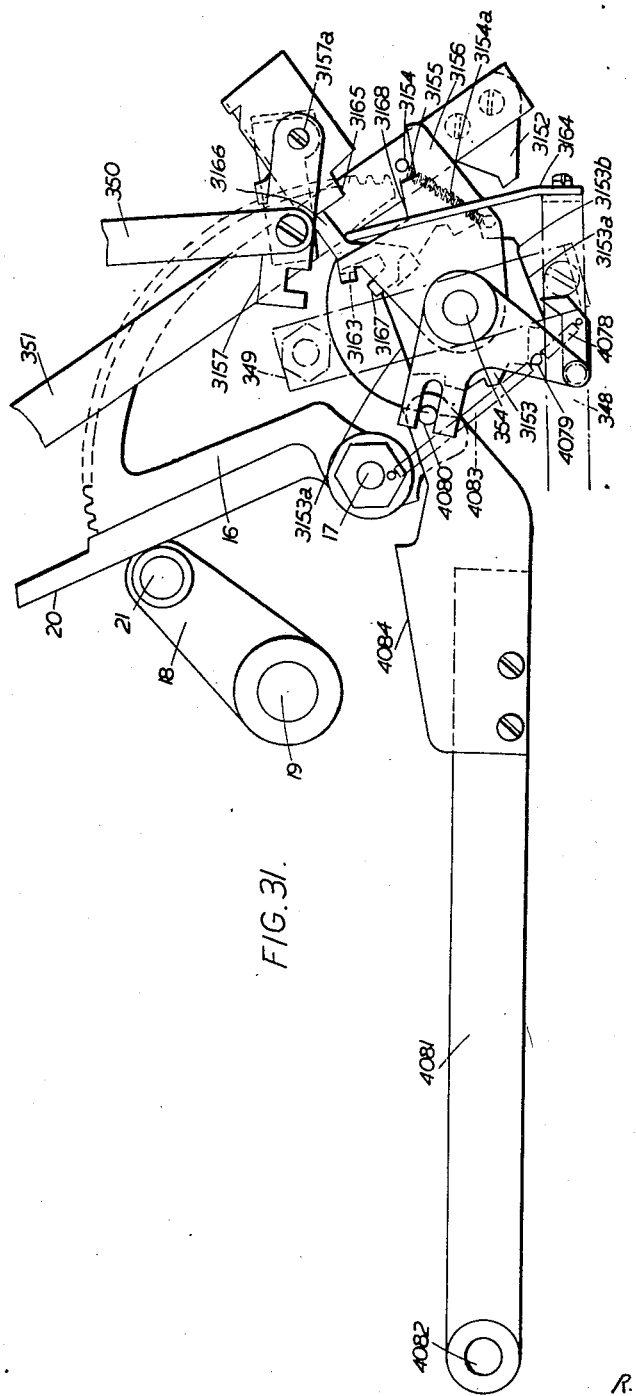
Figure 32:
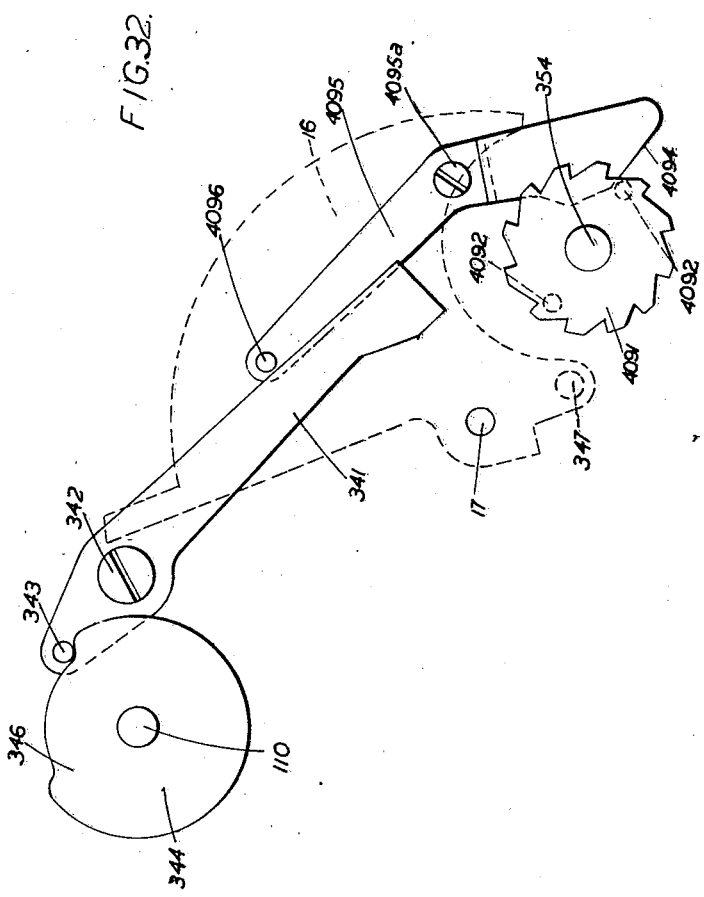

Fig. 4 is a front elevation of the base of the tabulator with the covers removed, Figs. 5 and 5A together form an elevation of the base mechanism looking at the right hand side, certain parts being omitted to show other parts behind them, Figs. 6 and 6A together form a sectional side elevation of the base of the tabulator, showing the arrangement of the pin boxes, Fig. 7 shows the driving and control mechanism for the card feed, Figs. 8 and 8A together constitute a section of the accumulator mechanism in the head of the tabulator, showing the receiving accumulator and part of its control mechanism, the section being taken on the line VIII—VIII of Fig. 22A and some parts being omitted to show others more clearly, Figs. 9 and 9A together constitute a section of the accumulator mechanism showing the grand total accumulator associated with the receiving accumulator, the section being taken on the line IX—IX of Fig. 22A, Fig. 10 is a diagrammatic front view showing the three grand total accumulators and the pin box, stop baskets and connection box, Fig. 11 is a diagrammatic plan showing the sub and grand total accumulators and the connections between them, Figs. 12 and 13 show on a larger scale part of the mechcanism for initiating a total taking operation, Fig. 14 shows the mechanism for controlling the nought stops of the receiving accumulator, Fig. 15 is an outside elevation of the receiving accumulator showing part of its control mechanism, Fig. 16 shows the mechanism for controlling the nought stops for one of the accumulators from which a total is transmitted to the receiving accumulator, being a sectional view on the line XV—XV of Fig. 22A, Fig. 17 illustrates in perspective the mechanism for setting the receiving accumulator to subtract when the total to be received is negative, Fig. 18 is an outside elevation of the right hand side of the head of the machine, the rear accumulators being omitted, Fig. 19 illustrates on an enlarged scale a detail of the mechanism shown in Fig. 9, Figs. 20A, 20B, 20C and 20D combined, show a plan of the tabulator, the sectors of the first and second front and rear accumulators being omitted to show parts beneath them, Fig. 21 is a diagram showing how Figs. 20A, 20B, 20C and 20D are to be combined, Figs. 22A and 22B combined show a vertical sectional rear elevation on the line indicated at XXII—XXII in Figs. 8, 9A, 15 and 18, Figs. 23A and 23B combined show a vertical sectional rear elevation on the line indicated at XXIII—XXIII on Figs. 8, 9A, 15 and 18, Figs. 24A, 24B, 24C and 24D combined show a sectional plan of the base mechanism on the line XXIV—XXIV of Fig. 4, the parts between the side plates A in Fig. 4 being omitted, Fig. 25 is a diagram showing how Figs. 24A, 24B, 24C and 24D are to be combined, Fig. 26 shows in elevation the clutch mechanism for starting the mechanism which controls the series of operations initiated by a change of designation, Fig. 27 shows the resetting mechanism for the clutch, Fig. 28 shows the cams for initiating the additional total taking operations required to effect transfer of a total from each of two accumulators to a receiving accumulator, the cam for arresting the card feed during these total taking operations and the cam for initiating the printing of the cross total, Fig. 29 illustrates the mechanism for conditioning the receiving accumulator to add or subtract in accordance with the sign of the total in a transmitting accumulator, Fig. 30 shows the mechanism which is actuated by the cam, shown in Fig. 28, for initiating the additional total taking operations, Fig. 31 shows the mechanism for initiating a grand total taking operation, Fig. 32 shows the mechanism for arresting the card feed preparatory to a grand total taking operation, Figs. 33 to 44 are respectively timing diagrams of twelve consecutive cycles of the machine illustrating the operations of the various cams and other parts involved when a main group designation change occurs.

In order to save repetition in the timing diagrams some of the parts are omitted in the diagrams of cycles in which such parts do not function.

In the construction shown in the drawings the machine comprises three rear algebraic accumulators $A_1$, $A_2$, $A_3$ (Fig. 11) of the kind described in British specification No. 405,666 and three corresponding front grand total accumulators $G_1$, $G_2$, $G_3$.

The cards are fed from the magazine 1 by a picker 2 (Figure 6) and feed rolls 3 to a designation sensing pin box 4 from which they are fed by feed rolls 5 to an item sensing pin box 6 from which they are discharged by feed rolls 7.

The picker 2 is operated by arms 8 (Figures 4 and 5) secured to a shaft 9 to which is also secured an arm 10 connected to an eccentric rod 11 actuated by an eccentric on a shaft 12.

The designation pin box 4 has been in use for many years and its construction is generally the same as that described in U. S. patent specification No. 1,661,684, issued to Arthur Thomas March 6, 1928. Consequently it will only be briefly described herein.

The pin box comprises two side plates one 1010, shown in Fig. 5, and the other 1011 shown in Fig. 6. Running transversely of these side plates, and secured thereto by conventional fixing means, is a number of horizontal plates 1020, 1021, 1022, 1023 and 1024, which are perforated to receive the sensing pins, which are composed of three parts, the lower 1025, the intermediate 1026, and the upper 1027. The lower pins 1025 are shouldered at 1025a to rest on the plate 1024 while their upper portions are guided in the plate 1023. The intermediate pins 1026 have reduced portions at their lower ends, and rest upon the upper ends of the lower pins 1025. These intermediate pins are guided at their upper ends in the perforations in plate 1022 and at their lower ends in corresponding perforations in a resetting plate 1030, hereinafter described.

The upper pins 1027 are guided in the two plates 1020 and 1021 and are provided with flanges 1028 which are pressed by springs 1029 on to the plate 1021. These pins 1027 also press the pins 1025 and 1026 downwards.

Outside the two side plates 1010, and 1011 are two vertically reciprocable lifting plates 1032 (Figs. 4 and 5) having guide slots 1041 engaging guide pins 1040 projecting from the respective side plates. Each lifting plate 1032 is provided with a pin 1034 engaged by a lever 1035 secured to a shaft 1035a having attached to it an operating arm 1035b (Fig. 1) having a pin-in-slot connection to a resetting link 1141. At its lower end link 1141 is pivoted to a lever 1140 which is pivoted to the machine frame at 1140a and is rocked by a cam 1138 (Fig. 24D) secured to the total shaft 110.

The cam 1138, lever 1140 and link 1141 operate to lift the plates 1032 against the action of springs 1039, in the same manner as the cam 138, lever 140 and link 141 operate to lift the plates 32 described in U. S. specification No. 1,661,684.

The lower portion of each plate 1032 is triangular in shape and the two corners are provided with inwardly projecting teeth 1037 which are situated just below projections 1031 on the plate 1030 whereby when the lifting plates 1032 are raised, the plate 1030 is also raised.

Resting on the plate 1030, are a number of registering elements 1045 (Fig. 6), all of which are identical, formed by strips of metal provided with projections 1046 and 1047, which extend horizontally between the intermediate sensing pins 1026, there being one registering element for each sensing pin 1026. The registering elements and the sensing pins are parallel to one another and are arranged collaterally in rows. Between the registering elements 1045 and the sensing pins 1026 of each row, a locking bar 1048, and a testing bar 95, are placed. The locking bars 1048 are provided with a number of slots each formed with a nose 1050, which cooperate with the projections 1046. The bars 1048 are joined together by common rods 1055 while the testing bars 95 are provided with a number of vertical slots 1052 which cooperate with the projections 1047. The bars 95 slide horizontally upon guides 1053.

The locking bars 1048 are pivoted at each end to levers 1057 (Fig. 5) pivoted at their lower ends 1058 to the pin box frame and outside each lifting plate 1032 is a cam plate 1048a pivoted to the respective side plate 1010, 1011 at 1048b and also at 1048c to the adjacent lifting plate 1032. As each lifting plate rises, it rocks the associated cam plate 1048a upwardly about the relatively fixed pivot 1048b, whereby the cam face 1048d engages the common rod 1055 and pushes all the locking bars 1048 to the left in Fig. 6 thus unlocking the registering elements 1045.

The intermediate pins 1026 are provided with slots 1061, which cooperate with the projections 1047 such that when the bars 95 are moved to the left of Fig. 6 the projections 1047 are pulled into the slots 1061, the registering elements 1045 rocking about their bottom edges to permit this action.

The designation pin box 4 is supported on two cross bars 4a connected at their ends by castings 4b mounted to slide on vertical posts 4c fixed to the side plates A of the base of the machine.

The pin box 4 is reciprocated on the posts 4c by means of connecting rods 13 driven by means of eccentrics 14 secured to the shaft 12.

The mechanism for driving the shaft 12 is also described in U. S. specification No. 1,661,684, and includes a pinion 15 free on the shaft 12 and meshing with a quadrant 16 mounted on a shaft 17. The pinion 15 is connected to the shaft 12 by a one-way drive as described in the aforesaid prior specification, so that the movement of the quadrant 16 in a clockwise direction in Figure 7 only serves to drive the shaft 12, the movement of the quadrant in the counterclockwise direction serving merely to rotate the pinion 15 idly on the shaft.

The quadrant is actuated by an arm 18 secured to a shaft 19 (Figs. 5 and 7) and engaging with an arm 20 on the quadrant which is maintained in contact with a roller 21 on the arm 18 by means of a spring 22 secured to a lug 23 on the quadrant.

The shaft 19 is rotated from the tabulator main shaft 24 by means of gear wheels 25, 26 (Figures 5 and 24B) and the main shaft 24 is itself driven from a worm shaft 27 through gear wheels 28 and the wheel 26. The worm shaft 27 engages with small worm wheels 28a (Figs. 5 and 5A) associated with the different pairs of feed rolls for the purpose of driving them.

As is well known the designation field of each card is read by the designation pin box 4 and the field or fields of the cards containing data or item perforations are sensed by a separate pin box indicated generally at 6, this item sensing pin box 6 being disposed relatively to the designation pin box 4 so that the card is sensed by the pin box 6 one cycle or revolution of the main shaft 24 later than it is sensed by the pin box 4.

The item sensing pin box 6 is constructed in the manner described in British specification No. 401,012 and is reciprocated by cams 29 on the main shaft 24 (Figures 4 and 6A) with which engage rollers 30 carried on arms 31 depending from the frame of the pin box 6.

Each of the pin boxes 4 and 6 is provided with a card stop in the known manner, the card stop for the pin box 4 being shown at 32, while the card stop for the pin box 6 is shown at 33.

Figure 3:
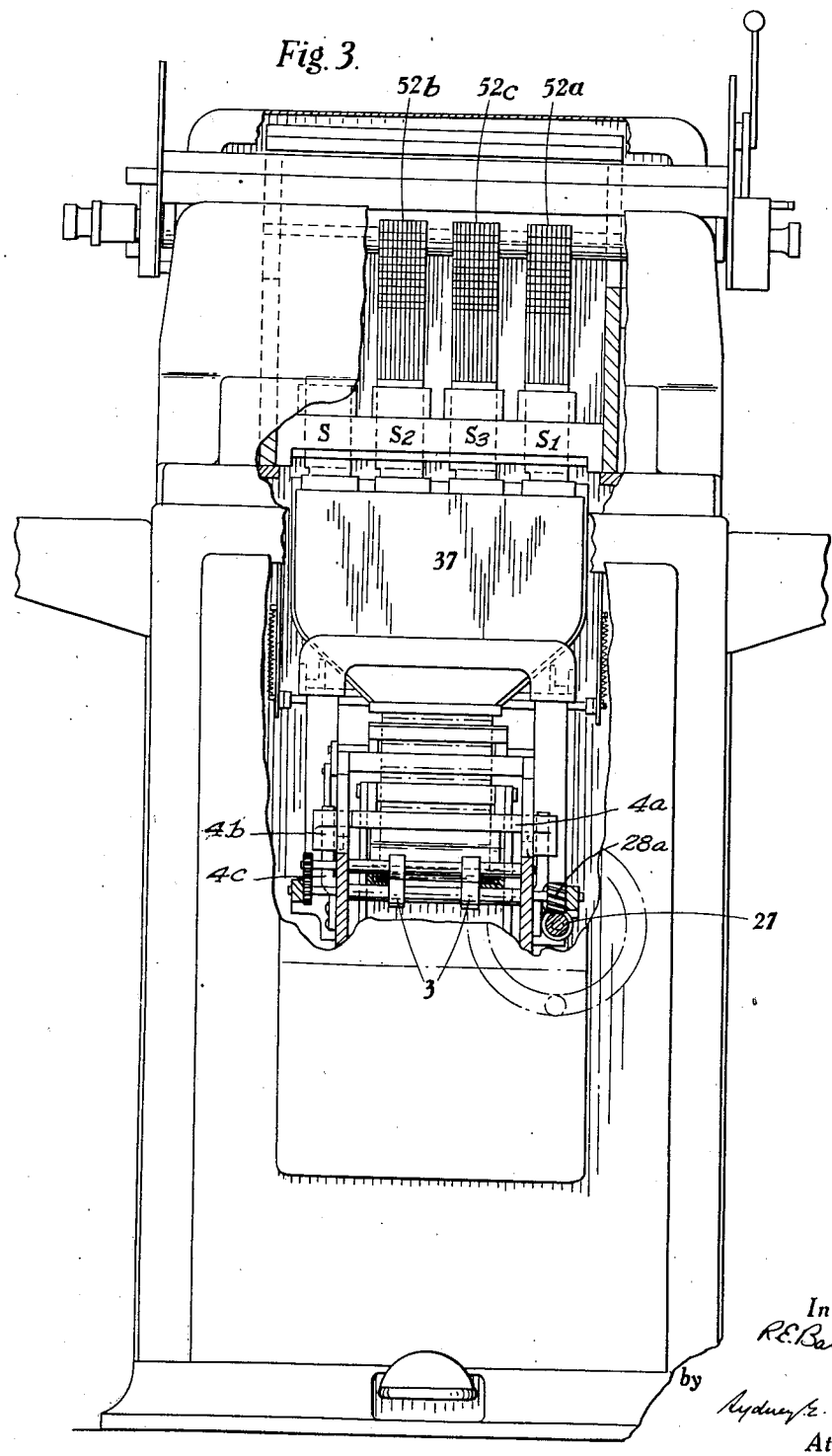
Fig. 3 is a front elevation of the tabulator.

The sensing pins 34 in the item sensing pin box 6 actuate connection wires 35 mounted in a connection box 37 of usual form (Figs. 3 and 10). The connection wires 35 are divided into four groups indicated by the Roman numerals I, II, III, IV, there being one group for each of four separate fields on the cards. Of these groups, group IV is associated with the designation field of the card and the other ends of the wires 35 in group IV are disposed below the stops in a stop basket S, of which the stops serve to set the sectors of a unit D serving to print the designation from each card.

Groups I, II, and III of the connection wires 35 are associated with three data fields on the card, these data fields being provided with perforations representing monetary values, and the three groups I, II and III respectively, set the stops in three stop baskets $S_1$, $S_2$, $S_3$. With each of these stop baskets is associated a separate adding mechanism, the construction and operation of which will be described later.

The construction of the stop baskets is well known and will not be described in detail. It is sufficient to say that in each basket there is a plurality of columns of stops, each column having ten stops, except the pence denomination, which has twelve.

Associated with each column of stops is a toothed sector 38 (Fig. 9) pivoted on a shaft 39 running transversely of the machine frame. Each sector has a heel 40 which is normally in engagement with a nought stop 41 carried on a shutter 42, pivoted at each end to the front and rear frames of the stop basket. When any of the stops 44 is raised the shutter 42 is rocked sideways, moving the nought stop 41 clear of the heel 40, whereupon the sector 38 is permitted to spring forward under the action of a spring 43.

By this means the sector is set in accordance with the value of the stop which was raised in the associated column of stops 44.

The sectors 38 after having been arrested by the stops 44 are returned to zero by means of a restoring bar 45 carried on arms 46, pivoted on the shaft 39. The arms 46 are swung to and fro by means of cam plates 47 pivoted to the machine frame at 47a and engaging with rolls 48 on the arms 46 and rocked by a shaft 49 through a link 50 and an arm 51.

The shaft 49 is rocked at each revolution of the main shaft 24 by means of a crank disc 49a (Figs. 1 and 4) on the shaft 24 which is connected by a link 49b to an arm 49c on the shaft 49.

Each toothed sector 38 operates in the well known manner a corresponding type sector 52, also pivoted on the shaft 39, with which co-operates a print hammer 334 to print the digit to which the type sector 52 is set on a sheet of paper which passes round a platen 53 and is fed step by step by a usual form of paper feed mechanism, operated from a shaft 312 (Fig. 18).

There are three groups of toothed sectors 38, one group for each of the stop baskets $S_1$, $S_2$, $S_3$, and the type sectors associated with the three groups of toothed sectors are indicated at 52a, 52b and 52c in Figure 3.

Associated with each group of sectors 38 is a grand total accumulator, G1, G2, G3 respectively (Figs. 10 and 11), comprising a series of toothed wheels 54 (Fig. 9), one wheel for each of the sectors 38. These accumulator wheels 54 serve to accumulated grand totals and are mounted freely on a shaft 55 which is carried in cam slots 56 in arms 57, of which only one is shown, these arms being pivoted on a shaft 58.

Associated with each of the accumulators 54 is a rear algebraic accumulator A1, A2, A3, respectively (Fig. 11) which is of the kind described in British specification No. 405,666. Each algebraic accumulator serves to accumulate sub-totals and comprises denominational pairs of registering wheels 59 and 60 (Fig. 8A) the wheel 59 being for addition and the wheel 60 for subtraction. The wheels 59 and 60 are constantly in mesh with one another and are mounted on shafts 59a and 60a in a cradle 61, which is the same as the cradle 21 described in British specification No. 405,666. Associated with each pair of registering wheels 59, 60 is a toothed actuating sector 62 pivoted to the machine frame at 63 and connected by a link 64 to the corresponding denominational type carrier 52, thus the amount to which any type sector 52 is set is transmitted through the connecting link 64 to the corresponding toothed sector 62 in the rear algebraic accumulator, so that the sector 62 is set to the same amount and can transfer it to the wheels 59 or the wheels 60 in accordance with whether the amount is positive or negative.

After the sectors 62 have been set from a card, the cradle 61 is moved to bring the positive or negative wheels 59 or 60 into engagement with the sectors 62 to receive the amount read from the card. If the amount was positive the wheels 59 would engage with the sectors 62, whereas if it was negative the wheels 60 would engage with the sectors 62.

Figure 2:
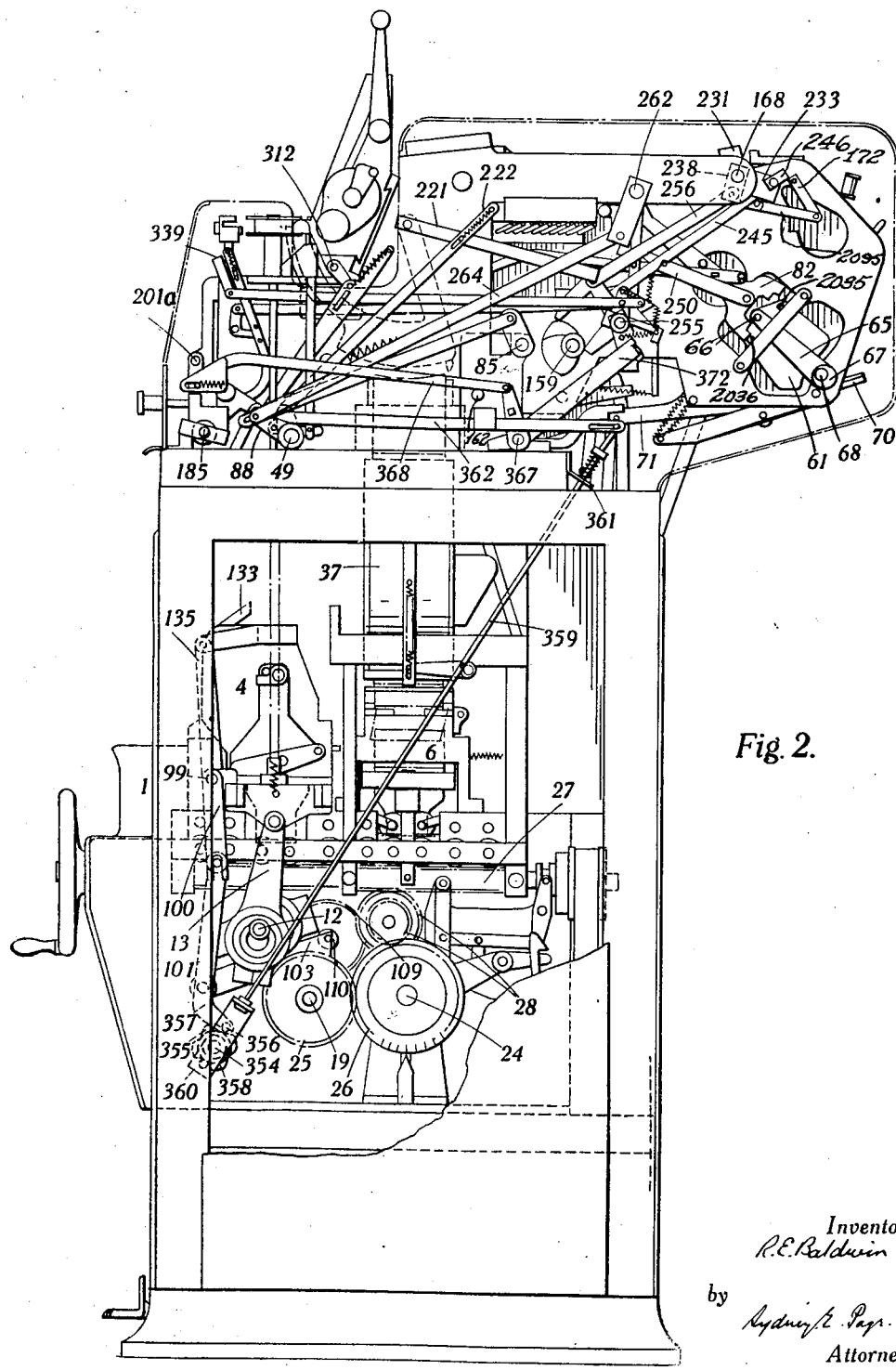
Fig. 2 is an outside elevation of the tabulator looking at the right hand side.

In order to move the cradle for the purpose of causing engagement of the registering wheels with the sectors 62, a link 65 is pivoted to the cradle at 66 (Fig. 2) and the lower end of this link engages an eccentric 67 on a shaft 68 to which is secured a pinion 69 engaging with a rack 70. The rack 70 is secured to a control link 71 (Fig. 8) of which the left-hand end is forked, having two arms 72 and 73; the upper arm 72 has a recess 72a and the lower arm has a recess 73a, these recesses co-operating, in the manner about to be described, with pins 72b and 73b, respectively, on a double armed lever 74 secured to an operating shaft 75 (Fig. 8).

In the position shown in Figs. 8 and 8A the lower recess 73a is in engagement with the lower pin 73b and in this position the machine is set for accumulating items from the cards. The shaft 75 is rocked counterclockwise into the position shown in Figs. 8 and 8A, from 14° to 40° in each cycle and rocks clockwise out of the position shown in Figs. 8 and 8A from 198° to 230° in each cycle. The clockwise rocking of the shaft pulls the link 71 to the left, whereby the pinion 69 is rotated clockwise and by means of the eccentric 67 and link 65 pushes the cradle 61 towards the sectors 62 thereby effecting engagement of the positive wheels 59 or negative wheels 60 therewith.

The three grand total accumulators each comprising adding wheels 54 and sectors 38 are shown diagrammatically at G1, G2, G3, in Figures 10 and 11, while the three rear sub-total accumulators each including the wheels 59, 60 and sectors 62 are shown diagrammatically at A1, A2, A3 in those figures.

It may be pointed out that there is a separate restoring bar 45 for the sectors 38 of each accumulator G1, G2, G3 and each restoring bar is actuated from an arm 51 on the shaft 49 through a link 50.

It may here be explained with reference to the timing diagrams of Figs. 33 to 44 that at 0° in each cycle or revolution of the tabulator main shaft 24 in which an item is entered into the wheels 59 or 60 the wheels 59 or 60 are in engagement with their sectors 62 and the wheels 54 are out of engagement with their sectors 38.

When the main shaft commences to revolve the shaft 75 rocks counter-clockwise into the position shown in Figure 8 thereby bringing the wheels 59 or 60 out of engagement with the sectors 62. The wheels 59 or 60 commence to disengage from the sectors 62 at 14° and are completely disengaged at 40°. The sectors 62 move forward from the zero position at 68° to take a setting from the stops and reach the nine position at 132° and the shaft 75 then rocks clockwise thereby pulling the link 71 to the left in Figure 8 whereby the wheels 59 or 60 are engaged with the sectors 62 this engagement being completed at 230°. The latter are then returned to normal position whereby the amount to which they were set is transferred to the wheels 59 or 60.

During these operations the wheels 54 of the grand total accumulators remain out of engagement with the sectors 38 as will be explained later.

In order to cause the wheels 59 or 60 to yield their total the link 71 is raised by mechanism which will be explained later, this rise of link 71 occurring at 10° in the total cycle. When the link 71 is raised the upper edge of the arm 72 comes to rest against the upper pin 72b. Then when the shaft 75 rocks counter-clockwise the pin 72b slides along the upper edge of the arm 72 until at the end of the counter-clockwise movement of shaft 75 the recess 72a comes into register with the pin 72b and then rises under spring action to effect engagement of pin 72b and recess 72a.

During this operation the link 71 does not move longitudinally and the wheels 59 or 60 remain in engagement with their sectors 62. At the same time, as will be explained later the nought stops 41 are withdrawn thereby releasing the sectors 38 and 62 to the action of their springs so that the sectors 62 swing forward (to the left in Figure 8A) until arrested in the well known manner by the wheels 59 or 60 arriving at zero. By this means the total held in the wheels 59 or 60 is transferred to the sectors 62 and thence to the type members 52 for printing.

When the shaft 75 rocks back in the clockwise direction the pin 72b being in engagement with the recess 72a pushes the link 71 to the right thereby moving the wheels 59 or 60 out of engagement with the sectors 62 before the latter are restored to normal so that the wheels are left at zero. This disengagement occurs at 230° and the restoring bar 45 commences to restore the sectors at 234°.

The shaft 75 is rocked at each machine cycle by a track cam formed in a toothed wheel 77 secured to a shaft 3920 and driven by a toothed wheel 78 on the main shaft 24, the wheels 77 and 78 providing a 1 to 1 speed ratio. Engaging with the track cam is a roller on the lower end of a link 80 connected to an arm 81 secured to the shaft 75.

In order to determine whether the positive wheels 59 or the negative wheels 60 shall engage with the sectors 62 an abutment member 82 (Figs. 8A, 20A and 29) is provided on each side of the cradle 61, which is the same as the abutment member 38 described in British specification No. 405,666.

The abutment members 82 are connected by a rod 82a and are normally held by a spring 2039 (Fig. 29) in the positive position (Fig. 8A) in which they cause engagement of the positive wheels 59 with the sectors 62.

If the abutment member is in the normal position shown in Figs. 8A and 29 then the stud 2036 will be held against the shoulder 2041a of the abutment member while the shoulder 2040a will be in a position in which the stud 2035 can enter a recess cut in the arm 2040 of the abutment member.

Thus, when the cradle 61 is moved it tilts about the stud 2036 as a pivot and the positive wheels 59 are engaged with the sectors so that when the sectors are zeroised the amounts they hold are transferred to these wheels.

If, on the other hand, the abutment is moved against the action of its spring in an anti-clockwise direction (in the manner hereafter described) the shoulder 2040a will bear on the stud 2035 and the stud 2036 will be free to rise when the cradle 61 is moved so that the cradle will tilt about the stud 2035 as a centre and the negative wheels 60 will be engaged with the sectors.

When amounts are being accumulated in the registering wheels by transference to them from the sectors 62, the positioning of the abutment member 82 is controlled by mechanism operated by a sensing pin (not shown) in pin box 6 passing through a hole punched in a particular position in a card fed into the sensing mechanism of the tabulator.

When cards bearing items which are to be added are passed through the machine it is required that the abutment member 82 shall remain in its normal position as determined by the action of the spring. On the other hand when cards bearing items which are to be subtracted are passed through the machine it is necessary to move the abutment member over into its other position against the action of the spring.

The left hand abutment member 82 is connected by a link 83 to an arm 84 on a shaft 85 (Figs. 8 and 18) carrying another arm 86 (Fig. 18) connected by a link 87 to an arm 88 on the shaft 49. The link 87 is slotted at 89 and is urged by a spring 87a to the left in Fig. 18. Thus at each machine operation the shaft 85 tends to rock, but is normally prevented from rocking by a latch 90.

The latch 90 is connected by a link 91 to a lever 92 which is raised by a connection wire 93 when a debit hole in a card is sensed, each card bearing a negative amount having this debit hole punched in it. Accordingly when a negative card is sensed the wire 93 is raised and releases the latch 90 thereby permitting the shaft 85 to rock counterclockwise in Fig. 8 whereby the abutment 82 is pulled over to the left into the negative position and causes the negative wheels 60 to engage with the sectors 62. The shaft 85 is restored by a pin 88a on the arm 88 which engages the right hand end of the slot 89 as the shaft 49 rocks clockwise.

In the present machine a total taking operation is initiated by a change in group designation. In order to detect a change in group designation, the designation pin box 4 already described is provided.

Pivoted to each of the testing bars 95 is one arm of a bell crank 120 (Fig. 6) pivoted to the pin box frame at 121 and the other arm of each bell crank carries a pin 122 underlying a slide 123. There is thus a bell crank 120 and slide 123 for each column of the pin box.

Pivoted to the pin box frame at 124 are two castings 125 and 126 of which the casting 125 is associated with sub-group totals and the casting 126 with grand totals. Each casting carries a depending bar 127, 128 running longitudinally thereof and each slide 123 has a lug 129 and is provided with rack teeth 130 with which engage pins 131 on a disc 132 having an operating handle 133. The teeth 130 are maintained in engagement with the pins 131 by a guide rod 123a.

By raising the castings 125 and 126 and turning the appropriate disc 132 any desired slide 123 can be moved to bring its lug 129 beneath the bar 127 or the bar 128 or clear of both bars.

In order to raise the castings 125 and 126 a handle 147 (Fig. 1) is pivoted to the frame at 148 and also at 145 to an extension 146 of the casting 126.

The casting 125 associated with sub-group totals is provided with an extension 134 to which is pivoted a link 135 (Fig. 5) guided by means of a slot 136 engaging over a shaft 99. Secured to the shaft 99 is an arm 137 having a lug 138 and attached to the link 135 is a bracket 139 to which is pivoted a lever 140 (Fig. 4). The lever 140 is held normally horizontal against a stop (not shown) by a spring 141 connected to an anchor member 142 on the shaft 99.

As long as the designation on successive cards remains the same the testing bars 95 are free to move in the manner described in U. S. specification No. 1,661,684, the motive force for each bar being a spring 143 connected to the associated bell crank 120. Consequently all the bell cranks 120 are free to move clockwise and the pins 122 which they carry move down relatively to the pin box frame. Hence the castings 125 and 126 not only move down bodily with the pin box frame but also rock counterclockwise (Fig. 6) relatively to the pin box frame as the latter descends.

As the casting 125 thus moves down the link 135 moves down with it and brings the lever 140 below the level of the lug 138 on the arm 137. Consequently movement of the arm 137 is unobstructed.

Secured to the shaft 99 is a testing lever 100, (Fig. 5) which at its lower end is pivoted to a lever 101 pivoted to the machine frame at 102 and secured to a second lever 103. The lever 103 carries a roller 104 engaging with a cam 105 secured to the shaft 19, which rotates continuously at the same speed as the tabulator main shaft 24 (Figs. 4, 5, 12, 13, 24A and 24B).

A spring 106 tends to pull the lever 103 in the clockwise direction. As the shaft 19 rotates, each time the gap in the cam 105 comes opposite to the roller 104 the spring 106 tends to rock the arm 103 clockwise, thereby rocking the arm 101 also clockwise and the arm 100 and shaft 99 counter-clockwise (Fig. 5).

Passing through the cam 105 is a rod 96 which is urged to the left in Fig. 13 by a spring 96a. On the outer end of this rod 96 is a cam plate 97 and on the inner end is a tooth 98. On a shaft 110 hereinafter referred to as the total shaft is a gear wheel 109 having several teeth missing whereby a gap 112 is produced, and secured to the side of the gear wheel 109 is a tooth 108 projecting beside the gap 112 in the plane in which the tooth 98 normally travels.

When the roller 104 on the lever 103 is free to drop into the gap in the cam 105 a knife 103a on the free end of the lever 103 stands in the path of the cam plate 97 whereby as the shaft 19 rotates the cam plate 97 engages the lever 103 and consequently the rod 96 is pushed to the right (Fig. 13) thereby moving the tooth 98 clear of the tooth 108. Accordingly the wheel 109 and shaft 110 remain stationary.

Each of the cards fed to the machine has a sub-group designation field and a main group designation field, each field comprising a number of columns of the card. Before the machine is started the slides 123 for the testing bars 95 associated with the columns of sensing pins which sense the sub-group field are set with their lugs 129 below the sub-group total bar 127 and the slides 123 for the columns associated with the main group field of the card are set with their lugs 129 below the grand total bar 128.

At each card reading cycle the designation pin box 4 descends and remains down during the return stroke of the quadrant 16. While the pin box is thus at rest the gap in the cam 105 comes into register with the roller 104 and the spring 106 attempts to rock shaft 99 counterclockwise.

If the designation read from the card agrees with that registered by the registering elements 1045 all the projections 1047 on elements 1045 will be in register with the recesses 1061 in the pins 1026 and accordingly all the elements 1045 will be free to rock counterclockwise about their lower edges. Hence all the testing bars 95 will be free to move to the left in Fig. 6 under the action of springs 143 thereby permitting bell cranks 120 to rock clockwise whereby all the slides 123 rock clockwise about the guide rod 123a and move their lugs 129 downwardly relatively to the pin box frame as the latter descends.

Accordingly if the designation read from the card agrees with that registered by the registering elements 1045, then the castings 125 and 126 will not only be free to descend bodily with the pin box but will also rock counterclockwise (Fig. 6) relatively to the pin box frame, whereby the link 135 is lowered sufficiently to bring the lever 140 below the level of the lug 138 on the arm 137 so that the rocking of shaft 99 is unobstructed and the movement of the roller 104 into the gap in the cam 105 is not interfered with.

If a change in sub-group designation occurs then one or more of the testing bars 95 will be unable to move to the fullest extent and consequently the associated bell cranks 120 will be unable to rock and its pin 122 will not descend. As the pin box descends the pivot 124 for the castings 125, 126 will descend with it, but the sub-group total bar 127 will be prevented from rocking counterclockwise (Fig. 6) relatively to the pin box frame by the lug 129 on one or more of the slides 123 which in turn are prevented from descending by the pins 122 on those bell cranks 120 which are prevented from rocking.

Accordingly the link 135 will be prevented from descending sufficiently to bring the lug 138 on the arm 137 below the lever 140 so that said lever 140 will stand in the path of the lug 138 on the arm 137. Consequently when the gap in the cam 105 comes opposite to the roller 104 on the lever 103, the latter will be unable to rock and will not stand in the path of the cam plate 97. Therefore the tooth 98 will remain in its normal position and as the shaft 19 rotates will engage the tooth 108 on the wheel 109 whereby the latter will be turned until its teeth engage those of a gear wheel 111 on the shaft 19. Hence the total shaft 110 will make one revolution until the gap 112 in the teeth of the wheel 109 returns to its original position thereby producing disengagement of the teeth of the wheels 109 and 111.

From the foregoing it will be seen that upon a sub-group designation change the total shaft 110 makes one revolution and then stops, this revolution occurring from 50° in cycle 2 (Fig. 34 of the accompanying timing diagrams) to 85° in cycle 4. The present machine, however, is provided with mechanism described in British specification No. 484,911 and set into operation in cycle 2 by the designation change detecting mechanism which mechanism includes a cam 3170 (Fig. 28) which obstructs the rocking of shaft 99 in cycle 6 and thereby causes the total shaft 110 to make a second revolution from 50° in cycle 6 to 85° in cycle 8. This mechanism for producing a second revolution of the total shaft 110 will be fully described later.

Figure 33:
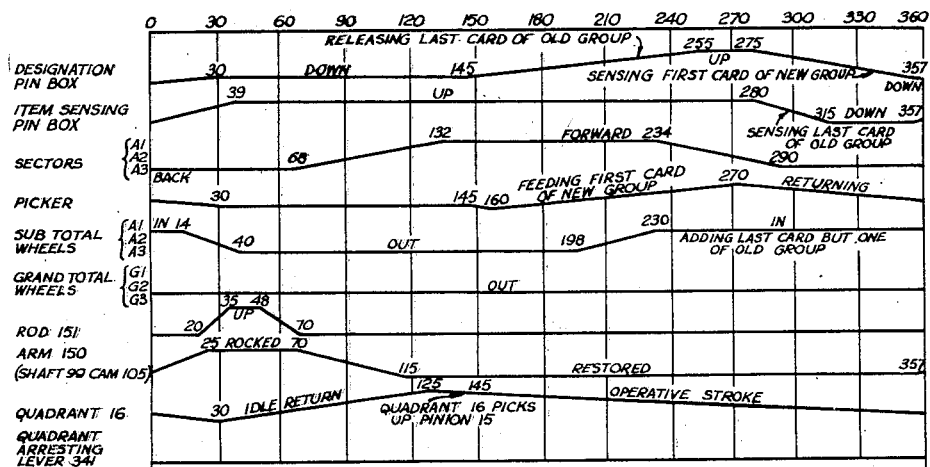
Figure 34:
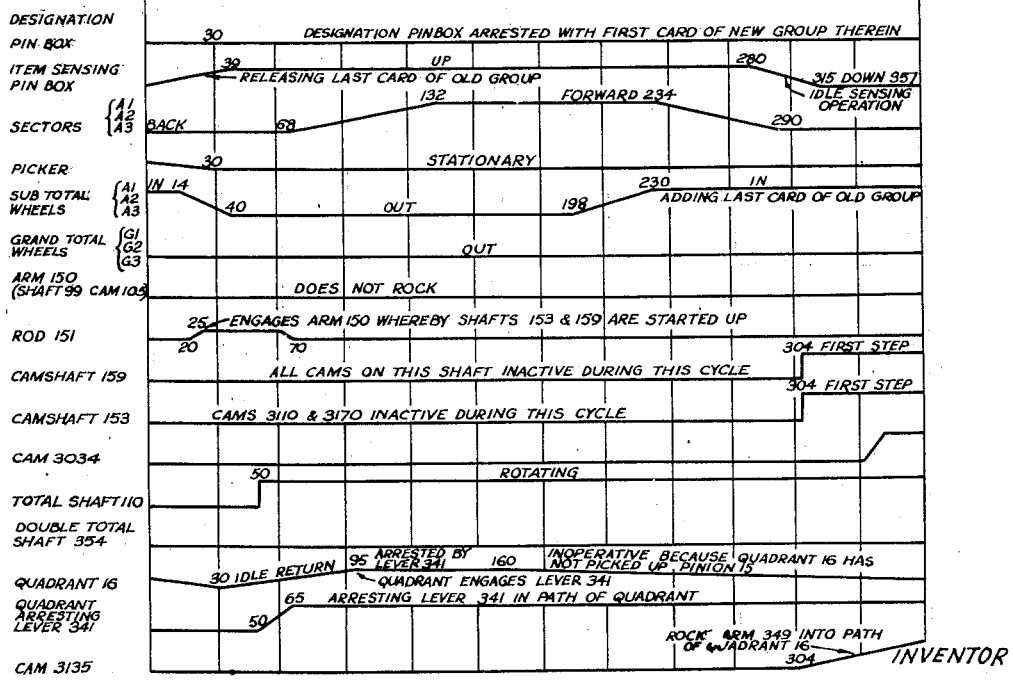
Figure 35:
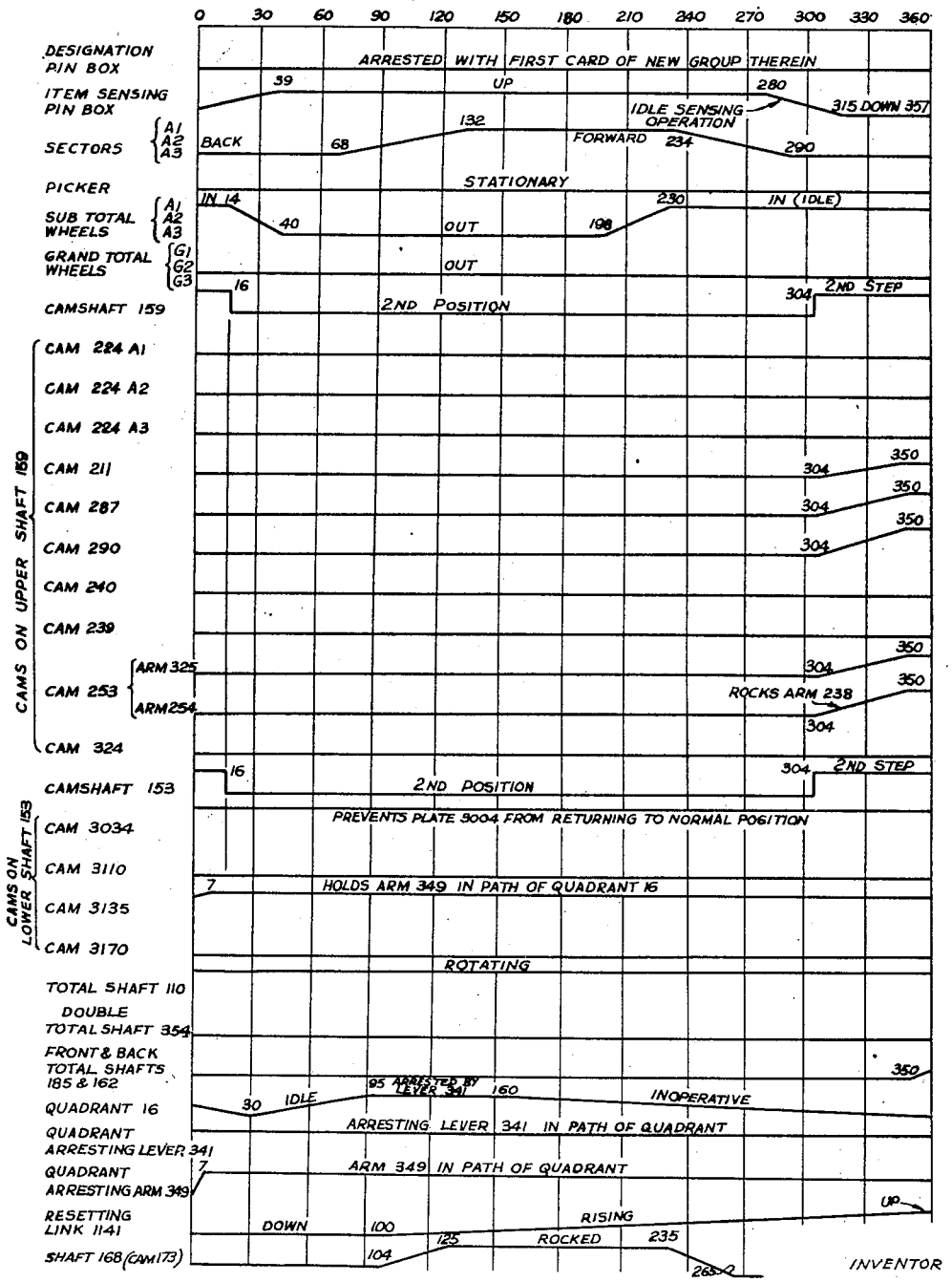

Referring to the timing diagram Fig. 33 the cam 105 releases the lever 103 between 25° and 70° in each cycle. During the one revolution of the total shaft 110 the cam 1138 thereon commences to raise the resetting link 1141 at 125° in the cycle following that in which the total shaft 110 commences to rotate (see Fig. 35) and the link 1141 is fully raised at 360° in that cycle, and remains raised until 40° in the next following cycle (Fig. 36). The rise of the link 1141 raises the lifting plates 1032 and the resetting plate 1030 (Fig. 6), whereby all the pins 1026 together with the registering elements 1045 are raised until all the projections 1047 are in line with all the slots 1061. This action releases the testing bars 95 so that when at 25° in the cycle in which the total shaft 110 completes its revolution (cycle 4), the gap in the cam 105 fully releases the lever 103, the roller 104 on the latter is free to drop into the gap, whereby lever 103 through levers 101 and 100 rocks shaft 99 counterclockwise in Figs. 5 and 6, this movement being permitted by the fact that the testing bars 95 are free to move to the left in Fig. 6.

The roller 104 on lever 103 drops into the gap in cam 105 before the tooth 98 arrives in register with the tooth 108 on gear 109, so that as wheel 111 revolves the knife 103a on lever 103 stands in the path of cam plate 97 and pushes rod 96 to the right (Fig. 13) thereby moving the tooth 98 clear of the tooth 108. Consequently when the total shaft 110 has made one revolution it stops.

If a change in main group designation occurs then one or more of the testing bars 95 associated with the main group field will be unable to move to the fullest extent and consequently the grand total bar 128 will be prevented from rocking counterclockwise relatively to the pin box frame by the associated slides 123. Further by means of a pin 144 on the sub-group total casting 125 the sub-group total casting 125 is also prevented from rocking counterclockwise with the result that the total shaft 110 is caused to make one revolution in the manner described above, this revolution being followed later by the second revolution initiated by the cam 3170 mentioned above.

The testing bars 95 are restored by a restoring bar 1054 carried between the arm 137 and a similar arm 137a secured to the shaft 99. When the cam 105 rocks the lever 103 counterclockwise the shaft 99 is rocked clockwise and the bar 1054 pushes the bars 95 to the right in Fig. 6.

Also secured to the shaft 99 is a lever 150 (Figs. 1 and 26) which when there is no change in designation rocks with the shaft 99. Since, however, on the occurrence of a change in designation, the shaft 99 is prevented from rocking the lever 150 is also prevented from rocking.

The lever 150 is the same as the lever 27 described in British specification No. 484,911 and co-operating with the lever 150 is a rod 151 which is the same as the rod 26 described in British specification No. 484,911. When there is no change in designation and the shaft 99 is consequently free to rock the lever 150 moves to bring a lug 150a on its lower end clear of the rod 151. Consequently the rod 151 is free to rise. If, however, the lever 150 does not rock then it will prevent the rod 151 from rising.

The rod 151 controls a clutch mechanism which is described in British specification No. 484,911 and which serves, when actuated to cause a shaft 153 to perform one revolution in five successive steps by means of a ratchet wheel 154 and pawl 155. The shaft 153, wheel 154 and pawl 155 are the same as the members 1, 3 and 5 respectively described in British specification No. 484,911.

The clutch device is constructed as follows:

Secured to the shaft 153 (Figs. 1, 24C and 26) mounted between fixed frame members 3002 is a ratchet wheel 154 having five teeth, and pivoted to a plate 3004 freely mounted on the shaft 153 is an operating pawl 155 for said ratchet wheel.

Pivoted to the plate 3004 at 3006 is a finger 3007 which is held against the action of a spring 3008 by a latch 3009 also pivoted to the plate 3004 at 3010. Freely mounted on the shaft 153 is a bell crank having a short vertical arm 3011 and a longer arm 3012 terminating in a lug 3013 which normally lies just below a block 3014 on the latch 3009.

Pivoted at the upper end 3015 of the short arm 3011 is a trip member 3016 having a curved portion 3017 at its upper end and pivoted at its lower end 3018 to a link 3019, the purpose of which will be explained later.

Secured to the shaft 3020 is an arm 3021 carrying two rollers 3022 and 3023, one on each side thereof. This arm 3021 turns continuously, making one revolution for each revolution of the main shaft 24.

The link 3019 is pivoted at its other end 3019a (right hand end in Figs. 1 and 26) to a bell crank plate 3024 freely mounted on a shaft 354 hereinafter referred to as the double-total shaft. Pivoted to the plate 3024 is the rod 151.

As the arm 3021 turns, the roller 3022 engages the curved portion 3017 of the trip member 3016 and attempts to rock the member 3016 counter- clockwise about the pivot 3015 by means of which it is mounted on the short vertical arm 3011.

At the time when the roller 3022 engages the curved portion 3017 of the member 3016, the shaft 99 has already rocked the lever 150 to a position in which the lug 150a is clear of the upper end of the rod 151. Consequently when the roller 3022 engages the curved portion 3017, the trip member 3016 is rocked about its pivot 3015 and pushes the link 3019 to the right, thereby raising the rod 151.

Thus at each revolution of the shaft 3020 the trip member 3016 is rocked and the rod 151 is raised, provided that there is no change in designation.

When a change in designation occurs the shaft 99 is prevented from rocking and consequently the rod 151 cannot rise because its upward movement is obstructed by the lug 150a (25° in cycle 2).

Consequently when the roller 3022 strikes the curved portion 3017 of the trip member 3016 the latter cannot rock about its pivot 3015 and is therefore moved bodily to the left whereby the arm 3011 on which the member 3016 is pivoted is rocked counterclockwise against its spring 3033. This counterclockwise movement of the arm 3011 raises the other arm 3012 and the lug 3010 thereon, by engaging with the block 3014 on the latch 3009 rocks the said latch counterclockwise thereby releasing the finger 3007. When the finger 3007 is thus released the spring 3008 which is attached thereto rocks the finger counterclockwise.

The finger 3007 is of L-shaped cross section, having a rib 3007a extending rearwardly thereof in Fig. 26. (See also Fig. 24C.)

When the finger 3007 is in the normal position shown in Fig. 26, the other roller 3023 which is on the front of the arm 3021, passes to the left of the rib 3007a and behind the main portion of the finger 3007 (see Fig. 27) as the arm 3021 rotates (clockwise). When the finger 3007 is released by the latch 3009 as described above the counterclockwise movement of the finger 3007 under the action of the spring 3008 brings the rib 3007a of the finger into the path of the roller 3023.

Therefore during the next revolution of the arm 3021 the roller 3023 engages the right hand face of the rib 3007a in Figs. 26 and 27 and by acting thereon rocks the plate 3004, on which the finger is mounted, in a counterclockwise direction about the shaft 153.

This movement of the plate 3004 by means of the pawl 155 turns the ratchet wheel 154 and therefore the shaft 153 through one-fifth of a revolution.

At the same time the roller 3023 turns the finger 3007 about the pivot 3006 in a clockwise direction until the finger assumes a position tangential to the circular path of the roller 3023. At this point the roller ceases to rock the plate 3004 in the counterclockwise direction and permits the said plate to return in the clockwise direction under the action of the spring 3008. As soon as the roller 3023 has passed beyond the rib 3007a of the finger 3007, the spring 3008 rocks the finger clockwise about its pivot 3006 to such a position that it re-engages the latch 3009.

If, however, the plate 3004 were allowed to return fully to its normal position the finger 3007 would be clear of the path of the roller 3023. It is desired however that the plate 3004 shall rock five times in succession so that the ratchet wheel 154 and shaft 153 may be turned through a complete revolution in five successive steps. Accordingly means is provided for preventing the plate 3004 from completely returning to its normal position until the plate has been rocked five times.

To this end a cam 3034 (Figs. 24C and 27) is secured to the shaft 153, this cam being circular over the greater part of its contour but having a depression 3035 as shown in Fig. 27.

Pivoted to the plate 3004 (Fig. 27) is a vertical link 3036 which is pivoted to the machine frame at 3038. This vertical link 3036 carries two horizontal pins 3039 and 3040. When the shaft 150 is in its normal position the longer of these pins 3039 engages the boss of the cam 3034 at a point behind the cam as shown in Fig. 27. When the plate 3004 is rocked and turns the shaft 153 through one-fifth of a revolution counterclockwise the circular portion of the cam 3034 is moved into the path of the shorter pin 3040 so that when the plate 3004 returns in the clockwise direction its movement is arrested by engagement of the pin 3040 with the cam 3034 (see Fig. 3 of British specification No. 484,911) and the plate 3004 is prevented from returning to a sufficient extent to permit the finger 3007 to clear the roller 3023.

Consequently during the next revolution of the arm 3021 the roller 3023 again strikes the rib 3007a of the finger 3007 and rocks the plate 3004 thereby moving the ratchet wheel 154 and shaft 153 through another fifth of a revolution.

The plate 3004 is prevented from returning completely to its normal position until the shaft 153 has been turned through 360° at which time the depression 3035 in the cam 3034 again comes opposite to the shorter pin 3040, so that the plate 3004 is permitted to move clockwise until the longer pin 3039 engages the boss of the cam 3034.

When the plate 3004 is thus permitted to return in the clockwise direction to the full extent the rib 3007a of the finger 3007 is held clear of the roller 3023 so that during the next revolution of the arm 3021 the plate 3004 is not rocked and the shaft 153 remains stationary.

The plate 3004 is connected by a link 156 to an arm 3042 carrying a pawl 157 operating a ratchet wheel 158 on an upper cam shaft 159 so that the shaft 153 and 159 simultaneously execute one revolution in five distinct steps. The upper pawl 157, ratchet 158 and cam shaft 159 are the same as the elements 43, 44 and 41 in British specification No. 484,911.

From the foregoing description it will be understood that when a change in designation occurs the shafts 153 and 159 are simultaneously turned through 360° in five successive steps, one step for each of five successive revolutions of the tabulator main shaft 24.

This step-by-step movement of the shaft 153 and 159 will occur whether the change in designation occurs in a main group or in a sub-group but in order to make the present description clear the sequence of operations which result from a change in sub-group designation will first be described and then the sequence of operations resulting from a main group designation will be described.

Assuming then that a change in sub-group designation has occurred, the shafts 153 and 159 will be turned through 360° in five successive steps as described above.

Of the five revolutions of the main shaft 24 which correspond with these five steps of the two cam shafts 153 and 159 the first two revolutions are idle as far as total taking operations are concerned. During the first of these two revolutions (cycle 2 of the tuning diagrams) the items sensed from the last card of the old group preceding the change in designation are added into the appropriate rear accumulators $A_1$, $A_2$ and $A_3$ and then in the second revolution (cycle 3) the machine executes a so-called space cycle during which the tens transfer mechanism is restored to normal if it has operated during the preceding cycle.

During the third revolution of the main shaft 24 (cycle 4) the first rear accumulator $A_1$ prints its sub-total and transmits this sub total to the corresponding front grand total accumulator $G_1$. In the machine described in specification No. 405,666 the wheels of the rear accumulator are left at zero when a total is printed, but according to the invention means are provided for causing the sub-group total to be retained in the first rear accumulator $A_1$ after it has been printed and transmitted to the corresponding front accumulator $G_1$.

As already described during adding (or subtraction) operations the engagement of the positive or negative wheels 59 or 60 of each of the rear sub-group total accumulators $A_1$, $A_2$, $A_3$ is effected by a forked link 71 of which a recess 73a engages with a pin 73b on a lever 74 secured to a shaft 75.

When a change in sub group designation occurs the total shaft 110 is caused to make a revolution as described above, that revolution starting at 50° in the same machine cycle as that in which the shafts 153 and 159 commence to execute the first step (see cycle 2 of the timing diagram). This revolution of the total shaft is completed at 85° in the next cycle but one (cycle 4). During this revolution cam 3076 on shaft 110 rocks lever 160 about pivot 175.

Attached to the end of lever 160 remote from the cam 3076 is a hook member 3080 with which normally engages a pin 3081 on the upper end of a lever 3082 (Fig. 30) pivoted at 3083 to a short lever 3084 which is pivoted to the machine frame at 3085.

When the lever 160 is rocked counterclockwise by cam 3076 the hook member 3080 descends and a spring 3086 pulls the lever 3082 to the left in Fig. 30 about its pivot 3083, whereby the edge of the lever 3082 comes into engagement with a pin 3087 on a lever 3088 pivoted to the machine frame at 3089 and provided at its other end with a roller 3090 engaging a cam 3091 on the shaft 3020. At this moment the roller 3090 is on the circular part of the cam 3091, but as the shaft 3020 rotates, a depression 3092 in the cam comes into engagement with the roller 3090 whereupon a spring 3093 rocks the lever 3088 clockwise thereby bringing the pin 3087 into register with a recess 3094 in the lever 3082. The spring 3086 then pulls the lever 3082 further to the left until the pin 3087 is within the recess 3094 (see Fig. 5A of British specification No. 484,911).

Then as the cam 3091 rotates, the roller 3090 is raised, thereby rocking the lever 3088 counterclockwise so that the lever 3082 is pulled down by the action of the pin 3087 and recess 3094 (350° in cycle 3).

Figure 1:
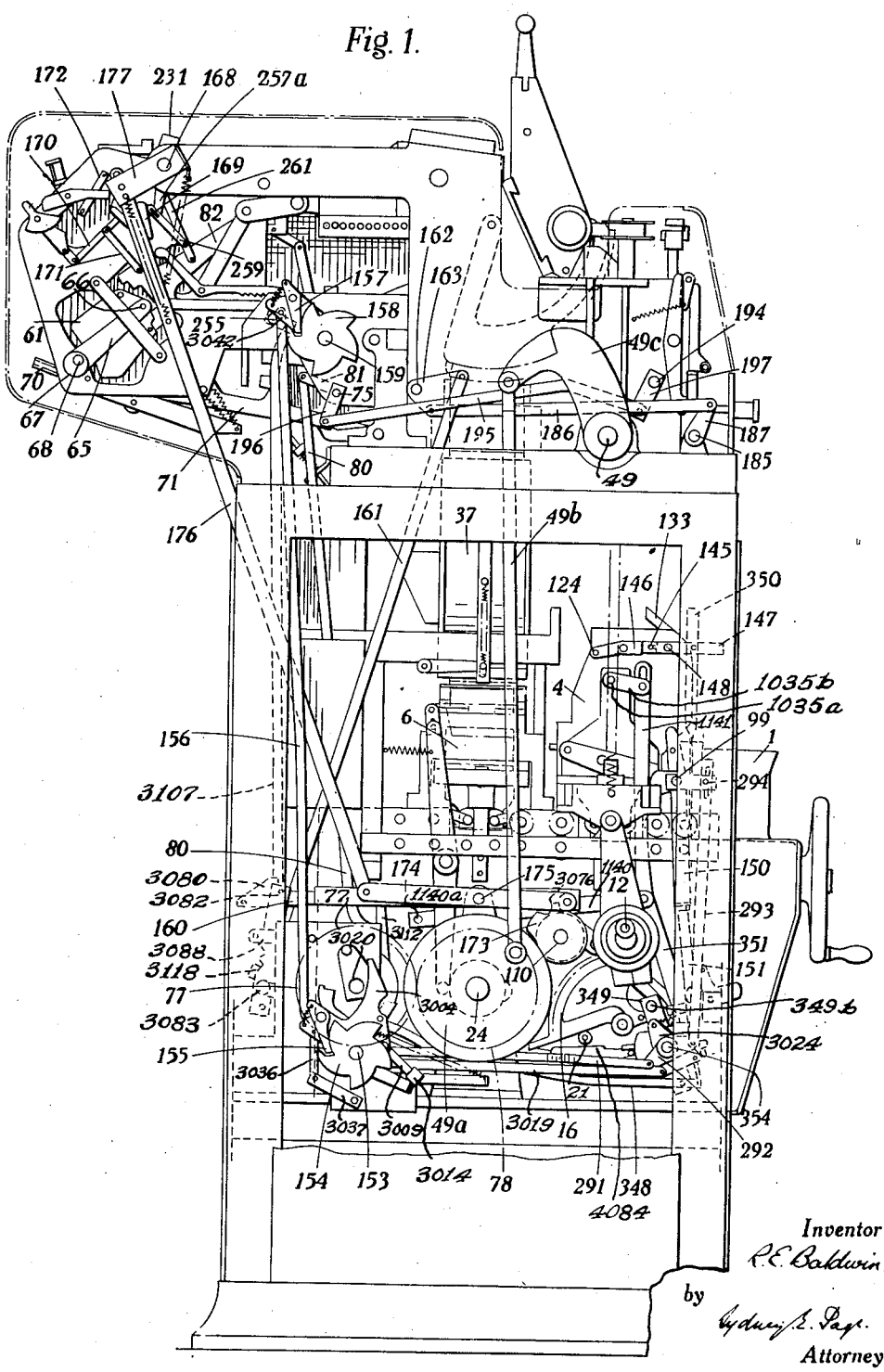
Fig. 1 is an outside elevation of the tabulator looking at the left hand side.

Pivoted to the lever 3082 at 3083 is a link 161 connected at its upper end to a bell crank plate 163 secured to the back total shaft 162 of the machine. Also pivoted to the plate 163 is a link 186 of which the other end is connected to an arm 187 on the front total shaft 185 (Fig. 1).

Thus when the lever 3082 is moved down the link 161 is also pulled down and rocks the back total shaft 162. At the same time the front total shaft 185 is rocked by the link 186.

In the operation just described the rocking of the front and back total shafts 162 and 185 takes place during the second step of the shafts 153 and 159 and commences at 350° in the 2nd cycle following that in which the change of designation was detected. Referring to the timing diagrams the front and back total shafts commence rocking at 350° in the 3rd cycle and complete their movement at 10° in the 4th cycle.

In the normal tabulator, when the back total shaft 162 rocks, the rear algebraic accumulators $A_1$, $A_2$, $A_3$ are set to yield their totals, while at the same time the corresponding grand total accumulators $G_1$, $G_2$, $G_3$, are set for adding so that the totals yielded by the rear accumulators are transferred to the front grand total accumulators. In the machine according to the invention, these operations are modified by mechanism which will be explained later.

In the machine according to the invention, each of the three rear accumulators $A_1$, $A_2$, $A_3$ is provided with a control link 71 having a forked end 72, 73 and freely mounted on the back total shaft 162 are two arms 163, 164, connected by a spring 165 (Fig. 8). Secured to the back total shaft is an arm 166 having a pin 167 against which the lower arm 164 is normally pulled by the spring 165; the upper arm 163 resting on the upper fork arm 73 of the control link 71.

When the back total shaft 162 rocks (350° cycle 3), the lever 166 rocks with it and raises the arms 163 and 164, whereby the latter engages underneath the upper fork arm 72 and lifts the link 71 into the totalling position (10° cycle 4); the edge of the fork arm 72 engages the pin 72b and the spring 165 yields to permit the arm 166 to complete the upward movement, then when the shaft 75 rocks counterclockwise (Fig. 8) (from 14° to 40° in cycle 4) no movement of the control link 71 at first takes place and the rear accumulator wheels are left in engagement with the rear sectors 62, so that the latter, when released by the restoring bar, move out until arrested by the rear wheels reaching zero.

At the end of this counterclockwise movement of the shaft 75 (40° cycle 4) the upper recess 72a engages the upper pin 72b under the action of the spring 165, and during the return movement clockwise of the shaft 75 (198° to 230° in cycle 4), the control link 71 moves to the right into the position shown in Figs. 8 and 8A to effect disengagement of the rear accumulator wheels from the rear sectors 62.

In this connection it is pointed out that the question of which wheel 59 or 60 of each pair can engage with the rear sectors 62 during total taking, is dependent upon the sign of the total held in the rear accumulator. The mechanism for controlling the engagement of the wheels 59 or 60 with the rear sectors 62 in accordance with the sign of the total, is the same as that described in British specification No. 405,666, but will be briefly described below.

As explained in British specification No. 405,666 when the sign of the total in the accumulator changes from positive to negative, the negative wheel 60 of highest denomination passes from 9 to 0, and when the sign of the total changes from negative to positive the positive wheel 59 of highest denomination passes from 9 to 0.

In order to effect the normal tens carry over from one denomination to the next higher denomination each of the positive wheels 59 is provided with a carry pawl 2074 pivoted at 2075 and each of the negative wheels 60 is provided with a carry pawl 2077 pivoted at 2078. The two pawls of each pair are pivoted together at 2088.

The operation of these pawls is the same as that of the pawls 74 and 77 described in British specification No. 405,666 and will not be described in detail herein. It is sufficient to state that each pair of carry pawls controls a nought stop 2020 cooperating with a nought stop pin 2019 on the sector 62 in the next higher denomination, said nought stop forming one arm of a bell crank pivoted at 2083 and of which the other arm 2084 has two shoulders 2085 and 2086. Normally a shoulder 2087 on the carry pawl 2074 in the lower denomination engages the shoulder 2085 on the arm 2084 and maintains the nought stop 2020 in the position shown in Fig. 8A. When any positive wheel 59 passes from 9 to 0 while in engagement with its sector 62, the associated carry pawl 2074 rocks clockwise in Fig. 9A, thereby permitting the arm 2084 to rock clockwise under the action of spring 2084a until arrested by engagement of shoulder 2086 with the shoulder 2087 of pawl 2074.

This movement of arm 2084 and the nought stop 2020 permits the associated sector 62 to advance one additional unit.

The nought stops 2020 are restored by a bail 2089 acting on the arms 2084 and carried between arms 172 pivoted at 2083 and of which the right hand arm is connected by link 2095 to an arm 2094 secured to a shaft 262 carrying an arm 265 connected by link 264 to an arm 88 on the shaft 49 (Figs. 15 and 18).

In order to handle the transfer of the fugitive unit from the highest to the lowest denomination when the total changes sign the highest denominational wheels 59 and 60 are provided with carry pawls 2074 and 2077 controlled by said highest denominational wheels in the same manner as the lower denominational wheels control their associated carry pawls.

The carry pawl 2074 (Fig. 29) controlled by the highest denominational wheel does not control a sector nought stop arm 2084 for an adjacent wheel of higher denomination but actuates a bail 2108 which in the manner described in British specification No. 405,666 controls a nought stop arm 2084 for the sector 62 of lowest denomination so as to permit said sector to advance one additional unit when either highest denominational wheel passes from 9 to 0 as described in British specification No. 405,666.

The mechanism for controlling the engagement of the wheels 59 or 60 with their sectors 62 in accordance with the sign of the total comprises mechanism for controlling the position of the abutment member 82 when it is desired to print the total held in the accumulator.

This control mechanism comprises a link 261 connecting the abutment member 82 to one end of a lever 2097. This lever 2097 is pivoted between its ends at 2098 to an arm 2099 secured to a shaft 168 (Figs. 1 and 29).

This shaft 168 is rocked counterclockwise in Fig. 1 from a cam 173 (Fig. 1) on the total shaft 119 engaging a roller on the end of a lever 174 pivoted to the machine frame at 175 and connected by a link 176 to an arm 177 secured to the shaft 168.

Associated with the lever 2097 is a settable stop 169 which is pivoted at 169a and can be swung under the free end of the lever 2097 or clear thereof as described in British specification No. 405,666.

When the stop 169 is under the free end of lever 2097, the rocking of shaft 168 rocks the arm 2099 in an anti-clockwise direction and as the free end of the lever 2097 is held up by the stop 169 the opposite end thereof descends and pushes the rod 261 downwards, thereby moving the abutment 82 over into the negative position.

On the other hand, if the stop 169 is withdrawn out of register with the lever 2097 the rocking of the shaft 168 merely rotates the lever 2097 about the pivot which connects it to the link 261, the abutment member 82 remaining in the positive position.

The stop member 169 is controlled from the pawl 2074, which is controlled from the highest denominational wheels 59 and 60, by means of a link 170 which is the same as the link 112 in British specification No. 405,666.

The link 170 is pivoted to the pawl 2074 by means of a pin 170a (Fig. 29), the other end of link 170 being guided in a slot (not shown) in a part 2114 of member 169 and carrying a pin 2115 adapted to engage with the edges of the slot.

When either of the highest denominational wheels 59 or 60 passes from 9 to 0 the pawl 2074 in Fig. 29 will drop, thereby pulling link 170 down.

The pin 170a also engages the forked end of one arm 2108b of bail 2108 of which the other arm 2108c (Fig. 8A) is connected to a carry pawl 2074 controlling the sector nought stop arm 2084 of lowest denomination.

Consequently when either of the highest denominational wheels 59 or 60 passes from 9 to 0 and the pawl 2074 controlled thereby drops, the pin 170a rocks the bail 2108 clockwise in Fig. 29 (counterclockwise in Fig. 8A) whereby the sector nought stop arm 2084 in the lowest denomination is released and rocks clockwise in Fig. 8A.

Later in the cycle bail 2089 restores the sector nought stop arm 2084 in the lowest denomination (Fig. 8A) whereby the spring 2077a (Fig. 8A) rocks the pawl 2074 controlling the arm 2084 of lowest denomination counterclockwise (Fig. 8A) thereby rocking bail 2108 clockwise in Fig. 8A and counterclockwise in Fig. 29.

This counterclockwise rocking of bail 2108 in Fig. 29 raises pawl 2074 in the highest denomination to its normal position whereby link 170 is raised again.

Link 170 is connected by a link 171 to the abutment member 82 and when the abutment member 82 is in the normal positive position shown in Fig. 29 the link 170 is disposed so that its pin 2115 is above the pivot 169a of stop member 169. Movement of the abutment member 82 to the negative position (counterclockwise Fig. 29) through link 171 pulls link 170 clockwise about pivot 170a whereby the pin 2115 is brought below the pivot 169a.

As will be explained later in a cycle in which the sign of the total changes from positive to negative the stop member 169 moves into the position shown in Fig. 29.

If a change in designation occurs when the stop member 169 is in the negative position shown in Fig. 29 the shaft 168 will rock counterclockwise and as the free end of lever 2097 is held up by the stop 169 the opposite end thereof descends then pushes the rod 261 downwards thereby moving the abutment 82 counterclockwise into the negative position.

This setting of the abutment member 82 occurs at 125° in the cycle preceding the total cycle and at 198° in the same cycle the negative wheels 60 will commence to engage with their sectors 62, being fully engaged at 230°.

At 235° in the same cycle the shaft 168 commences to rock back again being fully restored at 265°. The spring 82b does not however return the abutment member 82 to the positive position until the negative wheels become disengaged from the sectors 62 which does not occur until 198° to 230° in the next cycle (the total cycle) owing to the engagement of the pin 2036 on the cradle 61 with the abutment member.

If, before the total is printed, a positive card passes through the machine bearing an amount sufficient to convert the negative total into a positive one, then when the adding wheel of highest denomination passes from 9 to 0 the carry pawl 2074 controlled thereby will drop to add the fugitive one to the positive wheel of lowest denomination. Owing to the passage of a positive card the abutment 82 will be in its normal position as shown in Fig. 29 and the pin 2115 will be above the pivot 169a, but since the total was previously negative the stop 169 will be in the position shown in Fig. 29. Hence, as the carry pawl moves during the addition of the fugitive one the link 170 will be pulled down and its pin 2115 will turn the stop 169 counterclockwise out of the position of Fig. 29 so that if a total is now taken the lever 2097 will fail to strike the stop 169, and the abutment member 82 will remain in its normal position whereby the positive wheels 59 will be engaged with the sectors to transfer to them the total.

When a change in designation occurs the back total shaft 162 is rocked as described above and the positive wheels 59 or the negative wheels 60 of the first rear accumulator A₁ are engaged with the rear sectors 62 as described above. Accordingly the sectors 62 are set to the amount of the total held in the wheels 59 or 60. By means of the links 64 the front sectors 38 are also set to the same amount and take with them the type sectors 52 from which the total is printed by printing mechanism of the kind described in British specification No. 461,612.

In the normal tabulator, when the shaft 75 rocks clockwise (Fig. 8) it pulls the link 71 to the left, thereby removing the gears 59 or 60 from engagement with the sectors 62 before the latter return to their normal position so that the wheels 59 or 60 remain at zero.

In the machine according to the invention it is desired that the total contained in the wheels 59 or 60 shall be returned to these wheels after it has been printed by the sectors 52.

In addition to printing the total transferred from the wheels 59 or 60 to the front sectors 38 it is desired that this total shall be added into the front grand total accumulator G₁, of which the wheels are indicated at 54 in the drawings.

Engagement of the front grand total accumulator wheels 54 with the front sectors 38 is caused by mechanism described in British specification No. 405,666 including a control plate 178 (Fig. 9) which is the same as the control plate 153 described in British specification No. 405,666.

While the positive and negative wheels 59 and 60 are accumulating items, they are engaged with their sectors 62 at each cycle of the machine after the sectors have been set. During this operation the front gears 54 are held out of engagement with their sectors 38. When, however, the back gears 59 and 60 are zercised to transfer to their sectors 62 and thence to the type sectors 52 the total they hold, the front gears 54 and engaged with their sectors 38 after the latter have been set. Consequently when the front sectors 38 are restored to zero the total they hold is transferred to the front gears 54.

After a number of totals has thus been transferred from the back gears to the front gears, the latter will hold a grand total of all the sub-group-totals thus transferred. In order to print this grand total the back gears are held out of engagement with their sectors and the front gears 54 are engaged with their sectors 38 while the latter are at zero. The sectors 38 are then allowed to move forward and are arrested when the adding wheels 54 reach zero, the carry-over mechanism for the adding wheels 54 acting as zero stop mechanism as described in British specification No. 26,896/13. By this means the grand total held in the front gears is transferred to the front sectors and may be printed from the type sectors 52.

The construction of the mechanism for carrying out these operations will now be described.

The lower arm 179 of the control plate 178 is slotted at 180 and in this slot engages a pin 181 carried on an arm 182 pivoted at 183 to an arm 184 secured to the front total shaft 185. The front total shaft is the same as the shaft 138 in specification No. 405,666 but in the present construction is rocked from the back total shaft 162 by a link 186 connected to the plate 163 and to an arm 187 on the shaft 185 (Fig. 1). Also pivoted to the arm 184 at 183 is a bell crank 188 having one arm connected by a spring 189 to the arm 184 and its other arm connected by a spring 190 to the arm 182. A stop 191 on the arm 184 limits the movement of the bell crank in one direction and a stop 192 on the arm 182 limits the movement of the latter relatively to bell crank 188.

The function of the arm 182 is to position the control plate 178 with respect to the disc 193.

The disc 193 is secured to a shaft 194 which is rocked from the shaft 75 by means of a link 195 (Fig. 1) connecting two arms 196 and 197 on the shafts 75 and 194 respectively, thus the shaft 194 with the disc 193 rocks at each machine cycle. The control plate 178 is provided with two fork arms 179 and 179a (Fig. 9) each having a recess 198, 199 with which co-operate respectively pins 198a and 199a on the disc 193. If the upper recess 198 engages with the upper pin 198a then during the counterclockwise stroke of the disc 193 (from 14° to 40° in each cycle) the cam lever 57 will rock to cause engagement of the adding wheels 54 with the front sectors 38. Conversely if the lower recess 199 engages with the lower pin 199a then engagement of the adding wheels 54 with their sectors 38 will take place during the clockwise stroke of the disc 193 (from 198° to 230° in each cycle). In Fig. 9 the disc 193 is in its extreme counterclockwise position in which it remains from 40° to 198° in each cycle.

The timing of the disc 193 is such that if the lower slot 199 is in engagement with the lower pin 199a the adding wheels 54 are engaged with the sectors 38 after the sectors have been moved forward and set through the links 64 and sectors 62 from the rear wheels 59 or 60. The return of the sectors 38 would then transfer the amount that they hold to the adding wheels 54; on the other hand, when the upper slot 198 is in engagement with the upper pin 198a the adding wheels 54 will be in engagement with the sectors 38 before the latter commence to move from the zero position, so that as the sectors move forward they take from the adding wheels the amount which they hold and are set by the adding wheels being arrested at zero by the carry-over mechanism.

As the front adding wheels 54 are serving to accumulate a grand total in the manner already referred to they must be held out of engagement with the sectors 38 while cards are passing through the machine and a sub-group total is being accumulated item by item on the back gears 59, 60.

To this end the arm 184 is so set that its pin 181 engaging in the slot 180 of the arm 179 of the control plate 178 maintains the control plate in an intermediate position wherein neither of its slots 198, 199 engages a pin on the rocking disc 193, as shown in Fig. 9. The arms 179, 179a remain in this position during all adding cycles of the machine.

When a total is taken, however, the card feed is stopped and the front total shaft 185 is rocked in a clockwise direction (Fig. 9) as already described. This movement of the front total shaft 185 starts at 350° in the cycle following that in which the total shaft 110 commences to rock and ends at 10° in the next following cycle (see for example cycles 3 and 4). The above movement of the front total shaft moves the bell crank 188 bodily to the right. The upper end of the bell crank 188 is provided with a lug 200 which engages with a latch 201 secured to a shaft 201a mounted in bearings carried by the machine frame. Thus, when the front total shaft 185 rocks, the bell crank 188 turns about its pivot 183 and through the action of the spring 190 lifts the arm 182. The arm 182 is thus lifted at 10° in the cycle in which the sub-total is extracted from the wheels of the sub-total accumulator. Referring to the timing diagram of cycle 4 which illustrates a sub-total cycle, the arm 182 is completely raised at 10° and at this time the grand total wheels 54 are out of engagement with their sectors 38, and the shaft 194 is in its extreme clockwise position (Fig. 9 shows the extreme counterclockwise position). Accordingly the pin 199a will be above the edge of the arm 179 so that the arm 182 will only rise until the arm 179 engages with the pin 199a, the spring 190 extending to permit the full movement of the bell crank 188.

Then at 14° in the same cycle the shaft 194 commences to rock counterclockwise into the position of Fig. 9, which position is reached at 40° in the same cycle. As the shaft 194 reaches the end of its counterclockwise movement the recess 199 in the arm 179 comes into register with the pin 199a and the spring 190 pulls the control plate 178 up to effect engagement of the recess 199 with said pin 199a. The parts remain in this position until 198° in the same cycle.

As already explained the rocking of the back total shaft 162, which occurs simultaneously with that of the front total shaft 185, raises the link 71 until the upper edge of its arm 72 engages the upper pin 72a at 10° in the total cycle (cycle 4) at which time the wheels (59 or 60) of the sub-total accumulator are already in engagement with their sectors 62.

Consequently when the shaft 75 rocks counterclockwise in the total cycle (14° to 40° cycle 4) into the position of Fig. 8 the arm 72 slides idly past the pin 72a and the sub-total wheels 59 or 60 remain in engagement with their sectors 62.

At 40° when the shaft 75 reaches its extreme counterclockwise position the recess 72a is in register with the pin 72 and the spring 165, through arm 164 lifts the link 71 still further to effect engagement of said recess 72a with said pin 72.

At 68° in the cycle the restoring bar 45 moves forwardly away from the sectors 52 and 38 permitting the latter to swing clockwise in Fig. 9. As above explained the sub-total wheels are in engagement with the sectors 62 and consequently as the sectors move clockwise (forwardly) they turn the wheels 59 or 60 backwardly until arrested by the arrival of the wheels at zero. By this means the sectors 62 and through the links 64 the sectors 52 and 38 also are set to the amount of the sub-total.

In moving forward the sectors reach the nine position at 132° (i. e., those sectors which complete the full travel) and they remain fully forward until at 234° the restoring bar 45 commences to return them to the zero position which they reach again at 290°.

Thus at 132° the sectors are set to the amount of the sub-total and the sub-total wheels 59 or 60 are at zero and in engagement with the sectors 62. The grand total wheels 54 are out of engagement with the sectors 38.

At 198° in the same cycle (cycle 4) the shafts 75 and 194 commence to rock clockwise from the position shown in Figs. 8 and 9. As already explained, at 40° in this cycle the recess 72a is in engagement with the pin 72b and the recess 199 is in engagement with the pin 199a. Consequently the clockwise rocking of shafts 75 and 194 from 198° to 230° in cycle 4 pushes the link 71 to the right and control plate 178 to the left whereby the sub-total wheels are disengaged from the sectors and the grand total wheels 54 are engaged with their sectors 38, at 230° in the total cycle (cycle 4).

At 234° in the same cycle the sectors commence to restore, and reach the zero position at 290°. Since during this period the grand total wheels 54 are in engagement with the sectors 38, the amount to which the latter were set from the sub-total wheels is transferred to the grand total wheels.

As already mentioned each sector 38 is held in its normal position by a heel 40 which engages with a nought stop 41 in the stop basket. In order to release the nought stops 41 when a total taking operation is to occur, the back total shaft 162 is provided with a nought shutter release cam 202 for each stop basket. In the case of the receiving accumulator A₁ the associated stop basket S₁ is provided with a nought shutter comb 204 (Fig. 14) which is provided with a number of slots 205, one for each column. In each slot engages a projection 206 on the corresponding nought shutter 42. The comb 204 is mounted to slide on the stop basket by means of slots 207 in the comb engaging with pins 208 projecting from the stop basket and is urged to the right by a spring 209. When the back total shaft 162 rocks the cam 202 thereon engages a projection 210 on the comb 204 thereby moving the comb to the left (Fig. 14) whereby all the nought shutters 42 for the stop basket S₁ are rocked to the left, bringing the nought stops 41 which are carried on the shutters 42 clear of the heels 40 of the sectors 38 thereby releasing them.

A different arrangement is provided for the stop baskets S₂ and S₃ and this arrangement will be described later.

The operations of the link 71 described above are those which occur during a normal total cycle and these operations do in fact occur in cycle 4 as far as accumulators A₂ and A₃ are concerned. It is, however, required that the sub-total be returned to the first rear accumulator A₁.

In order to cause the sub-group total to be returned to the first rear accumulator A₁ a cam 211 is provided on the upper cam shaft 159 and this cam operates a bell crank 212 (Fig. 15) pivoted on the shaft 75 and of which the end 214 overlies the control link 71. During ordinary adding and subtracting operations the cam 211 holds the bell crank 212 in a position such that its end 214 does not interfere with the control plate 71. When the upper cam shaft 159 moves into the third position however (304° cycle 3 to 16° cycle 4), the cam 211 permits the bell crank 212 to rock under the action of a spring 215 into a position such that the arm 214 of the bell crank obstructs the upward movement of the link 71, which occurs between 350° cycle 3 and 10° cycle 4).

The control link 71 is then maintained in a mid-position in which neither of the recesses 72a, 73a can engage with its pin 72b, 73b and consequently the wheels 59 or 60 of the accumulator A₁ remain in engagement with their sectors 62 during both the outward and the return movements thereof in cycle 4.

When the sectors 38 of the first front accumulator G₁ are released by the restoring bar 45 at 68° in cycle 4, they move until arrested by the wheels 59 or 60 of the accumulator A₁ reaching zero whereby the sectors 38 of the accumulator G₁ are set to the amount of the sub-total held in the first rear accumulator A₁ at 132° cycle 4. This sub-total is then printed from the printing elements 52 and the wheels 54 of the grand total accumulator G₁ are moved into engagement with their sectors 38 (198° to 230° cycle 4). The sectors are then returned to normal position by the restoring bar 45 (234° to 290° cycle 4), but since the wheels 59 or 60 of the corresponding sub-total accumulator A₁ are still in engagement with the rear sectors 62 the return of the latter to normal position transfers the sub-total back to the wheels 59 or 60 of the accumulator A₁. At the same time the return of the front sectors to normal position transfers the same amount to the wheels 54 of the grand total accumulator G₁.

In the known tabulator all the rear accumulators A₁, A₂, A₃, simultaneously carry out the same operations during a total taking operation. That is to say all the rear accumulators print their totals and transfer them to the corresponding front grand total accumulators G₁, G₂, G₃ after which the rear accumulators remain at zero.

It has already been explained that special mechanism is provided according to the invention to cause the first rear accumulator A₁ to retain its total after printing it and transferring it to the corresponding grand total accumulator G₁.

According to the invention it is desired that the second and third rear accumulators A₂ and A₃ shall print their totals and transfer them not only to the corresponding grand total accumulator G₂ and G₃, but also to the first rear accumulator A₁, so that the latter may contain the sum of the sub-group totals accumulated in each of the three rear accumulators.

Since the second and third rear accumulators A2 and A3 cannot transfer their totals to the first rear accumulator A1 while the latter is printing its total and since also the second and third rear accumulators A2 and A3 cannot simultaneously transfer their totals to the first rear accumulator A1, means is provided according to the invention for preventing the second and third rear accumulators A2 and A3 from printing their totals and transferring them to the corresponding grand total accumulator G2 and G3 while the first rear accumulator A1 is printing its total.

Means is also provided for preventing the third rear accumulator A3 from printing its total and transferring it to the first rear accumulator A1 while the second rear accumulator A2 is transferring its total to the first rear accumulator A1.

The first rear accumulator A1 is allowed to print its total and transfer it to the corresponding grand total accumulator G1 during the total taking operation which occurs in cycle 4 as a result of a change in designation. At the same time the second and third rear accumulators A2 and A3 are prevented from printing and transferring their totals. Also means is provided for causing two additional total taking operations (cycles 5 and 6) to occur immediately after the total taking operation which results from a change in designation.

These two additional total taking operations are brought about by a cam 3110 which is the same as the cam 110 in British specification No. 484,911.

Secured to the shaft 153 in the lower part of the machine is the cam 3110 (Figs. 24C and 28) which cooperates with a roll 3111 on the lower end of a link 3112 (Figs. 1 and 28) pivoted at its upper end 3113 to the lever 160. In order to guide the link 3112 its lower end is pivoted to a short arm 3114 pivoted to the machine frame at 3115.

As already explained, when a change in designation occurs the total shaft 110 makes a revolution (50° cycle 2 to 85° cycle 4).

The timing of the total shaft 110 in relation to the shaft 3020 is such that before the cam 3076 has actuated the lever 160 the arm 3021 on the shaft 3020 has operated the plate 3004 twice, thereby bringing the shafts 153 and 159 from the first position through the second position into the third position. Then after the cam 3076 has actuated the lever 160 the arm 3021 actuates the plate 3004 again whereby the ratchet wheel 154 is moved through another step thereby bringing the shafts 153 and 159 into their fourth positions (16° cycle 5).

In this position of the shaft 153 the cam 3110 engages the roller 3111 and by means of the link 3112 holds the lever 160 down thereby preventing it from returning to its normal position.

The high part of the cam 3110 is of sufficient length to hold the lever 160 down while the shaft 153 is in its fifth position as well as in its fourth position. Consequently the machine is maintained in a condition for total taking during two consecutive revolutions of the shaft 3020 following the total taking operation brought about by the change in designation, i. e., during cycles 5 and 6.

During each of these cycles, however, the cam 3091 makes one revolution and each time the roller 3090 drops into the gap 3092 in the cam. Accordingly once in each of these cycles (i. e., at 315°) the link 3082 is raised thereby raising link 161 and rocking the front and back total shafts 185 and 162 back to normal position. At 350° in each of the two cycles, however, the cam 3091 lowers the link 3082 again so that the front and back total shafts are again rocked to the totalling position.

At 16° in the next cycle (cycle 7) the shaft 153 is moved round to its first or normal position and the cam 3110 releases the link 3112. Thus when at 315° in the same cycle (cycle 7) the roller 3090 drops into the gap in the cam the link 3082 rises and the lever 160 rises with it.

In order to permit the pin 3081 on the lever 3082 to re-engage the hook member 3080 a small arm 3116 is pivoted to the frame at 3085 and carries a lug 3117. Normally this lug lies below a tooth 3118 on the lever 3082 and when the lever 3082 is lowered this tooth rocks the arm 3116 counterclockwise until the tooth passes below the lug 3117. The spring 3093, of which one end is connected to the arm 3116, then pulls the arm up so that the lug is resting against the upper edge of the tooth. When the lever 3082 is raised the lug 3117, cooperating with the tooth 3118 rocks the lever 3082 clockwise about its pivot 3083 so that the pin 3081 passes beyond the upper edge of the member 3080 and the spring 3086 pulls the pin down into the angle of the hook.

During the first of these additional total taking operations (cycle 5) the second rear accumulator A2 transfers its total to the first rear accumulator A1 and during the second additional total taking operation (cycle 6) the third rear accumulator A3 transfers its total to the first rear accumulator A1.

In order to permit this transferring operation there is pivoted to each denominational sector 52 of the three front accumulators G1, G2, G3 a corresponding denominational coupler link 216. These coupler links are similar to the members 120 described in British specification No. 484,911 and there is associated with these coupler links mechanism similar to that which is associated with the coupler links 120 described in the aforesaid specification No. 484,911.

Pivoted at one end 216a to each denominational sector 52 of each of the three front accumulators is a corresponding denominational coupler link 216 (Figs. 8, 22A, 22B) of which the other end is connected through a link 217, to a rocking frame 218 pivoted on a shaft 219 and which when lifted raises the links 216 about the ends 216a which are pivoted to the corresponding sector. In the drawings the couplers for the three accumulators A1, A2, A3 are indicated respectively at 216(A1), 216(A2) and 216(A3).

There is a frame 218 for each of the three accumulators and each frame is capable of being independently rocked when required.

All the couplers 216 for any given accumulator are adapted to be raised simultaneously by rocking the corresponding frame 218 and the arrangement is such that the sets of couplers for the second and third accumulators are raised in turn, whereas the set of couplers for the first accumulator is raised each time one of the other sets is raised.

Freely mounted above the couplers and lying transversely of them is a series of denominational shafts 220 each having secured thereto three depending arms 223, the number of shafts 220 being equal to the number of couplers 216 in each set and therefore equal to the number of sectors 52 in each accumulator.

Each depending arm 223 is normally held in a position such that when its corresponding coupler link 216 is raised, a recess 3126 in the upper surface of the link engages with the end 3127 of the arm whereby movement of the coupler link will carry the arm with it, the latter therefore causing rotation of the shaft 220 to which it is attached. Such rotation of the shaft 220 will also take the other two arms 223 with it but since the couplers 216(A2) corresponding to the second accumulator A2 are not raised when the couplers for the third accumulator A3 are raised and vice versa, the arms 223 for the couplers which are not raised will rock idly. The couplers 216(A1) of the first accumulator A1 are however raised each time the couplers of either of the other two accumulators are raised and consequently the third arm 223(A1) on the shaft will engage with the corresponding coupler 216(A1) of the first set and will move this coupler and through it the corresponding sector of the first accumulator A1.

By this means an amount to which either the second or third accumulator is set is transferred to the sectors of the first accumulator and thence in the normal way to the adding wheels thereof.

In order to control the couplers 216(A1) of the first accumulator a cam 224(A1) (Figs. 8 and 22A) is secured to the upper ratchet shaft 159.

When this shaft 159 is in its normal position the high part of the cam 224(A1) is in engagement with the cooperating roller 400. This roller is secured to an arm 225 pivoted at 401 to a bracket 402 and to which arm is also secured one arm 226 of a toggle of which the other arm 227 is pivoted at 403 to the rocking frame 218 controlling the couplers 216 for the first accumulator.

When the shaft 159 is in its normal position the cam 224 holds the toggle 226, 227 in the position shown in Fig. 8 in which the corresponding couplers 216 are out of engagement with the depending arms 223.

The cam 224(A1) is cut away at 404 as shown and this cut-away portion 404 is so positioned that it only engages with the roller 400 when the shaft 159 is in the fourth and fifth positions. When the portion 404 engages the roll 400 toggle 226, 227 straightens under the action of a spring 405 thereby rocking the frame 218 clockwise and raising the couplers 216(A1) for the first accumulator A1 into engagement with the depending arms 223(A1).

A cam 224(A2) (Figs. 8 and 22B) which is similar to the cam 224(A1) is provided for controlling the couplers 216(A2) for the second accumulator A2. This cam is positioned so that the corresponding roller only engages with the cut-away portion of the cam when the ratchet shaft 159 is in the fourth position.

In order to control the couplers for the third accumulator A3 a third cam 224(A3) (Figs. 8 and 22A) is provided on the shaft 159. This cam has a cut-away portion which extends over the fifth position of the shaft 159 so that the couplers 216(A3) for the third accumulator are raised into engagement with the corresponding depending arms 223(A3) while the shaft 159 is in the fifth position.

Accordingly whereas the couplers 216(A2) of the second accumulator A2 are raised into engagement with the corresponding depending arms 223(A2) only when the shaft 159 is in the fourth position the couplers 216(A3) of the third accumulator A3 are raised into engagement with the corresponding depending arms 223(A3) only when the ratchet shaft 159 is in the fifth position.

The rear accumulators $A_1$, $A_2$, $A_3$ are algebraic and the total which is to be transferred from the accumulator $A_2$ or $A_3$ to the accumulator $A_1$ may therefore be positive or negative; consequently there is provided, according to the invention, means for conditioning the first rear accumulator $A_1$ to add or subtract in accordance with the sign of the total to be transferred thereto.

During the transfer of a total from the second to the first rear accumulator the sectors 62 of these accumulators are connected by the couplers 216 prior to the release of said sectors (see cycle 5) and when the sectors are released (68° cycle 5) the second rear accumulator wheels are in engagement with the sectors while the first rear accumulator wheels are disengaged therefrom.

Consequently the sectors 62 of the second rear accumulator $A_2$ move out until arrested by the corresponding accumulator wheels reaching zero and the sectors of the first rear accumulator $A_1$ are set to the same amount since they are connected to the sectors of the second rear accumulator $A_2$ through the couplers 216. Then the wheels of the second rear accumulator $A_2$ are disengaged from their sectors (198° cycle 5) and the wheels of the first rear accumulator $A_1$ are engaged with their sectors 62 (198° cycle 5) after which the latter are restored to normal (234°-290° cycle 5) thereby transmitting to the wheels of accumulator $A_1$ the total held by the wheels of accumulator $A_2$.

During the operation just described the question as to whether the positive or negative wheels of the second rear accumulator $A_2$ shall engage with the sectors 62 is determined by the sign of the total held therein in the manner already described.

In order to condition the first rear accumulator $A_1$ to add or subtract in accordance with the sign of the total to be transferred to it from the second rear accumulator the following mechanism is provided according to the invention.

As already explained, when a change in designation occurs the total shaft 110 commences to revolve at 50° in the cycle (cycle 2 of the timing diagrams) following that in which the change was detected, and the cam 173 thereon rocks shaft 168 counterclockwise in Figs. 1 and 29 from 104° to 125° in cycle 3 thereby setting into the negative position the abutment members 82 of those accumulators A1, A2, A3 which contain a negative total.

From 235° to 265° in cycle 3 the shaft 168 rocks back again but any abutment member 82 which has been set negative does not return to the positive position until the wheels of its associated accumulator come out of engagement with the sectors.

Referring to the timing diagrams, if the totals in all three accumulators are negative, then the associated abutment members would all be moved into the negative position at 125° in cycle 3. At 230° in cycle 4 the wheels of accumulators A2 and A3 are disengaged from the sectors and accordingly the abutment members 82 for these accumulators will return to the positive position under the action of their springs 2039.

According to the invention means is provided for sensing the position of the abutment members 82 of the second and third rear accumulators A2 and A3 and for shifting the abutment member 82 for the first rear accumulator A1 into the negative position at the appropriate times if the totals in the second and third rear accumulators are negative.

To this end two stirrup members 230 and 231 (Figs. 15 and 17) are freely mounted on the shaft 168, one stirrup member for each of the second and third rear accumulators A2 and A3. Also pivoted on the shaft 168 are two arms 232 and 233 (Figs. 15, 17, 20A and 20B) each having a pin 234 and 235 which are caused to bear against one limb 236 and 237 of each stirrup member respectively by springs 247, 248 hereinafter referred to.

At its other end the stirrup 231 carries a depending limb 257a (Figs. 1 and 29) which is connected by a pin and slot connection 258a to a link 259 pivoted at 260 to the link 261 which is pivoted to the abutment member 82 for the second rear accumulator A2 and is the same as the link 96 in the specification No. 405,666. Likewise the stirrup 230 carries a limb 257 (Fig. 17) which is connected in a similar manner to the link 261 for the third rear accumulator A3.

Secured to the upper cam shaft 159 is a cam 253 (Figs. 17 and 18) with which cooperates a follower 254 pivoted on the shaft 255 and connected by a link 256 to an arm 238 free on the shaft 168. Arm 238 carries a pin 238a which serves to restore the stirrups 230 and 231 after they have operated.

At the beginning of cycle 4 when shaft 159 reaches the third position cam 253 releases follower 254 and arm 238 rocks clockwise in Figure 15 thereby permitting the sirrups 230 and 231 to rock counterclockwise in Figs. 1 and 29 (clockwise in Fig. 15) if the totals in their respective accumulators A3 and A2 are negative. Accordingly the lower end of the limb 237 of the stirrup 231 will have moved away from the pin 235 at the beginning of cycle 4 if the total in the second rear accumulator A2 is negative.

Similarly if the total in the third accumulator A3 is negative the limb 236 of the stirrup 230 will have moved away from the pin 234, at the beginning of cycle 4.

Secured to the upper cam shaft 159 are two cams 239 and 240, each having a follower arm 241 and 242 pivoted to the machine frame at 243. The plate 232 is connected by a link 245 to the follower 241 and the plate 233 is connected by a link 246 to the follower 242. The follower arms 241 and 242 are urged up to their cams by springs 247 and 248.

Each link 245 and 246 has a recess 245a, 246a engaging over a pin 249 on a lever 250 pivoted to the abutment member 82 for the first rear accumulator A1 at 251 and urged in a clockwise direction by a spring 252.

When the shaft 159 reaches its fourth position at the beginning of cycle 5 the follower 242 is free to drop off the high part of the cam 240 under the action of the spring 248 and therefore if the total in the second accumulator A2 is negative and in consequence the stirrup 231 has rocked clockwise in Fig. 15, the spring 248 will pull the link 246 downwardly, thereby rocking the arm 233 clockwise (Fig. 15), and by means of recess 246A (Figure 17) engaging pin 249 will rock lever 250 downwardly.

In the upper part of the machine is a shaft 262 which is the same as the shaft 93 described in specification No. 405,666. This shaft is rocked from the shaft 49 by means of an arm 265 on the shaft 262 connected by a link 264 to the arm 88 on the shaft 49.

Also secured to the shaft 262 is a short arm 266 connected by a spring 267 to a pin 268 on a lever 269 pivoted to the machine frame at 243. The link 250 is formed with a hooked end 270 which is normally clear of a pin 271 on the lever 269. As the shaft 262 rocks counter-clockwise the arm 265 pushes the lever 269 in a clockwise direction about pivot 243 from the position shown in Figures 15 and 17, and then, when the shaft 262 rocks clockwise, the spring 267 pulls the lever 269 back again counterclockwise to the positions shown in Figures 15 and 17.

As long as the link 250 is in the position shown in the drawings, that is to say, as long as the total in the second rear accumulator A2 is positive, the pin 271 is clear of the hook 270 so that the rocking of the lever 269 is without effect on the lever 250.

If, however, the total in the second rear accumulator A2 is negative the link 250 will have been rocked downwardly and the hook 270 will engage over the pin 271. Consequently as the lever 269 rocks counter-clockwise the pin 271 will, by engagement with the hook 270 pull the link 250 and therefore pull the abutment 82 for the first rear accumulator A1 clockwise (Figs. 15 and 17) about its pivot into the negative position, so that the first rear accumulator will be set for subtraction, that is to say, to receive the negative total which is to be transferred to it from the second rear accumulator A2.

When the shaft 159 reaches its fifth position, the cam 239 releases the follower member 241 and if the total in the third rear accumulator A3 is negative the link 250 will be rocked counter-clockwise by the link 245 and the pin 271 will engage the hook 270 and pull the abutment for the first rear accumulator A1 into the negative position in readiness to receive the negative total from the third rear accumulator A3.

When a total is being transferred from the accumulator A2 to the accumulator A1 it is necessary that the second rear accumulator A2 shall perform a normal total taking operation. That is to say the wheels 59 or 60 of the second rear accumulator A2 must remain in engagement with their sectors 62 while the latter are moving away from their normal positions so that these sectors may be set to the amount of the total held in the second rear accumulator A2. The wheels of the second rear accumulator A2 are then brought out of engagement with their sectors and the latter are then returned to normal position.

At the same time when the wheels of the second rear accumulator A2 are in engagement with their sectors the wheels of the first rear accumulator A1 must be out of engagement with their sectors in order that the latter may be set from the wheels of the second rear accumulator A2 through the agency of the sectors 62 of that accumulator and of the couplers 216.

Since the machine is set for a total taking operation by the rocking of the front and back total shafts 185 and 162 at 350° in cycle 4 the control plates 71 for all the rear accumulators A1, A2, A3 will be pulled upwards into the totalling position simultaneously, so that the wheels of all three rear accumulators would remain in engagement with their sectors.

Mechanism has already been described for causing the sub-group total to be retained in the first rear accumulator $A_1$, this mechanism comprising a cam 211 on the upper cam shaft 159 controlling a bell crank 212 which serves to hold the control plate 71 for the first rear accumulator $A_1$ in an intermediate position during the first total taking cycle, i. e., when the upper cam shaft 159 is in its third position.

When a total is to be transferred from the accumulator $A_2$ to the accumulator $A_1$ the upper cam shaft 159 is in its fourth position (cycle 5) and in this position the aforesaid cam 211 holds the control plate 71 for the first rear accumulator $A_1$ in its lowermost position against the action of the spring 165 in which position the lower recess 73a therein is in engagement with the lower pin 73b on the double armed lever 74.

With this control plate 71 in this position the wheels of the first rear accumulator $A_1$ are moved out of engagement with their sectors 62 (14° cycle 5) before the latter are set and into engagement therewith (198° cycle 5) after the sectors have been set.

At the same time the control plates 71 for the accumulators $A_2$ and $A_3$ have been raised by the respective levers 166, arms 163, 164 and springs 165 so that the wheels for these accumulators go into engagement with their sectors at 14° cycle 5.

The front sectors 38 are retained in their normal positions by so-called nought stops 41 and on a total taking operation these nought stops are withdrawn. Withdrawal of the nought stops for the front sectors permits these sectors to swing out when released by the restoring bar 45 and therefore also permits the rear sectors to swing out since the latter are connected to the former by links.

It is required, however, that the sectors of the second and third rear accumulators $A_2$ and $A_3$ shall only be released during the second and third total taking operations respectively.

Accordingly in order to withdraw the nought stops 41 for the second and third accumulators $A_2$ and $A_3$ and thereby permit movement of the corresponding rear sectors 62, a device such as that described in British specification No. 319,086 is provided for each of the second and third accumulators. This device comprises a slide 275 (Figs. 9 and 16) guided by means of a lower slot 276 on a pin 277 secured to the machine frame indicated at F, and also by an upper slot 278 engaging a pin 279 on the nought shutter comb 204. Pivoted on the pin 277 behind the slide 275 is a lever 282 having a cam face 283 which co-operates with the nought shutter cam 202, and this lever carries a pin 284 which co-operates with a shoulder 285 on the slide 275.

A fixed pin 281 projects from the frame member F through apertures in the lever 282 and slide 275 and a spring 280 extended between the fixed pin 281 and a pin 280a on the lever 282 urges said lever 282 clockwise about the pivot 277, the movement in the clockwise direction being limited by engagement of the left hand vertical edge of the aperture in lever 282 with the fixed pin 281.

Beneath the slide 275 is one arm 289 of a bell crank pivoted to the frame at 288a and of which the other arm 288 engages a cam 287 on the shaft 159, a spring 286 extended between the fixed pin 281 and a pin 289a on arm 289 serving to maintain the arm 288 in contact with the cam. The arm 289 normally holds the slide 275 in its uppermost position and a further spring 275a, extended between a pin 275b on slide 275, and a pin 275c on bell crank arm 289 exerts a downward pull on slide 275.

Normally, when the back total shaft 162 rocks, the cam 202 by engagement with the cam face 283 rocks the lever 282 counter-clockwise, and as at this time the slide 275 is in its upper position the pin 284 engages the shoulder 285 and rocks the slide 275 counter-clockwise about pin 277, accordingly the nought shutter comb 204 is moved to the left and the nought shutters 42 are rocked aside to the left in Fig. 16, thereby withdrawing the nought stops 41 away from the sector heels 40 so that the sectors of the accumulator concerned are free to operate.

When the cam shaft 159 is in its third position (cycle 4) it is desired that the second rear accumulator $A_2$ shall not be free to print its total, and to this end when the shaft 159 is in this third position the cam 287 rocks the associated bell crank 288—289 to lower the arm 289 whereby the slide 275 is pulled down by the spring 275a.

Then when the back total shaft 162 rocks and the cam 202 rocks the lever 282 the pin 284 passes above the shoulder 285 and does not rock the slide 275 about its pivot 277. Accordingly the nought shutter comb 204 associated with accumulator $A_2$, is not operated and the nought stops 41 are not withdrawn.

When the shaft 159 reaches its fourth position the cam 287 releases the arm 289 and the slide 275 moves to its upper position so that the nought stops of accumulator $A_2$ are withdrawn to permit printing in cycle 5.

At the fifth position of the shaft 159 the slide 275 is still in its upper position, but though the nought stops of accumulator $A_2$ are withdrawn nothing is printed because the accumulator is already at zero. A similar cam 290 (Figs. 9A and 22A) is also provided on the shaft 159 and this actuates a similar bell crank (Fig. 22A), for the slide 275 of the third accumulator $A_3$, the actuation of this bell crank being effected when the cam shaft 159 is in its third and fourth positions, so that in cycles 4 and 5 the nought stops for accumulator $A_3$ are not withdrawn. In cycle 6, when the shaft 159 is in its fifth position the cam 290 releases the associated bell crank 288, 289, whereby the arm 289 thereof raises the corresponding slide 275 bringing its shoulder 285 into line with the pin 284.

Accordingly when in cycle 6 the shaft 162 rocks and the cam 202 rocks the lever 282, the pin 284 rocks lever 275 counterclockwise and the latter pushes the shutter 204 to the left thereby withdrawing the nought stops for accumulator $A_3$ so that its sectors can move forward.

As described in specification No. 405,666 the machine is so constructed that when any rear accumulator $A_1$, $A_2$ or $A_3$ prints its total this total is transferred to the corresponding front grand total accumulator $G_1$, $G_2$ or $G_3$ and consequently when the first rear accumulator $A_1$ printed and retained its total in cycle 4, this total was transferred to the first front grand total accumulator $G_1$. Likewise when the second and third rear accumulators $A_2$, $A_3$ printed their totals in cycles 5 and 6 respectively and transferred them to the first rear accumulator $A_1$ these totals were also transferred to the second and third front grand total accumulators $G_2$ and $G_3$ respectively.

After the three total printing operations described above have occurred the first rear accumulator $A_1$ holds the algebraic sum of the three sub-group totals which have been printed and it is desired to print this algebraic sum which may conveniently be referred to as a cross total.

The tabulator is therefore caused to perform a fourth total taking operation, this fourth total taking operation being initiated by a cam 3170 on the lower cam shaft 153 which is the same as the cam 170 described in the British specification No. 484,911. Towards the end of cycle 5, in which the sub total is transferred from accumulator $A_2$ to accumulator $A_1$ the upper and lower cam shafts 159 and 153 are moved from their fourth to their fifth positions and during this movement the cam 3170 pushes a link 291 (Figs. 1, 24C, 24D and 28) to the right.

This link is pivoted to a plate 292 pivoted on a shaft 354, which is the same as the shaft 25 in British specification No. 484,911 or the shaft 76 in British specification No. 426,054. The plate 292 is connected by a link 293 to an arm 294 on the shaft 99 already described, and the rocking of the plate 292 raises the link 293 whereby the rocking motion of the shaft 99 is obstructed in cycle 6 with the result that at 50° in cycle 6 the total shaft 110 commences to make a second revolution whereby a fourth total taking operation is initiated.

During the resulting total taking operation it is desired that the first rear accumulator $A_1$ shall control printing of the cross total and remain at zero without transferring the cross total to the first front grand total accumulator $G_1$. Accordingly mechanism is provided for preventing the first front grand total accumulator $G_1$ from operating in the normal manner.

To this end the control plate 178 for the first front grand total accumulator $G_1$ is provided with an extension 295 (Figs. 9, 9A, 20B and 20D) which at its rear end overlies a pin 296 on an arm 297 pivoted on the shaft 75. Also pivoted on the shaft 75 is an arm 298 secured to the arm 297 by a screw 299. The arm 298 lies below the arm 214 on the shaft 75 already described. When the upper cam shaft 159 is in its first position the bell crank 212, 214, is in engagement with the highest part of the cam 211, and the arm 214 is therefore clear of the arm 298 so that the control plate 178 is not affected. When the cam shaft 159 reaches its third position (cycle 4) the arm 212 of the bell crank 212, 214, is on an intermediate or lower portion 211a of the cam 211, and in this position the arm 214 although in a lower position than before still does not interfere with the arm 298 so that the control plate 178 for the first front accumulator is still unaffected and the sub-total is transferred from the first rear accumulator $A_1$ to the first front accumulator $G_1$.

Referring to cycle 4, at the beginning of this cycle, the control plates 178 for all the grand total accumulators $G_1$, $G_2$ and $G_3$ are held in the intermediate position (Fig. 9) by the respective arms 182 and in this position they are disengaged from the disc 193 and do not move therewith. Also at the beginning of cycle 4 all the grand total accumulator wheels are out of engagement with their sectors 38, and at the beginning of cycle 4 the shaft 194 has already been rocked clockwise from the position shown in Fig. 9 and is in its extreme clockwise position.

At 10° in cycle 4 the front total shaft is rocked fully clockwise whereby the arms 182 are lifted and tend to lift all the control plates 178 into the upper position. Since at this time the pin 199a in each unit is above the edge of the arm 179 and out of register with the recess 199, the control plates 178 only rise until their arms 179 contact the respective pins 199a.

At 14° in cycle 4 the shaft 194 rocks counterclockwise into the position of Fig. 9 and reaches this position at 40° in the cycle at which time the recess 199 comes into register with the pin 199a and the spring 190 completes the upward movement of the control plate 178, effecting engagement of recess 199 with pin 199a in the case of each accumulator.

From 198° to 230° in cycle 4 the shaft 194 rocks clockwise away from the position of Fig. 9 thereby pulling all the control plates 178 to the left and effecting engagement of the grand total wheels 54 of all three accumulators with their sectors 38.

At 315° in cycle 4 the front total shaft 185 rocks back to normal, due to the roller 3090 dropping into the gap 3092 in cam 3091, but at 350° in the same cycle the front total shaft is again rocked clockwise in Fig. 9 thereby re-establishing engagement between recess 199 and pin 199a.

Towards the end of cycle 4 the shaft 159 moves from its third to its fourth position bringing the lowest part of the cam into register with the arm 212, whereby spring 215 rocks bell crank 212, 214, clockwise and the arm 214 pushes the arm 298 clockwise thereby lifting the arm 297 until the pin 296 thereon engages with the extension 295 of the control plate 178 of accumulator $G_1$. By this means the latter is rocked down about its pivot 178b into the intermediate or neutral position, and disengages the recess 199 from the pin 199a.

This action is complete at the beginning of cycle 5 at which time the wheels 54 of accumulator $G_1$ are in engagement with their sectors 38. Shaft 194 rocks counterclockwise into the position of Fig. 9 from 14° to 40°, but although at this time the recess 199 is disengaged from pin 199a, the latter pushes against a finger 178c pivoted at 178d to the plate 178 and thereby pushes plate 178 to the right and disengages the wheels 54 of accumulator $G_1$ from their sectors 38. When, however, shaft 194 rocks clockwise from 198° to 230° in cycle 5 the plate 178 does not move since the recess 199 is still disengaged from pin 199a. Consequently the wheels 54 of accumulator $G_1$ remain out of engagement with their sectors while the total is transferred from the second to the first rear accumulator $A_2$ to $A_1$.

Likewise when the cam shaft 159 reaches its fifth position (cycle 6) the arm 212 is still in contact with the lowest part of the cam, and consequently the wheels of the first front accumulator $G_1$ are still held out of engagement, and therefore the total which is transferred from the third rear accumulator $A_3$ to the first rear accumulator $A_1$ is not transferred to the first front accumulator $G_1$.

The extension 295 is only provided on the control plate 178 of accumulator $G_1$. The plates 178 of accumulators $G_2$ and $G_3$ operate normally during cycles 5 and 6.

As already mentioned after the total has been transferred from the accumulator $A_3$ to the accumulator $A_1$ the machine executes a fourth total taking operation during which the cross total is printed.

Towards the end of the third total taking operation (cycle 6) the cam shaft 159 moves from the fifth to the first position (cycle 7) and the highest part of the cam 211 again engages with the arm 212 rocking it and the arm 214 back to the normal position thereby tending to release the control plate 178 for the first front accumulator.

During cycle 6, however, the back total shaft 162 has rocked to the position which it occupies during the total taking operation, and according to the invention mechanism controlled by the back total shaft 162 is employed to hold the control plate 178 of the first front accumulator G₁ in the intermediate position during the printing of the cross total, so that the cross total shall not be transferred to the first front accumulator G₁.

This mechanism comprises a depending pawl 300 pivoted at 301 (Fig. 9A) to an arm 302 freely mounted on the shaft 75 and having an extension 303 connected by a pin 304 to the arm 298. Secured to the back total shaft 162 is a ratchet arm 305 having two teeth 306, 307. Behind this arm is a fixed ratchet plate 308 having one tooth 309 (Fig. 19).

Normally the pawl 300 rests against the inclined surface 309a of the fixed tooth 309 but when the arm 302 is lifted in cycle 5 by the action of bell crank 212, 214, the pawl 300 is lifted above the tooth 309 and a spring 311 swings it clockwise about its pivot 301 until arrested by engagement of a pin 300a on the pawl 300 with the edge of arm 302.

The arm 302 and pawl 300 remain in these positions during cycles 5 and 6 until at the end of cycle 6 the cam 211 rocks bell crank 212, 214, counterclockwise, thereby releasing arm 302, which drops until arrested by engagement of pawl 300 with the fixed tooth 309.

In cycle 8 the back total shaft 162 rocks counterclockwise in Fig. 9A and the pawl 300 is picked up between the teeth 306 and 307 whereby arm 302 is again lifted and through arms 298 and 297 and pin 296 lifts the extension 295 of the control plate 178 for the grand total accumulator G1, thus maintaining this control plate in the intermediate or neutral position so that the wheels 54 of the accumulator G₁ do not engage with their sectors in cycle 8. The teeth 306 and 307 are displaced half a tooth pitch with regard to the tooth 309 so that when the shaft 162 rocks back to normal position at 315° in cycle 8 the tooth 307 descends below the pawl 300, and the spring 311 pulls the latter down the inclined face of the tooth 309, thereby permitting the arm 302 to drop and take with it the arm 298 and 297 thereby releasing the extension 295 of the control plate 178.

During the four total-taking operations described above the first three totals are printed in a single line and the fourth or cross total is printed on the next line below the first total since both the first and the fourth totals are printed from the printing elements 52a associated with the first front accumulator G₁. Normally the paper feed mechanism of the machine is operated at each revolution of the main shaft and in order to print the first three totals in one line it is necessary to prevent the paper feed mechanism from operating after the printing of the first and second totals.

The paper feed mechanism is of known construction and need not be described here; it is sufficient to say that the paper feed mechanism is operated from a shaft shown at 312 (Fig. 18). This shaft carries an arm 313 pivoted at 314 to an operating link 315 the lower end of which is pivoted at 316 to an operating arm 317 pivoted to the machine frame at 318. Link 315 is urged downwardly by a compression spring 319 surrounding a rod 320 pivoted to the machine frame at 321 and passing through a bent portion 322 of the link 315.

Secured to the shaft 49 which rocks at each machine cycle is a lug 323 which as the shaft 49 rocks clockwise engages the outer end of the arm 317 thereby pushing the link 315 upwardly and rocking the shaft 312, the link 315 being returned by the spring 319 when the shaft 49 rocks back in the counter-clockwise direction.

In order to prevent the paper feed mechanism from operating after the first and second totals have been printed, the cam 253 is provided with a follower arm 325 (Fig. 18) pivoted on the shaft 255. At the upper end of arm 325 there is pivoted a link 327 (Figs. 18 and 22A) pivoted at its other end to a bell crank 328 pivoted to the machine frame at 329. One arm of the bell crank 328 lies under a pin 330 on a link 331 of which the lower end is turned over to project below the arm 317 which operates the paper feed shaft 312. When the cam shaft 159 is in its third and fourth positions (cycles 4 and 5), the cam 253 holds the bell crank 325 in its uppermost position, whereby the link 327 is pushed to the left and the bell crank 328 lifts the link 331, which holds the arm 317 in its uppermost position so that it cannot operate. When the shaft 159 reaches its fifth position (cycle 6) the cam 253 releases the bell crank 325 and a spring 333 returns the link 331 to its lowermost position thereby also returning the link 327 and the bell crank 325 to their normal position.

Thus, after the first three totals have been printed the paper feed is rendered operable again to feed the paper one line so that the fourth total which is printed during the next revolution of the main shaft may appear on the next line below the first total.

Since the fourth total is printed at a time when the shaft 159 is in the first position (cycle 7), the cam 253 does not interfere with the paper feed mechanism during the printing of the fourth total so that after the printing of this total the paper is fed one line in readiness for the printing of the next line.

The printing operation is effected by mechanism which is fully described in British specification No. 461,612. The mechanism comprises printing hammers 334, pivoted to a frame at 335, there being one hammer for each type sector 52. The hammers are normally held in a horizontal position by individual latches which are released at each revolution of the main shaft by the mechanism described in British specification No. 461,612. It may here be mentioned that the shaft 45 in British specification No. 461,612 is the same as the shaft 49 in the present drawings.

While the first total is being printed (cycle 4), the printing hammers 334 for the first front accumulator G₁ operates so that this total is printed. As already explained, at this time the zero stops for the sectors associated with the second and third accumulators G₂ and G₃ are locked and consequently the sectors for the second and third accumulators do not move and therefore no amounts are printed from these accumulators.

During the printing of the second total which comes from the second rear accumulator A₂ (cycle 5), the shaft 159 is in the fourth position and when the shaft 159 moves from the third to the fourth position a cam 324 thereon rocks a bell crank 325a counter-clockwise (Fig. 18). The bell crank 325a is immediately in front of the bell crank 325 and pivoted to the bell crank 325a at 326a is a link 337 which at its other end is pivoted to a bail 339 (Figs. 18 and 20D) pivoted on a shaft 340.

When the bell crank 325a rocks, the bail 339 is rocked clockwise and moves over the ends of the hammers 334 so that even when the latches 336 are released the hammers are restrained and cannot operate, so that printing will be prevented. The hammers in question are those of the first accumulator G1 so that printing is only prevented from the first accumulator and the total from the second rear accumulator is printed.

When the cam shaft 159 is in the fifth position (cycle 6) the printing of the total is effected from the third rear accumulator, but is prevented from the first rear accumulator by the bail 339 which is still held in operative position by the cam 324 acting on the bell crank 325a.

It may be pointed out that during the third total printing operation (cycle 6) the wheels of the second rear accumulator are already at zero, therefore nothing is printed from these wheels either.

During the fourth total printing operation (cycle 8) the first rear accumulator prints the cross total in the normal manner of printing totals, and since both the second and third rear accumulators are now at zero nothing is printed from these accumulators.

While the four total taking operations described above are occurring it is necessary to arrest the feed of cards to the machine.

During the first three revolutions of the main shaft 24 following a change in sub-group designation the card feed is arrested by mechanism similar to that described in specification No. 371,849. This mechanism comprises a lever 341 pivoted to the machine frame at 342 (Fig. 7) and carrying a roller 343 co-operating with a card feed delay cam 344 on the total shaft 110. A spring 345 maintains the roller 343 in contact with the cam 344.

As a result of the change in designation the total shaft 110 starts up at 50° in cycle 2. When the shaft 110 starts the roller 343 is in the low dwell 346 of cam 344 and at 65° in the same cycle the roller 343 has mounted on to the high part of the cam 344 whereby the lever 341 is rocked into the path of a pin 347 projecting rearwardly from the quadrant 16 in Fig. 7. At this time the quadrant is performing its idle return stroke in the counterclockwise direction and at 95° the pin 347 engages the lever 341 thereby preventing the quadrant from completing its counterclockwise movement so that the clutch connecting the pinion 15 to the shaft 12 does not engage and therefore the quadrant rocks back idly in the clockwise direction.

The cam 344 holds the lever 341 in the path of the pin 347 until 10° in cycle 4, so that in cycle 3 the quadrant is prevented from picking up the pinion 15.

In order to arrest the card feed during the second and third total taking operations a cam 3135 is provided on the lower shaft 153 (Fig. 28). This cam is the same as the cam 135 described in British specification No. 484,911 and, when the shaft 153 reaches its second position, the cam 3135 acts on a roller 3136 carried by a link 348 and pushes this link to the right. Near to its other end this link is pivoted at 349a to one end of an arm 349 (Figs. 1, 24D and 28) pivoted on the shaft 354 and carrying at its other end a pin 349b.

When the link 348 is pushed to the right the arm 349 is rocked counterclockwise and moves the pin 349b into the path of a pin 347a projecting forwardly from the quadrant 16 in Figs. 1 and 7. The arm 349 is thus held rocked during cycles 3, 4, 5 and 6 and takes the place of the lever 341 when the latter is restored to normal by its spring 345 at 10° in cycle 4, whereby the quadrant 16 is prevented from picking up the pinion 15 in cycles 4 and 5.

At 50° in cycle 6 the total shaft 110 starts again and the cam 344 moves the lever 341 into the path of the pin 347a again whereby in cycles 6 and 7 the quadrant 16 is arrested by pin 347a.

The foregoing has described the four total taking operations which occur when a change in subgroup designation takes place. When a change in the main group designation occurs these four total taking operations first take place and then a grand total taking operation occurs in which the grand totals accumulated in the front grand total accumulators G1, G2 G3, associated with the first, second and third rear accumulators A1, A2, A3 are printed, and the grand total accumulators are cleared.

When a sub-group designation change occurs the bell cranks 129 associated with the sensing pins 1025 which read the main group field in the card rock clockwise and therefore the grand total casting 126 is free to rock down counterclockwise about the shaft 124 relatively to the pin box during the descent of the latter. On the occurrence of a main group change, however, the bell cranks 129 do not rock relatively to the pin box and the casting 126 also cannot rock, and the obstruction thereof brings about a sub-total operation followed by a grand total operation.

In the present machine three additional total taking operations are interposed between the sub group total taking operation and the grand total taking operation and accordingly the operation of the grand total taking mechanism must be delayed until these three total taking operations have occurred.

To this end the following mechanism is provided:

Attached to the re-setting link 1141 (Fig. 1) for the change of designation pin box is an arm 351 (Figs. 1, 24D and 31) carrying at its lower end a pawl 3152 which, when permitted, actuates a ratchet wheel 3153 secured to the double total shaft 354 already referred to. This ratchet 3153 and shaft 354 are the same as the ratchet 77 and shaft 76 described in British specification No. 426,054 and when the shaft 354 is rotated step by step the said shaft initiates a grand total operation.

Normally the pawl 3152 is prevented from engaging with the ratchet 3153 by a pin 3154 on the arm 351 which is pulled by a spring 3154a against a shoulder 3155 on a plate 3156 freely mounted on the double total shaft 354 (see Fig. 31).

Pivoted to the machine frame at 3157a is a latch 3157 which is connected by a link 350 to a lever 147 pivoted between its ends to the designation pin box frame at 143 and to an extension 146 of the grand total casting 126 at 145 (Fig. 1).

When the designation pin box 4 descends to sense the first card of a new group, and the change in designation is in a sub group only, the pin box 4 descends to a predetermined extent taking with it the lever 147 and link 350 whereby during the initial downward movement of pin box 4 the descent of link 350 rocks the latch 3157 counterclockwise into engagement with a projection 3163 on the plate 3156 (Fig. 31).

As the pin box continues to descend, the slides 123 associated with the grand total bar 128 all rock clockwise (Fig. 6) about the guide rod 123a and bring their lugs 129 downwardly away from the bar 128, because there is no change in the main group designation. Consequently as the pin box 4 continues to descend the grand total casting will rock counterclockwise in Fig. 6 as already explained, so that its extension 146 will rock clockwise in Fig. 1.

This clockwise rocking of the extension 146 of the grand total casting 126, rocks lever 147 counterclockwise while it is moving downwardly with the pin box 4. Hence although the initial downward movement of pin box 4 at first lowers link 350 and thereby rocks latch 3157 counterclockwise into engagement with projection 3163, the clockwise rocking of member 146 during the later part of the downward movement of pin box 4 rocks lever 147 counterclockwise whereby latch 350 is lifted again and latch 3157 rocked clockwise out of engagement with projection 3163.

Later (100° to 360° cycle 3) the link 1141 moves upwardly to reset the designation sensing pin box and pulls the arm 351 up with it. Since the plate 3156 is connected to the pin 3154 by the spring 3154a the pin 3154 remains against the shoulder 3155 and the plate 3156 rocks counterclockwise so that the pawl 3152 is unable to engage the ratchet wheel 3153.

When, however, a main group change is detected the pin box 4 descends, thereby lowering the link 350, but the grand total casting 126 is prevented, by engagement of bar 128 with one or more of the lugs 129, from rocking counterclockwise in Fig. 6 so that its extension 146 does not rock clockwise in Fig. 1, and accordingly the lever 147 does not rock counterclockwise in Fig. 1 to lift the link 350. Hence the result is that link 350 is lowered and latch 3157 engages projection 3163.

It may here be mentioned that before the link 1141 rises (cycle 3) the link 348 moves to the right. The link 348 carries a shield 3164 and when the link moves to the right this shield is moved to the right also. Then when the link 1141 rises and pulls the arm 351 up with it, the plate 3156 is unable to move as it is held by the latch 3157. Consequently when the arm 351 rises the pin 3154 rises above the shoulder 3155 and the spring 3154a pulls the arm 351 to the left until the pin engages the shield 3164, which prevents the arm from moving sufficiently far to the left to permit the pawl 3152 to engage the ratchet 3153.

Then as the arm 351 continues to rise the pin 3154 slides up the shield 3164 until it strikes a shoulder 3165 on a second latch 3166 also pivoted to the machine frame at 3157a, whereby the latch 3166 is rocked clockwise until a hook 3167 thereon engages the projection 3163 on the plate 3156.

The resetting operation effected by the rise of the link 151 permits the grand total casting 126 to drop relatively to the pin box 4 whereby a spring (not shown) rocks the lever 147 counterclockwise and lifts the latch 3157 clear of the projection 3163 on the plate 3156. This projection, however, remains engaged by the latch 3166.

When the resetting link 1141 for the pin box 4 descends again (40° to 80° cycle 4) the arm 351 descends also and the pin 3154 strikes the surface 3168 on the plate 3156, thereby rocking the latter clockwise and releasing it from the latch 3166 which thereupon drops down in a counterclockwise direction.

This action occurs at the end of the first total taking operation and during the second and third total taking operations the resetting link 1141 remains stationary. After the third total taking operation the link 348 moves to the left (0° cycle 7) thereby moving the shield 3164 back to the position of Fig. 31. As explained above the pin 3154 is now on the surface 3168 of the plate 3156 and therefore when the shield 3164 moves to the left the pin 3154 follows it and the pawl 3152 moves into engagement with the ratchet wheel 3153.

Then when the link 1141 rises (100° to 360° cycle 7) to reset the designation pin box 4 the arm 351 is lifted and the pawl 3152 turns the ratchet wheel 3153 one tooth.

The ratchet wheel 3153 has two long teeth 3153a and eight short teeth, the long teeth being opposite one another, and is the same as the ratchet wheel 77 described in British specification No. 426,054.

A pawl 4078 (Fig. 31) pivoted on one arm of a bell crank 4079 normally engages with one of the long teeth. The other arm of the bell crank 4070 is pivoted at 4080 by means of a pin and slot connection to the end of a lever 4081 pivoted to the machine frame at 4082. This lever 4081 is normally held up by means of a spring 4083 attached to the machine frame and to one arm of bell crank 4079 and carries a cam surface 4084 adapted to be engaged by the roller 21 on the arm 18 secured to the constantly rotating shaft 19.

The arm 18 makes one revolution for each cycle of the machine and the lever 4081 is consequently depressed at each cycle of the machine, thereby rocking the bell crank 4079 and operating the pawl 4078.

The pawl 4078 is normally in engagement with one of the long teeth 3153a and slides idly thereon at each movement of bell crank 4079. When the pawl 3152 turns the ratchet, however, this movement is sufficient to bring the edge 3153b of the long tooth into operative relation with pawl 4078 so that at the next counterclockwise rocking of bell crank 4079 the pawl 4078 turns the ratchet 3153 and shaft 354 one step and thereafter in each of the next succeeding four revolutions of the main shaft the pawl 4078 turns shaft 354 one tooth until the pawl 4078 reaches the next long tooth 3153a after which the shaft 354 stops.

Referring to the timing diagrams the pawl 3152 turns the ratchet 3153 from 260° to 360° in cycle 7 and the pawl 4078 picks up the ratchet at 100° in cycle 8 the first step being completed by pawl 4078 at 135° in cycle 8. The last step is performed from 100° to 135° in cycle 12.

When the shaft 354 is turned by pawl 4078 in cycle 8 a cam 355 (Figs. 2 and 5) thereon which is the same as cam 99 described in specification No. 426,054 comes into the path of a roller 356 on an extension 357 of the lever 151, whereby the lever 101 is prevented from rocking, accordingly the lever 103 is also prevented from rocking and the total shaft 110 is caused to make another revolution, from 50° cycle 9 to 85° cycle 11, thereby bringing about a fifth total taking operation.

When the shaft 354 is turned by pawl 4078 in cycle 10 another cam 358 on the shaft 354 which is the same as the cam 98 of specification No. 426,054 engages a roller 359a and thereby pulls downwardly a rod 359 (Figs. 2 and 18) which is guided at its lower end by a slotted plate 360 passing over the shaft 354 and at its upper end in a bracket 361 secured to the frame. The plate 360 carries the roller 359a. This rod 359 is connected at its upper end to a link 362 pivoted to an arm 88 on the shaft 49 and carrying a lug 364 which when the rod 359 is in its normal position passes above a projection 365 on a bell crank 366 as the link 362 is reciprocated. When, however, the rod 359 is pulled down by the cam 358 (between 100° and 135° cycle 10) the link 362 is also pulled down so that the lug 364 comes into the path of the projection 365 whereby as the link 362 moves to the right the lug 364 strikes the projection 365 thereby rocking the bell crank 366 clockwise from 300° to 360° cycle 10.

Pivoted to the bell crank 366 is a link 368 carrying at its other end a plate 369 pivoted at 370 to an arm 371 on the grand total shaft 201a (Figs. 9 and 18).

Accordingly as the bell crank 366 rocks, the grand total shaft 201a rocks counterclockwise and removes the latch 201 from engagement with the bell crank 188, so that when the front total shaft 185 rocks at 350° cycle 10 due to the turning of the total shaft 110 the bell crank 188 does not move relatively to the arm 184. Consequently the arm 182 moves down and pulls the control plate 178 for the front accumulator down with it. The rocking of the front total shaft 185 is completed at 10° in cycle 11 and at this time the shaft 194 is in its extreme clockwise position having rocked into that position from the Fig. 9 position in the latter half of cycle 10. Accordingly the recesses 198 in the control plates 178 for all three grand total accumulators are in register with the pins 198a. Consequently when the plates 178 are lowered at 10° in cycle 11 the recesses 198 engage the pins 198a and then at 14° in cycle 11 the shaft 194 rocks counterclockwise to the position of Fig. 9, thereby pulling the plates 178 to the left and moving the grand total wheels into engagement with their sectors.

Simultaneously with the rocking of the front total shaft the back total shaft 162 rocks and the cams 202 thereon release the nought stops 41 for all three accumulators whereby the sectors 38 are free to swing forward until arrested by the wheels 354 reaching zero. The type sectors 52 are thus set to the amounts of the grand totals, which are then printed in one line.

At 198° in cycle 11 the shaft 194 rocks clockwise thereby disengaging the grand total wheels 54, now clear, from their sectors, and at 315° in cycle 11 the front and back total shafts rock back to normal, restoring the control plates 178 to their normal intermediate positions in which they exercise no effect on the wheels 54. The latter therefore remain out of engagement with the sectors 52 until the next operation of the front total shaft 185.

During the grand total taking operation it is necessary to maintain the wheels 59 and 60 of the rear accumulators A1, A2, A3, out of engagement with the rear sectors 62 and to this end means is provided for maintaining the control links 71 in an intermediate position in which neither recess 72a, 73a engages with its pin 72b, 73b.

The total taking operation brought about by the one revolution of the total shaft 110 occupies three revolutions of the main shaft 24, of which the first two are idle as far as total taking is concerned. During these first two revolutions (cycles 9 and 10) each link 71 is held in its lowermost position by the arm 163 on the back total shaft 162 and at the end of the second revolution the links 71 will be over to the left in Fig. 8 so that the wheels 59 or 60 will be in engagement with the sectors 62.

At the beginning of the third revolution (10° cycle 11) the back total shaft 162 rocks counterclockwise in Fig. 8 and the arms 164 tend to raise the control plates 71 into the uppermost position. Before the back total shaft rocks, however, the bell crank 366 rocks in the manner described above (300° to 360° cycle 10) and therefore the shaft 367 to which this bell crank is secured rocks clockwise (Fig. 8).

Secured to the shaft 367 is an arm 379 overlying a pin 380 on a lever 381 freely mounted on the shaft 367 so that when the shaft 367 rocks clockwise, the arm 379 by engagement with the pin 380 depresses the lever 381 against the action of a spring 382.

At this time the link 71 is over to the left in Fig. 8 and a pin 383 thereon is below the edge 384 of lever 381. Accordingly, the lever 381 holds the link 71 in its lowermost position in which the recess 73a is in engagement with the pin 73b. Then when the shaft 75 rocks counterclockwise into the position shown in Fig. 8 (14° to 40° cycle 11), the link 71 is moved to the right, thereby taking the wheels 59 or 60 out of engagement with the sectors 62. As the link 71 moves to the right the pin 383 comes into engagement with an inclined face 385 of the lever 381, whereupon the spring 165 on the arm 164 pulls the link 71 up into the intermediate or idle position in which it is held by the end 381a of the lever 381.

It is necessary to hold the shaft 367 to the position to which it was rocked by the bell crank 366 during the time when the link 362 is rocking back to the left in cycle 11, and to this end an arm 372 (Fig. 18) is secured to the bell crank 366 and carries a lug 373 normally resting on an inclined face 374 of an arm 375 free on the shaft 255. When the bell crank 366 rocks, the arm 372 rocks clockwise until the lug 373 moves past the lower end of arm 375, the spring 376 then pulls the arm 375 counterclockwise whereby the lower surface 377 engages above the lug 373 to prevent the return of the bell crank 366. Then as the shaft 255 rocks clockwise (142° to 162° cycle 11) a lever 378 secured thereto which is slightly shorter than the arm 375 engages the latter and pushes it away from the lug 373, the place of the arm 375 being taken, however, by the arm 378 which engages the lug 373 and therefore still holds the bell crank 376 in a position to which it has been rocked. Then as the arm 378 rocks back in the counterclockwise direction (318° to 325° cycle 11) the arm 378 moves clear of the lug 373 thereby releasing arm 372 and bell crank 366 whereby the grand total shaft 201a is permitted to return to normal position under the action of a spring (not shown).

The shaft 255 is the same as the shaft 109 in British specification No. 484,911 and is rocked by the same means as the said shaft 109.

Referring to Fig. 30 of the accompanying drawings at its extreme lower end 3101a the lever 3082 is pivoted to a lever 3101 which is pivoted between its ends at 3102 to a cam actuated lever 3103 pivoted to the machine frame at 3104. This lever 3103 carries a roll 3105 engaging a cam 3106 on the shaft 3020.

At the moment when the lever 3082 is pulled down the roller 3105 is on the low part of the cam 3106 and when the lever 3082 descends it rocks the lever 3101 counterclockwise about the pivot 3102. Pivoted to the other end of the lever 3101 is a link 3107 of which the upper end is pivoted to an arm 3108 on the shaft 255. Accordingly, when the lever 3101 is rocked the link 3107 is pushed up and rocks the shaft 255 counterclockwise.

Then as the cam 3106 revolves the high part thereof engages the roll 3105 and rocks the lever 3103 about its pivot 3104 whereby the lever 3101 is again rocked. This time, however, the lever mainder of cycle 8 and the early part of cycle 9, the mechanism of British specification No. 426,054 is employed.

This mechanism comprises the detent ratchet 4091 (Fig. 32) secured to the double total shaft 354 and carrying two pins 4092 which can engage with the cam shaped end of a lever 4095 pivoted at 4095a. The other end of this lever carries a pin 4096 cooperating with the lever 341, and at 330° in cycle 7 during the movement of shaft 354 by the pawl 352 one of the pins 4092 rocks the lever 4095 whereby its pin 4096 moves into engagement with lever 341 and prevents it from returning to normal position when released by cam 344 at 10° in cycle 8.

At 100° in cycle 9 the shaft 354 turns another step and the pin 4092 passes clear of lever 4095, but before this action occurs the total shaft 110 has started and at 65° in cycle 9 the cam 344 picks up the lever 341 and prevents it from returning to normal when released by the pin 4092 on lever 4095.

The table set out below shows the functions of the upper camshaft 159 during the successive total taking operations initiated by a change in sub-group designation:

*Table showing functions of camshaft 159*

| Machine operation | Position of camshaft 159 | Unit A₁. Control cam 224 for couplers 216 | Unit A₁. Control cam 211 for link 71 | Unit A₂. Control cam 224 for couplers 216 |
|---|---|---|---|---|
| Adding cycle | First (normal) | Inactive | Inactive | Inactive. |
| Idle cycle | Second | do | do | Do. |
| 1st total | Third | do | Portion 211a active to hold link 71 in Unit A₁ inoperative. | Do. |
| 2nd total | Fourth | Active to connect sectors 62 of A₁ to couplers 216. | Active to condition A₁ to receive total from A₂. | Active to connect sectors 62 of unit A₂ to couplers 216. |
| 3rd total | Fifth | do | Active to condition A₁ to receive total from A₃. | Inactive. |
| Idle cycle | First (normal) | Inactive | Inactive | Do. |
| 4th total (cross total) | do | do | do | Do. |

| Machine operation | Position of camshaft 159 | Unit A₂. Nought stop control cam 287 | Unit A₃. Control cam 224 for couplers 216 | Unit A₃. Nought stop control cam 290 |
|---|---|---|---|---|
| Adding cycle | First (normal) | Inactive | Inactive | Inactive. |
| Idle cycle | Second | do | do | Do. |
| 1st total | Third | Active sectors of unit A₂ locked. | do | Active sectors of unit A₃ locked. |
| 2nd total | Fourth | Inactive sectors of unit A₂ free to operate. | do | Do. |
| 3rd total | Fifth | do | Active to connect sectors 62 of unit A₃ to couplers 216. | Inactive sectors of unit A₃ free to operate. |
| Idle cycle | First (normal) | Inactive | Inactive | Inactive. |
| 4th total (cross total) | do | do | do | Do. |

| Machine operation | Position of camshaft 159 | Control cam 240 for stirrup 231 for Unit A₂ | Control cam 239 for stirrup 230 for Unit A₃ | Cam 253 Paper feed | Cam 253 Arm 238 | Cam 324 for locking print hammers |
|---|---|---|---|---|---|---|
| Adding cycle | First (normal) | Inactive | Inactive | Free | Inactive | Inactive. |
| Idle cycle | Second | do | do | do | do | Do. |
| 1st total | Third | Active | do | Arrested | Rocks clockwise | Do. |
| 2nd total | Fourth | Inactive | Active | do | Remains rocked clockwise | Active. Hammers locked. |
| 3rd total | Fifth | do | Inactive | Free | do | Do. |
| Idle cycle | First (normal) | do | do | do | Rocks counterclockwise | Inactive. |
| 4th total (cross total) | do | do | do | do | Inactive | Do. |

3101 is rocked in a counterclockwise direction about its pivot 3101a and therefore the link 3107 is raised still further and the shaft 255 is rocked still further counterclockwise.

During the grand total taking operation the card feed is arrested by the lever 341 which at 65° in cycle 9 is moved into the path of the pin 347a on the quadrant 16 and remains there until 10° in cycle 11. The lever 341 however was moved out of the path of the pin 347a at 10° in cycle 8 and in order to arrest the card feed during the re-

What I claim is:

1. A record card controlled calculating machine having mechanism for detecting changes in designation of the cards, comprising in combination a total receiving accumulator, and a plurality of total transmitting accumulators, each having wheels capable of rotation in either direction for receiving additive or subtractive entries, carry mechanism operative for either direction of rotation, and an adjusting device settable to adjust the accumulator for either additive or subtractive rotation of its wheels, means for reading record cards, means operative under the control of said reading means to enter amounts into each of said accumulators, said entering means including a set of actuators to each accumulator, means for restoring said actuators to zero after they have been set, and means for setting the adjusting device for each accumulator in accordance with whether an amount is to be entered additively or subtractively, a type carrier to each actuator, an operative connection between each actuator and its type carrier, means individual to each accumulator for printing the amount to which its type carriers have been set by the actuators, means operative under the control of the change of designation detecting mechanism, when a change of designation occurs, to cause the machine to perform a number of consecutive total taking operations equal to one more than the number of accumulators, means operative during the first total taking operation to cause the total receiving accumulator to set its actuators and the type carriers connected thereto to the amount of said total, means also operative during the first total taking operation to actuate the printing means of the receiving accumulator to print the amount of said total from the type carriers, means also operative during the first total taking operation to maintain the wheels of the receiving accumulator in engagement with their actuators during restoration of said actuators to zero, whereby the amount of the printed total is returned to the wheels of the receiving accumulator, means operative during the subsequent total taking operations, except the last, to connect the actuators of the total-transmitting accumulators in turn to the actuators of the total-receiving accumulator, means operative during each of said subsequent total taking operations, except the last, to condition the total receiving accumulator to receive an amount from its actuators, means also operative at each of said subsequent total taking operations, except the last, to permit the transmitting accumulator of the connected pair of accumulators to set its actuators in accordance with the total it contains, whereby on the return of said actuators to zero, said total is entered into the receiving accumulator, means, operative during each of said total taking operations in which a transmitting accumulator is thus connected to the receiving accumulator, to actuate the printing means of the transmitting accumulator of the connected pair to print the amount of the transmitted total from the type carriers connected to the actuators of said transmitting accumulator, means effective upon the initiation of a total-taking operation and operative under the control of each one of the transmitting accumulators, when connected to the receiving accumulator, to set the adjusting means of the receiving accumulator to adjust said last mentioned accumulator for rotation of its wheels subtractively when the total in the transmitting accumulator connected thereto is negative, means operative during the last total taking operation of the series to cause the total receiving accumulator to set its actuators in accordance with the amount which it then holds, and means also operative during said last total taking operation to actuate the printing means of the receiving accumulator to print said amount from the type carriers connected to its actuators.

2. A record card controlled calculating machine having mechanism for detecting changes in designation of the cards, comprising in combination a total receiving accumulator, and a plurality of total transmitting accumulators, each having wheels capable of rotation in either direction for receiving additive or subtractive entries, carry mechanism operative for either direction of rotation, and an adjusting device settable to adjust the accumulator for either additive or subtractive rotation of its wheels, means for reading record cards, means operative under the control of said reading means to enter amounts into each of said accumulators, said entering means including a set of actuators to each accumulator, means for restoring said actuators to zero after they have been set, and means for setting the adjusting device of each accumulator in accordance with whether an amount is to be entered additively or subtractively, a type carrier to each actuator, an operative connection between each actuator and its type carrier, means individual to each accumulator for printing the amount to which its type carriers have been set by the actuators, means operative under the control of the change of designation detecting mechanism, when a change of designation occurs, to cause the machine to perform a number of consecutive total taking operations equal to one more than the number of accumulators, means operative during the first total taking operation to cause the total receiving accumulator to set its actuators and the type carriers connected thereto to the amount of said total, means also operative during the first total taking operation to actuate the printing means of the receiving accumulator to print the amount of said total from the type carriers, means also operative during the first total taking operation to maintain the wheels of the receiving accumulator in engagement with their actuators during restoration of said actuators to zero, whereby the amount of the printed total is returned to the wheels of the receiving accumulator, means operative during the subsequent total taking operations, except the last, to connect the actuators of the total-transmitting accumulators in turn to the actuators of the total-receiving accumulator, means operative during each of said subsequent total taking operations, except the last, to condition the total receiving accumulator to receive an amount from its actuators, means also operative at each of said subsequent total taking operations except the last, to permit the transmitting accumulator of the connected pair of accumulators to set its actuators in accordance with the total it contains, whereby on the return of said actuators to zero, said total is entered into the receiving accumulator, means, operative during each of said total taking operations in which a transmitting accumulator is thus connected to the receiving accumulator, to actuate the printing means of the transmitting accumulator of the connected pair to print the amount of the transmitted total from the type carriers connected to the actuators of said transmitting accumulator, an actuating member for the adjusting device of the receiving accumulator, normally disconnected from said adjusting device, but operative when connected thereto to set said adjusting device to adjust the receiving accumulator for subtractive rotation of its wheels, a device to each transmitting accumulaciated transmitting accumulator, means, opertor for testing the sign of the total in the assoative when the actuators of a transmitting accumulator are connected to the actuators of the receiving accumulator, to permit the sign-testing device associated with said connected transmitting accumulator to operate, means operative under the control of any of said sign-testing devices to establish an operative connection between said actuating member and the adjusting device of the receiving accumulator when the total in the associated transmitting accumulator is negative, means operative during the last total taking operation of the series to cause the total receiving accumulator to set its actuators in accordance with the amount which it then holds, and means also operative during said last total taking operation to actuate the printing means of the receiving accumulator to print said amount from the type carriers connected to its actuators.

3. A record card controlled calculating machine having mechanism for detecting changes in designation of the cards, comprising in combination a total receiving accumulator, and a plurality of total transmitting accumulators, each having wheels capable of rotation in either direction for receiving additive or subtractive entries, carry mechanism operative for either direction of rotation, and an adjusting device settable to adjust the accumulator for either additive or subtractive rotation of its wheels, means for reading record cards, means operative under the control of said reading means to enter amounts into each of said accumulators, said entering means including a set of actuators to each accumulator, means for restoring said actuators to zero after they have been set, and means for setting the adjusting device of each accumulator in accordance with whether an amount is to be entered additively or subtractively, a type carrier to each actuator, an operative connection between each actuator and its type carrier, means individual to each accumulator for printing the amount to which its type carriers have been set by the actuators, means operative under the control of the change of designation detecting mechanism, when a change of designation occurs, to cause the machine to perform a number of consecutive total taking operations equal to one more than the number of accumulators, means operative during the first total taking operation to cause the total receiving accumulator to set its actuators and the type carriers connected thereto to the amount of said total, means also operative during the first total taking operation to actuate the printing means of the receiving accumulator to print the amount of said total from the type carriers, means also operative during the first total taking operation to maintain the wheels of the receiving accumulator in engagement with their actuators during restoration of said actuators to zero, whereby the amount of the printed total is returned to the wheels of the receiving accumulator, means operative during the subsequent total taking operations, except the last, to connect the actuators of the total-transmitting accumulators in turn to the actuators of the total-receiving accumulator, means operative during each of said subsequent total taking operations, except the last, to condition the total receiving accumulator to receive an amount from its actuators, means also operative at each of said subsequent total taking operations except the last, to permit the transmitting accumulator of the connected pair of accumulators to set its actuators in accordance with the total it contains, whereby on the return of said actuators to zero, said total is entered into the receiving accumulator, means, operative during each of said total taking operations in which a transmitting accumulator is thus connected to the receiving accumulator, to actuate the printing means of the transmitting accumulator of the connected pair to print the amount of the transmitted total from the type carriers connected to the actuators of said transmitting accumulator, an actuating lever, means for operating said actuating lever at each machine cycle, a connecting member pivoted to the adjusting device of the receiving accumulator, an element in each transmitting accumulator settable in accordance with the sign of the total in its associated accumulator, a testing member for each of said settable elements, pivoted adjacent to said settable element so as to be unobstructed thereby when said settable element is in the negative position, but obstructed when the settable element is in the positive position, means operative, when the actuators of a transmitting accumulator are connected to the actuators of the receiving accumulator, to permit the testing member associated with said connected transmitting accumulator to move, if unobstructed by the settable element, an operative connection between each testing member and the aforementioned connecting member, whereby, when any testing member moves, the connecting member is moved into engagement with the actuating member, thereby bringing about movement of the adjusting device of the receiving accumulator to set said accumulator for subtractive rotation of its wheels, means operative during the last total taking operation of the series to cause the total receiving accumulator to set its actuators in accordance with the amount which it then holds, and means also operative during said last total taking operation to actuate the printing means of the receiving accumulator to print said amount from the type carriers connected to its actuators.

4. In a calculating machine having a total receiving accumulator and a total transmitting accumulator, each comprising in combination a plurality of denominational pairs of intermeshing positive and negative toothed wheels, a cradle in which said pairs of wheels are mounted, a displaceable support in which said cradle is pivoted, a toothed actuator to each pair of wheels, means for displacing the cradle support towards the actuators to cause engagement of the wheels with the actuators, an abutment member settable to a positive or negative position, abutment means on said cradle effective upon displacement of the cradle support towards the actuators to engage the abutment member and thereby cause tilting of the cradle in one direction to effect engagement of the positive wheels with the actuators when the abutment member is in the positive position and tilting of the cradle in the other direction to engage the negative wheels with the actuators when the abutment member is in the negative position, and a spring normally maintaining the abutment member of the receiving accumulator in the positive position, the combination with said two accumulators of means for connecting the actuators of one accumulator to the actuators of the other accumulator, an actuating lever for the abutment member of the receiving accumulator, means for operating said actuating lever at each machine cycle, a connecting member pivoted to the abutment member of the receiving accumulator, an element in the transmitting accumulator settable in accordance with the sign of the total in the transmitting accumulator, a testing member for said settable element, a spring tending to move said testing member, said testing member being pivoted adjacent to said settable element so as to be unobstructed thereby when said settable element is in the negative position, but obstructed thereby when the settable element is in the positive position, means operative when the actuators of the transmitting accumulator are connected to the actuators of the receiving accumulator, to permit the testing member to move under the action of its spring, if unobstructed by the settable element, and an operative connection between the testing member and the aforementioned connecting member, whereby, when the testing member moves, the connecting member is moved into engagement with the actuating member thereby bringing about movement of the abutment member of the receiving accumulator into the negative position.

RICHARD EVEREST BALDWIN.